Inventor
Joseph Becker

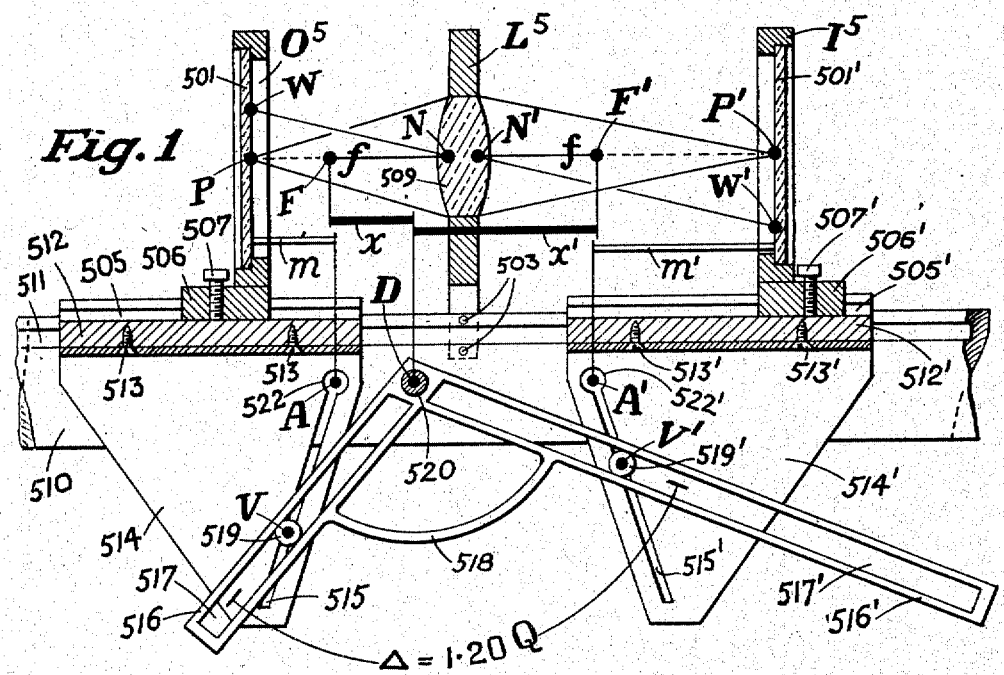
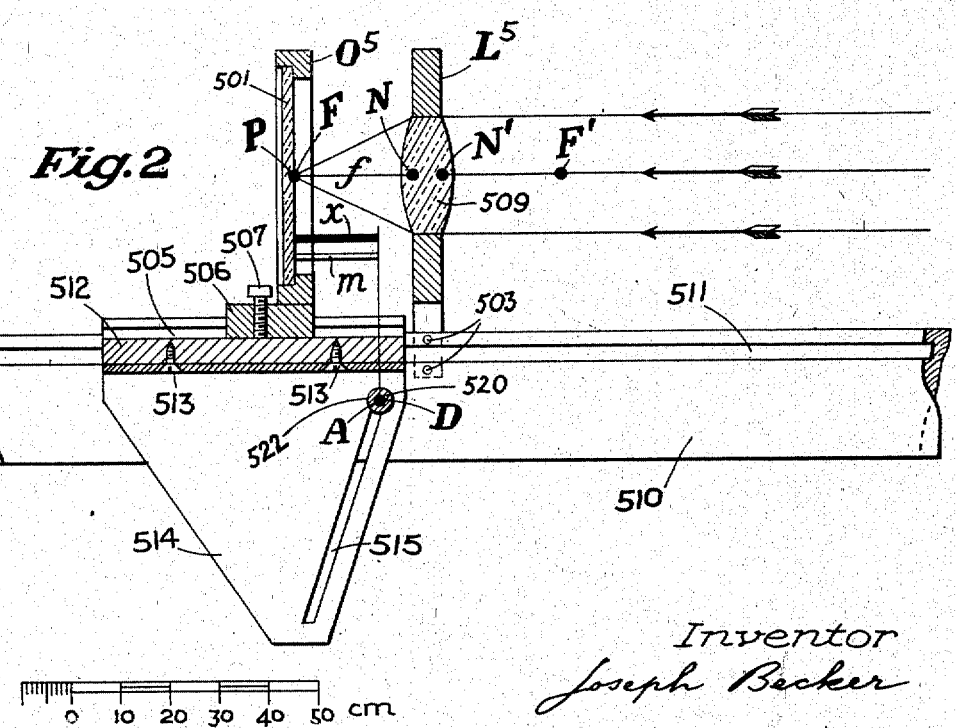

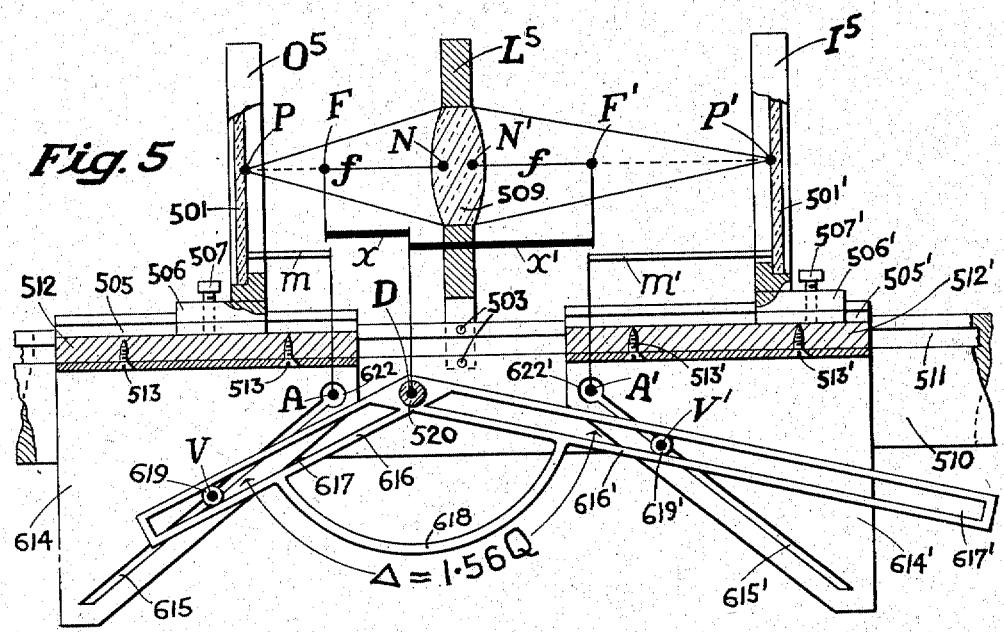
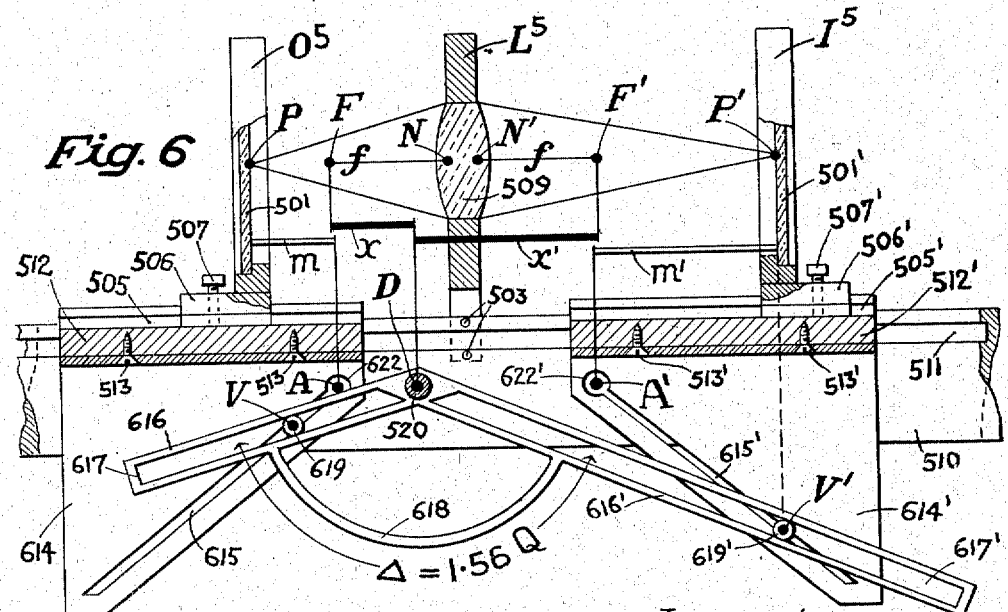

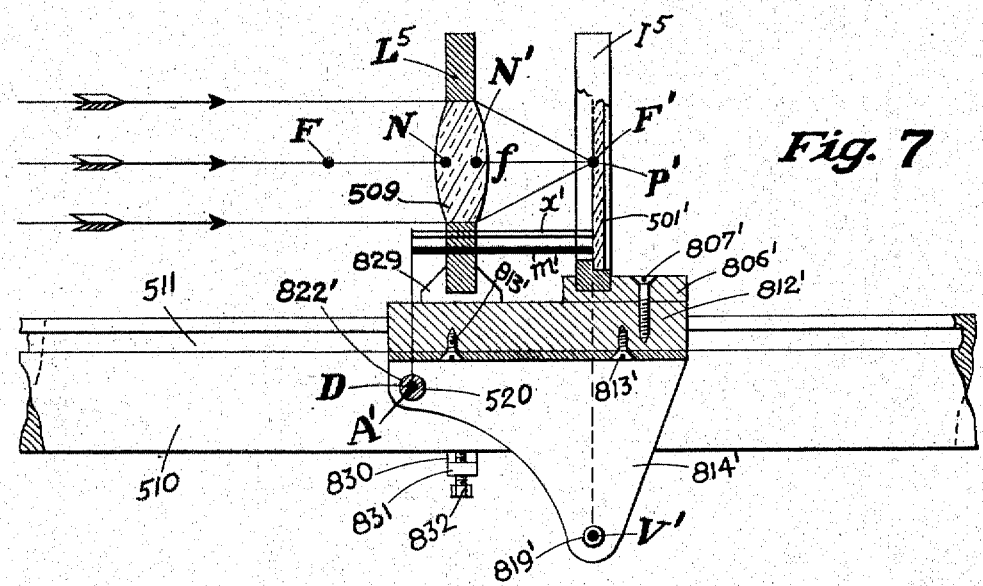
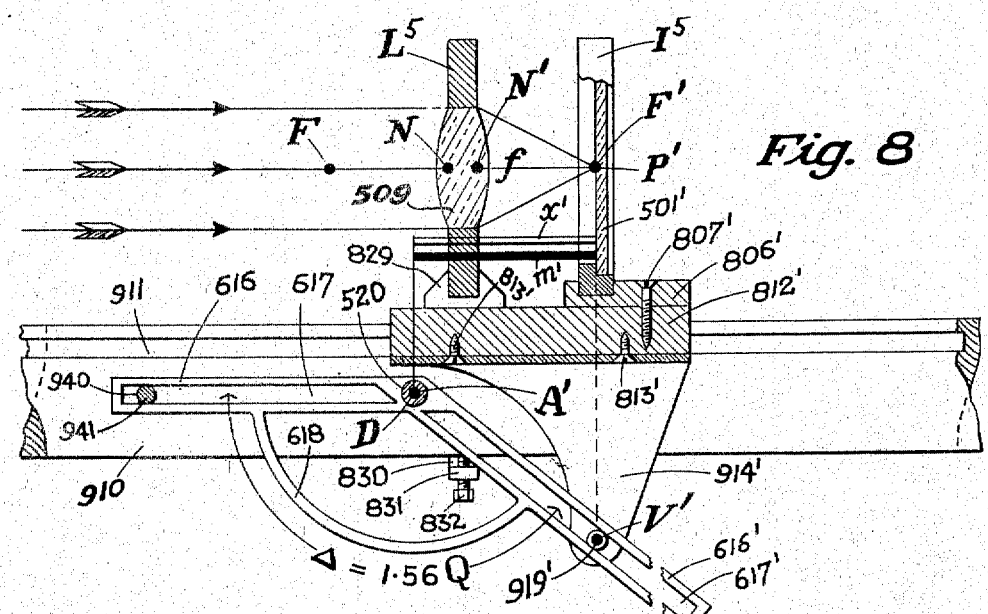

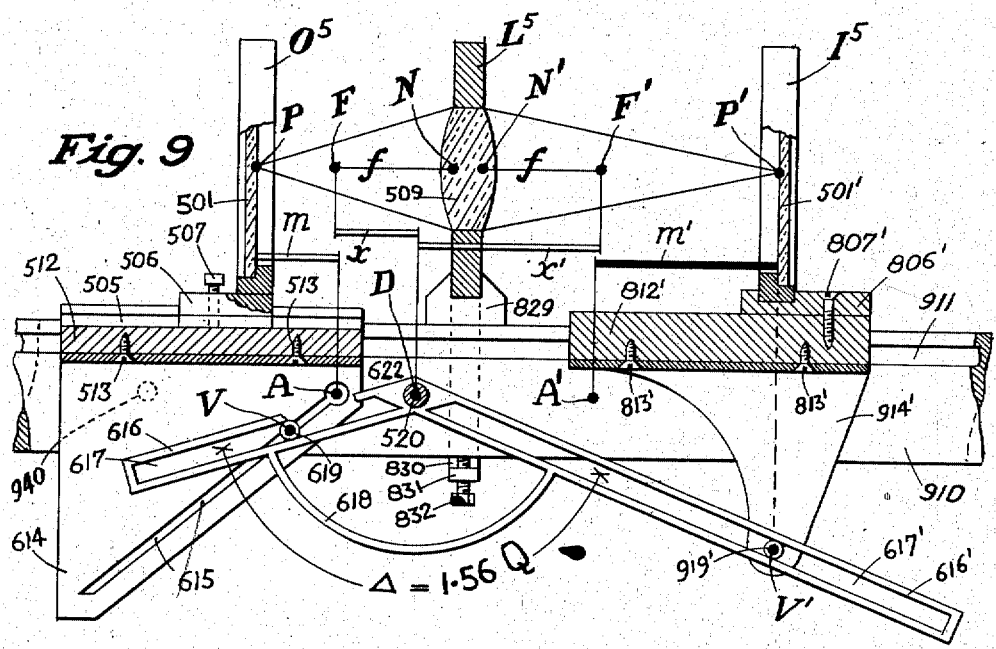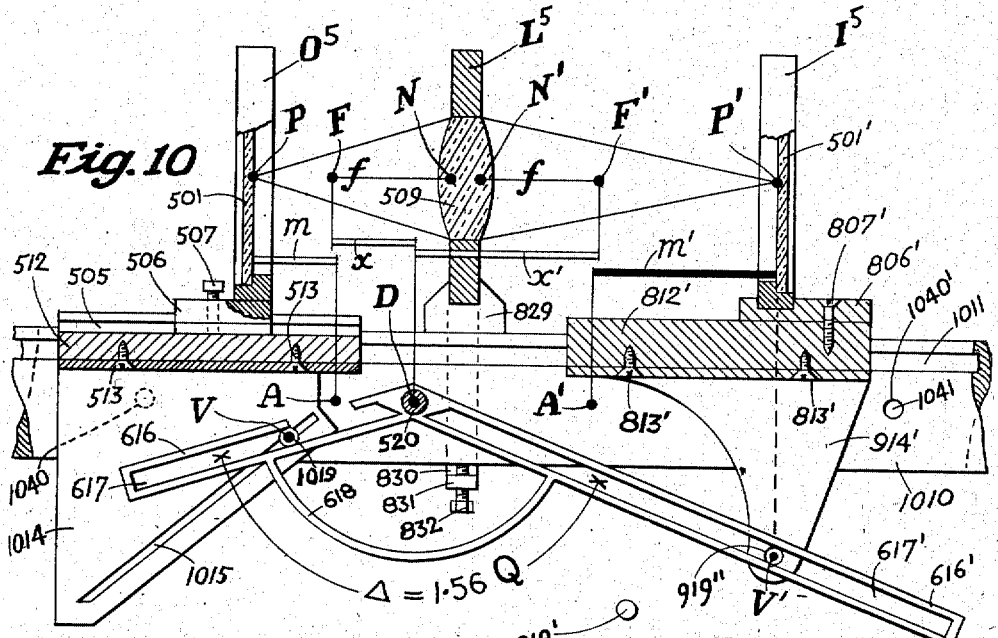

J. BECKER.
PHOTOGRAPHIC CAMERA.
APPLICATION FILED DEC. 11, 1915.
1,301,897.
Patented Apr. 29, 1919.
20 SHEETS—SHEET 6.
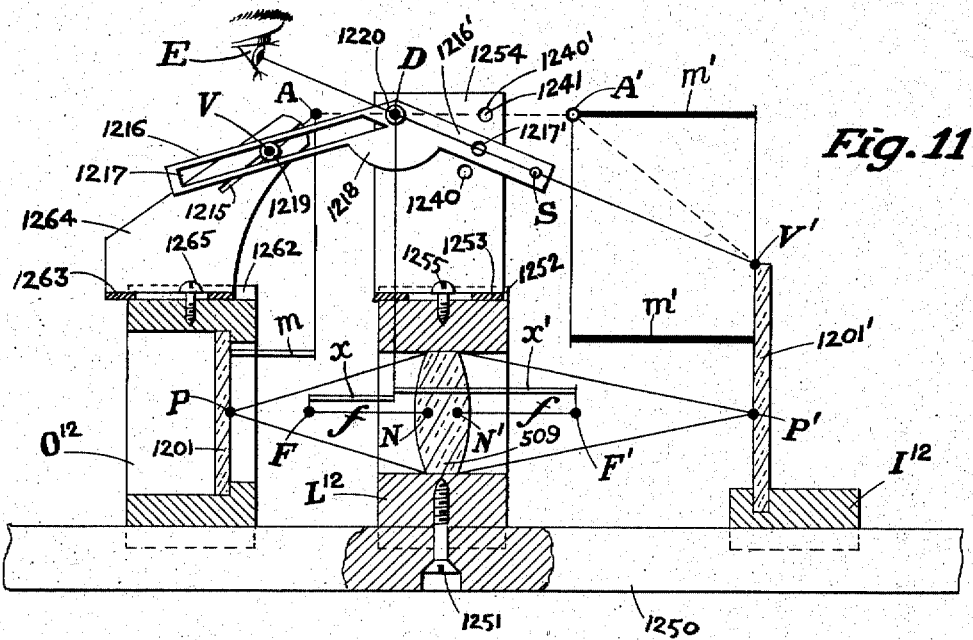
Fig. 11
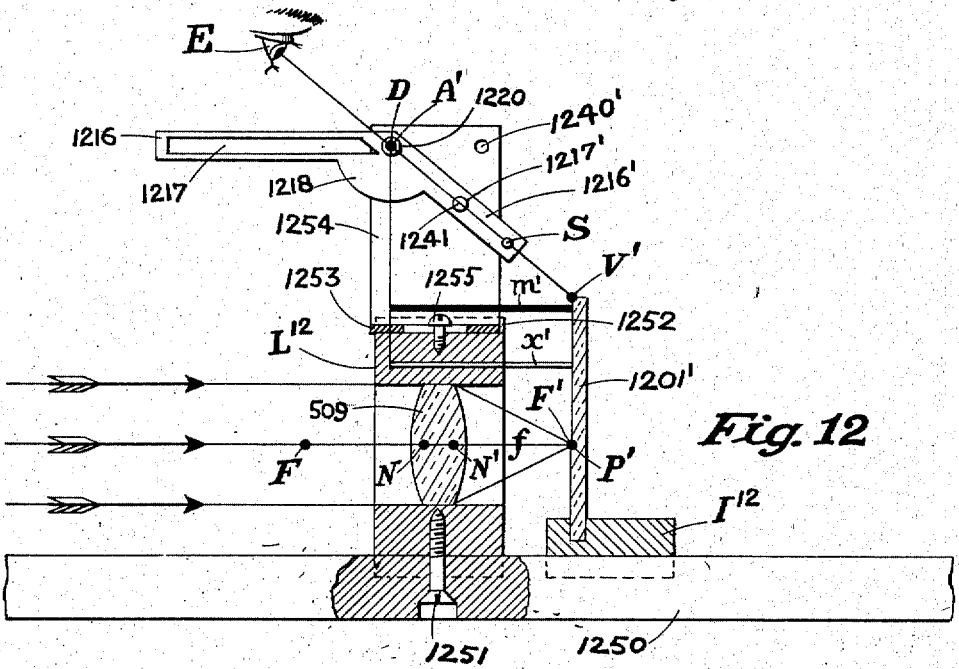
Fig. 12
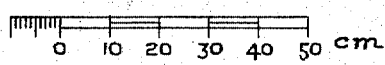
Inventor
Joseph Becker

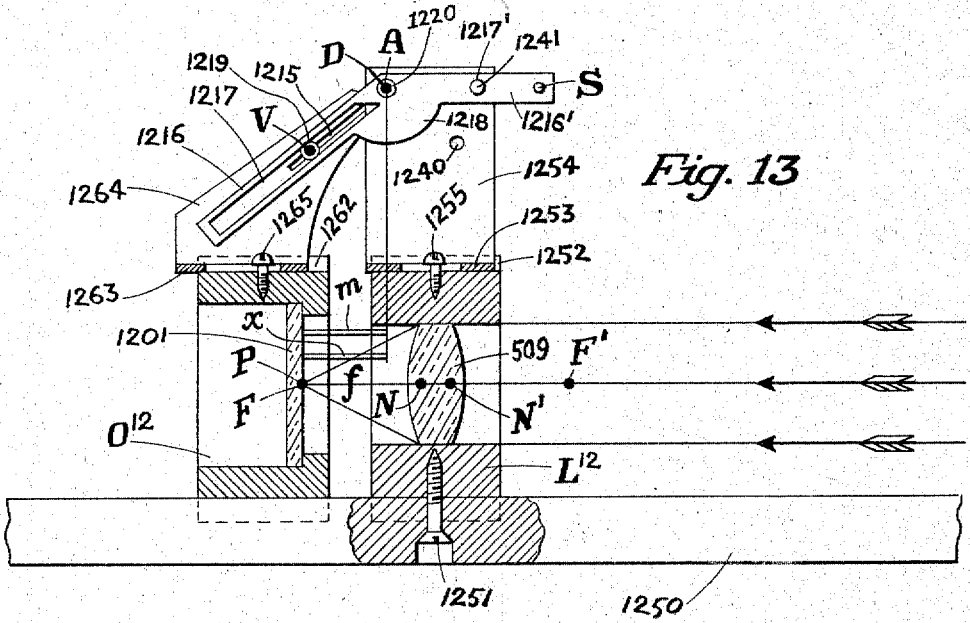
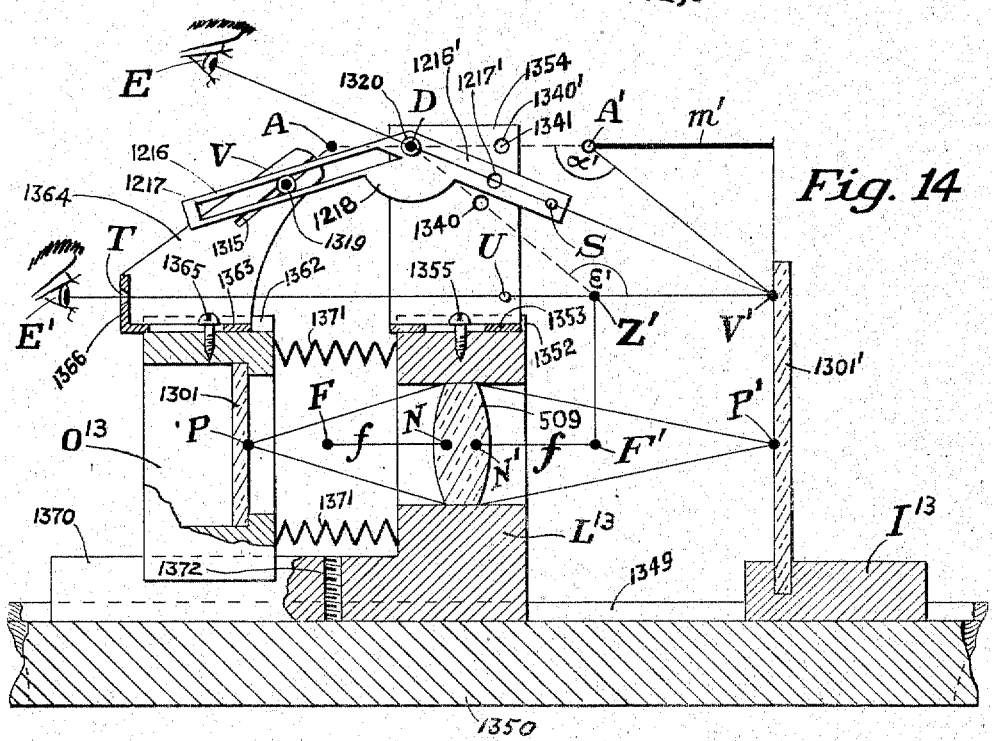
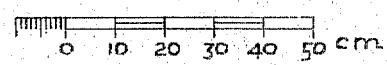

Inventor
Joseph Becker ($\varepsilon' = \Delta = 1.560 \, Q$)

Inventor
Joseph Becker

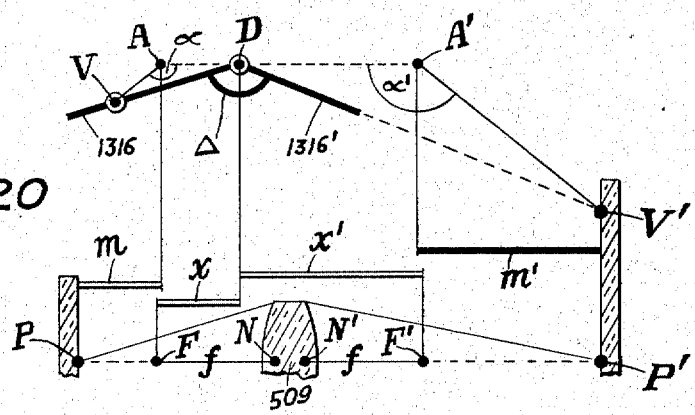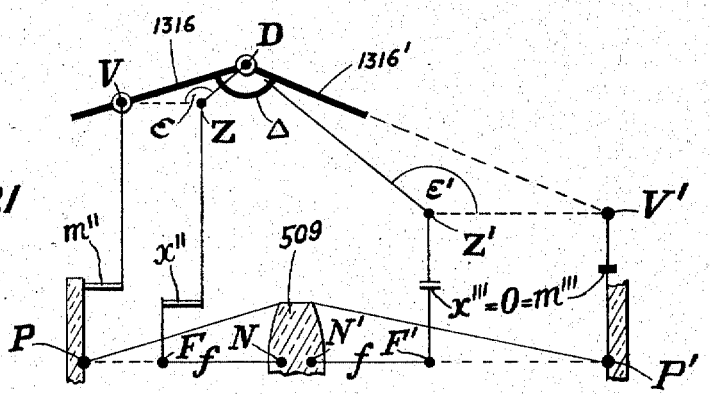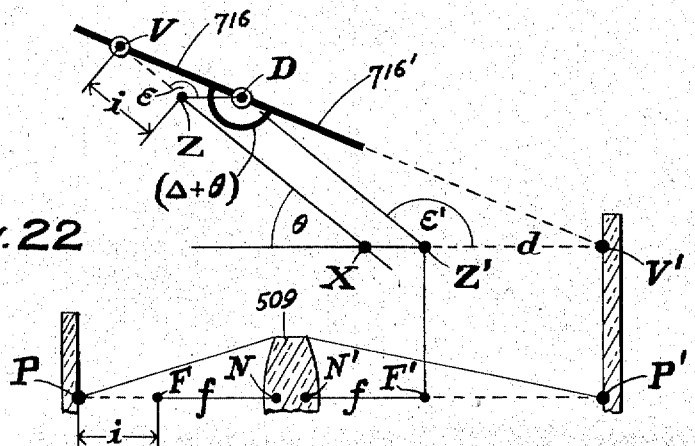

($\varepsilon' = \Delta = 1.000\, Q$)

Inventor
Joseph Becker

J. BECKER.
PHOTOGRAPHIC CAMERA.
APPLICATION FILED DEC. 11, 1915.

1,301,897.

Patented Apr. 29, 1919.
20 SHEETS—SHEET 15.

Inventor
Joseph Becker ($\varepsilon' = \Delta = 0.667 Q$)

Inventor
Joseph Becker

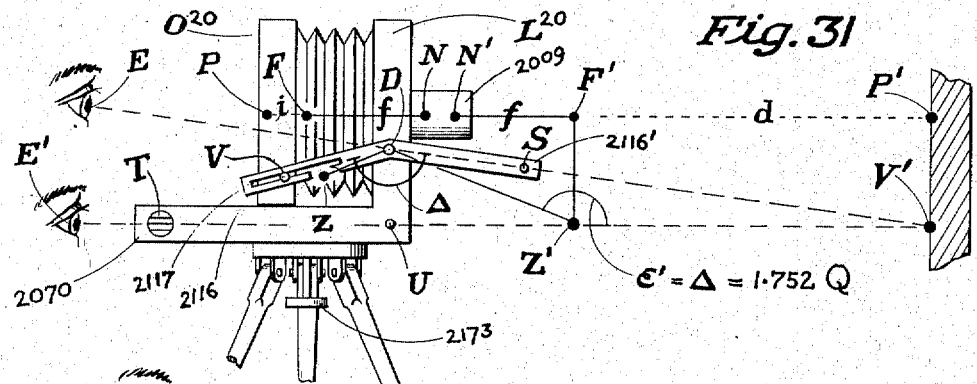
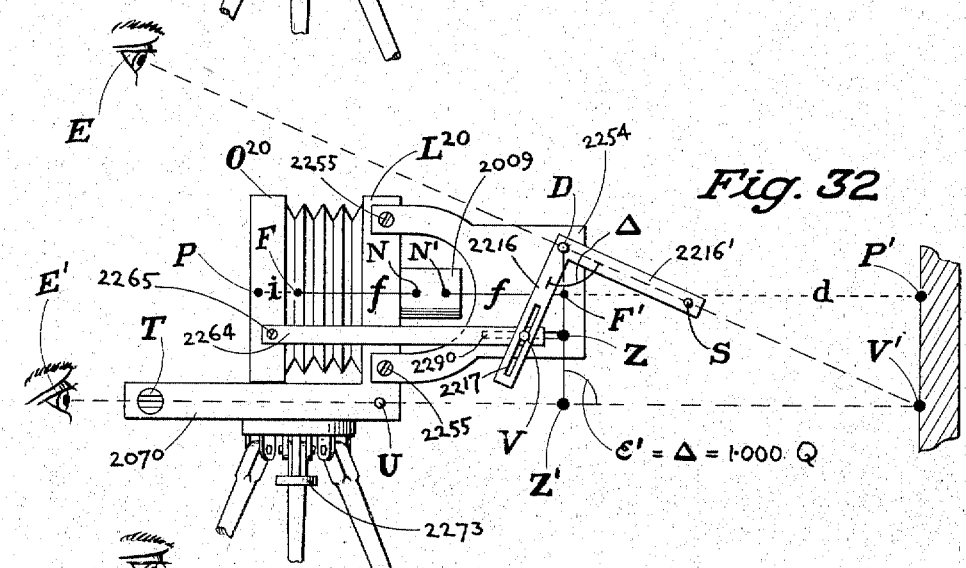
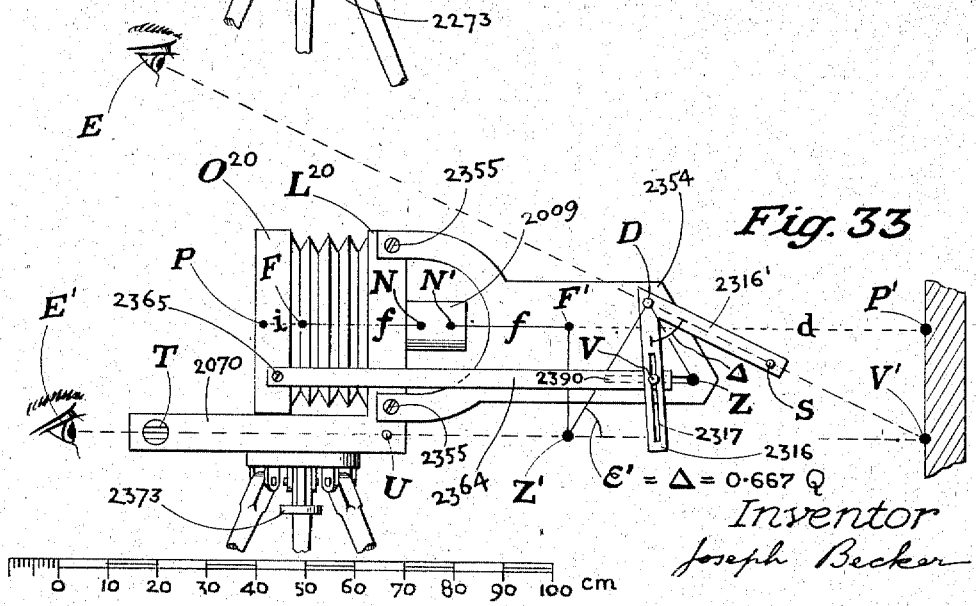

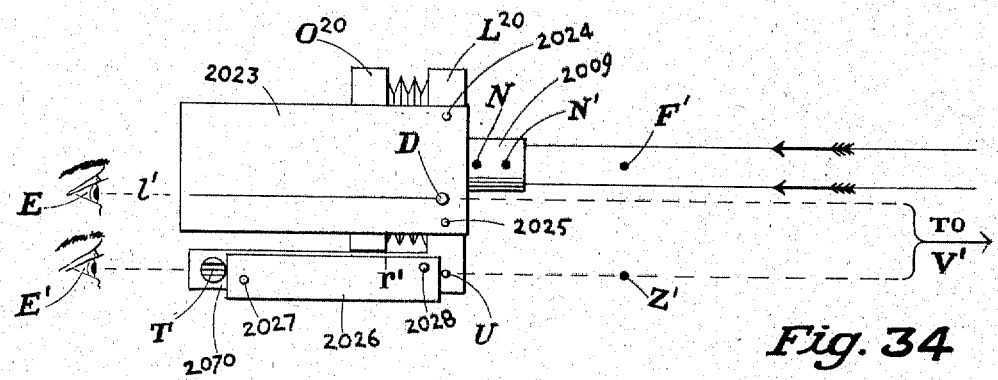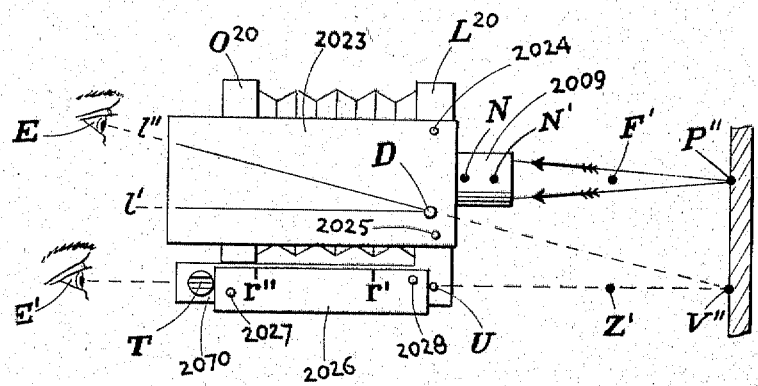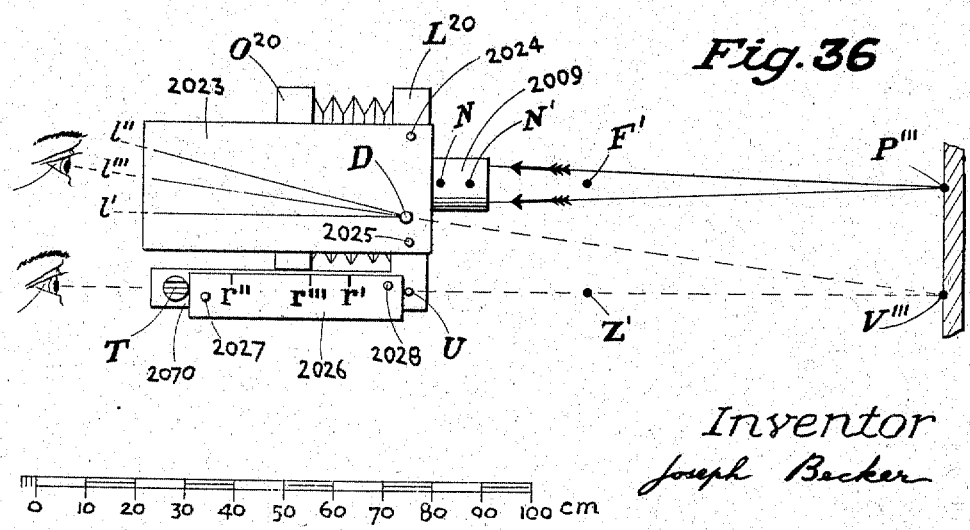

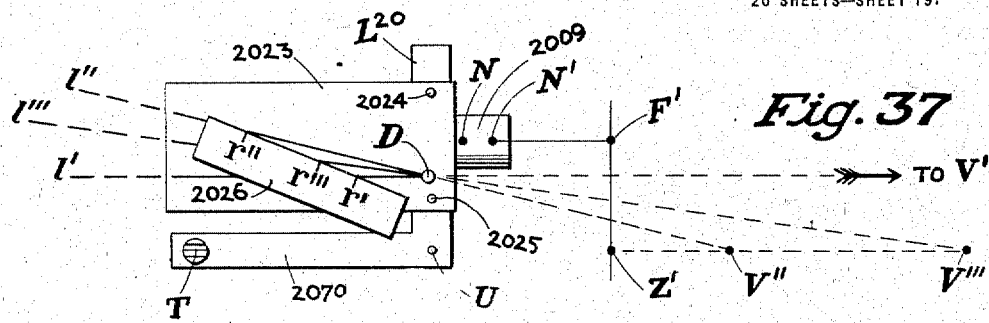
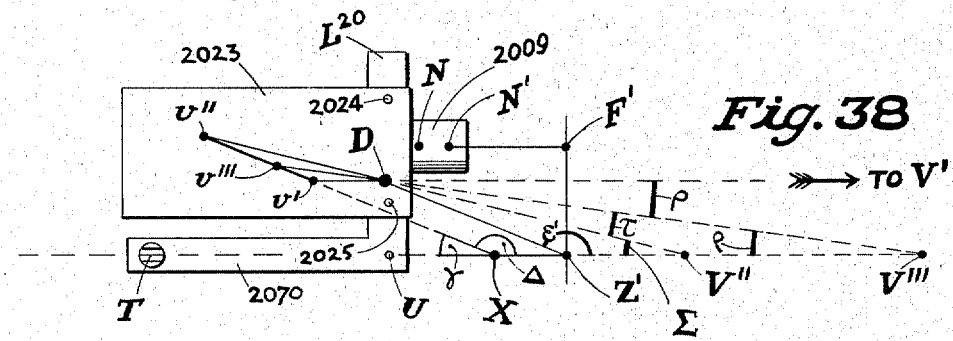
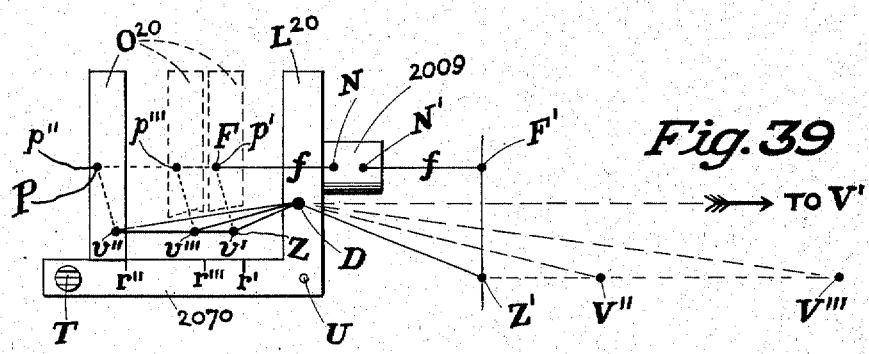
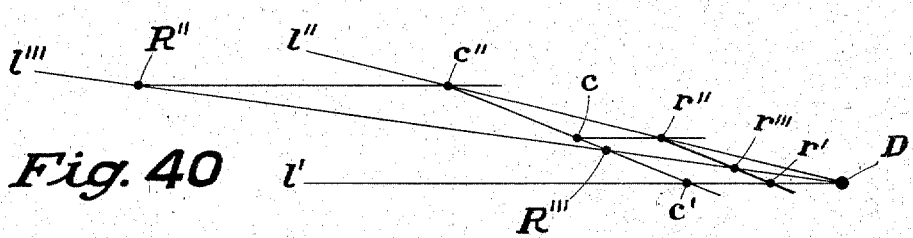

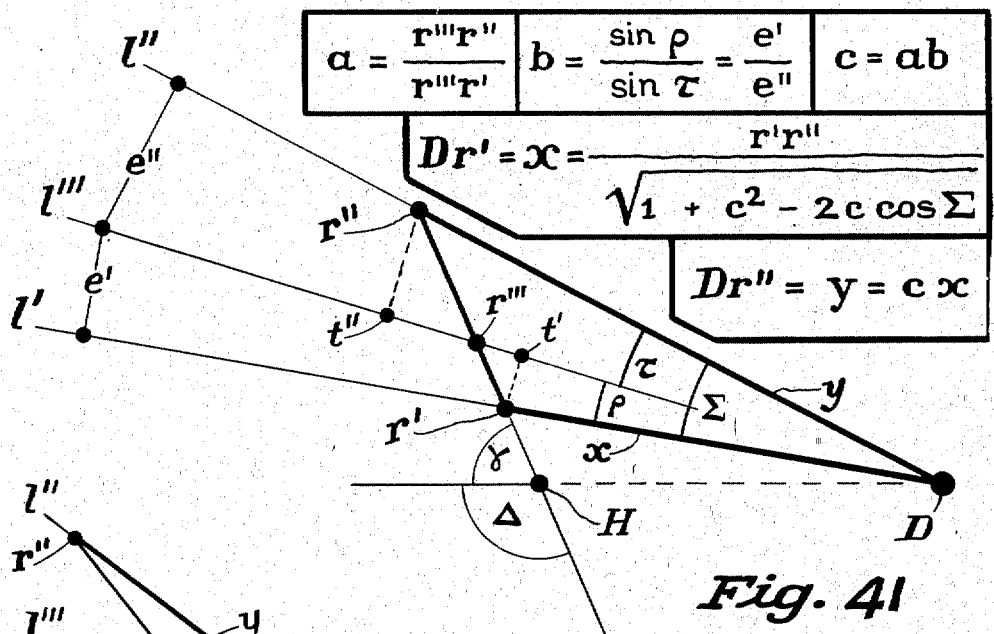
*Fig. 41*
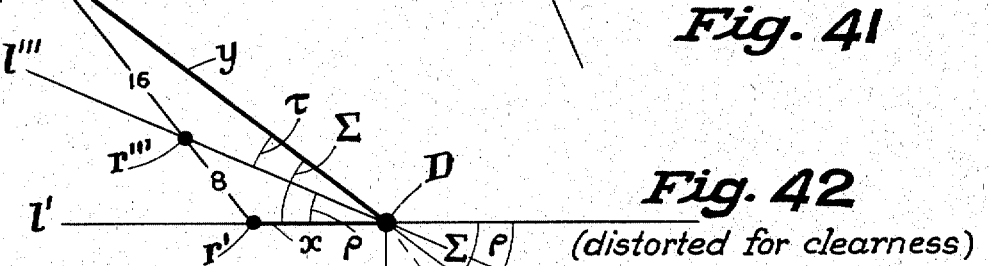
*Fig. 42*
(distorted for clearness)
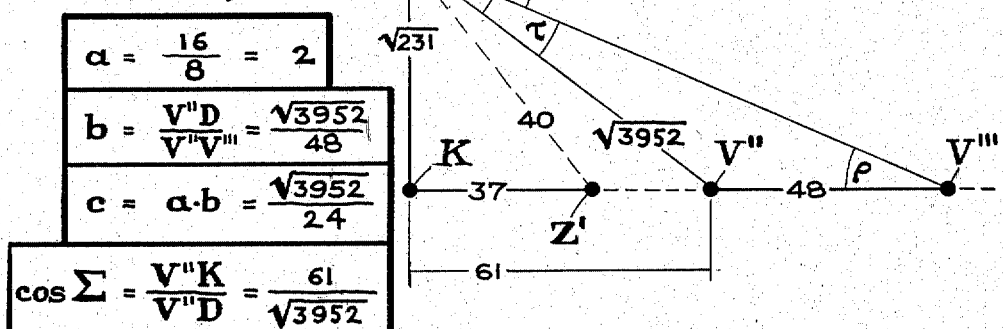
Inventor
Joseph Becker

UNITED STATES PATENT OFFICE.

JOSEPH BECKER, OF WASHINGTON, DISTRICT OF COLUMBIA, ASSIGNOR TO EASTMAN KODAK COMPANY, OF ROCHESTER, NEW YORK, A CORPORATION OF NEW YORK.

PHOTOGRAPHIC CAMERA.

1,301,897.  Specification of Letters Patent.  Patented Apr. 29, 1919.

Application filed December 11, 1915.  Serial No. 66,371.

*To all whom it may concern:*

Be it known that I, JOSEPH BECKER, a citizen of the United States, residing at Washington, in the District of Columbia, have invented certain new and useful Improvements in Photographic Cameras, of which the following is a specification.

The present patent application is identified for convenience of reference in my related applications as Case Ae.

My present Case Ae, and my other hereinafter specifically referred to related applications or patents, may all be listed in their natural, letter name, or filing date order as follows: Case A, Serial No. 26,647, filed August 11, 1900, now Patent 1,178,474 of April 4, 1916; Case B, now Patent 1,178,475 of April 4, 1916; Case C, now Patent 1,178,476 of April 4, 1916; Case D, now Patent 1,190,623 of July 11, 1916; Case F, now Patent 1,195,947 of August 22, 1916; Case I, Serial No. 211,452, filed June 7, 1904, now merged in Cases Af and Aj; Case J, now Patent 1,210,136 of December 26, 1916; Case K, now Patent 1,103,342 of July 14, 1914; Case L, Serial No. 285,802, filed November 4, 1905, now merged in and continued as Case Ac; Case O, now Patent 1,103,343 of July 14, 1914; Case T, now Patent 1,142,295 of June 8, 1915; British Patent 24,292, filed November 1, 1911; Case U, now Patent 1,190,214 of July 4, 1916; Case W, now Patent 1,195,948 of August 22, 1916; Case X, Serial No. 727,548, filed October 24, 1912, now merged in Case Bd; British Patent 29,701, filed December 24, 1912; Case Y, Serial No. 732,488, filed November 20, 1912, now merged in and continued as Case Au; Case Ab, now Patent 1,178,477 of April 4, 1916; British Patent 5,317, filed March 2, 1914; Case Ac, continuing Case L, and identified as Case L¹, now Patent 1,126,352 of January 26, 1915; the present Case Ae, Serial No. 66,371, filed December 11, 1915; Case Af, based on first part of Case I, now Patent 1,178,478 of April 4, 1916; Case Ag or Division One of A, now Patent 1,240,651 of September 18, 1917; Case Ai or Division Two of A, Serial No. 88,619 filed April 3, 1916, now merged in and continued as Case Bc; Case Aj, based on second part of Case I, Serial No. 88,749, filed April 3, 1916; Case Ak or Division Three of A, Serial No. 88,805, filed April 4, 1916, now merged in and continued as Case Ax; Case At, Serial No. 143,085, filed January 18, 1917; Case Au or continuation of Y, now Patent 1,280,638 of October 8, 1918; Case Ax, continuing Case Ak or Division Three of A, now Patent 1,240,788 of September 18, 1917; Case Bc, continuing Ai or Division Two of A, Serial No. 255,491, filed September 24, 1918; Case Bd, merging Case X, Serial No. 258,467, filed October 16, 1918.

The present application relates to improvements in "optical focusers" such as disclosed in my said prior Cases A, B, C, D, F, J, and W.

My present invention consists broadly in providing such "optical focusers" with three separate and preferably independent adjustments, similar to those that I have already used in "mechanical" focusers, to permit of regulating and setting a given focuser for coöperation with any one of different lenses by means of three distinct focusing operations such as referred to, for instance, in lines 10 to 17, page 9, of my said British Patent 29,701 of 1912.

An "optical focuser" with three separate adjustments is already shown in Figure 19 of my said Case A, but the present invention is founded on my comparatively recent discovery of one of the special forms that such three adjustments must have in an "optical focuser" to be absolutely independent and positive, as they are in all of my "mechanical focusers."

An adjustment, in a series of adjustments, is "independent" for all present purposes, if, having been made in its proper order, it is final and complete of its kind, so that it can be made positively and once for all, and will not require the several subsequent corrections which must be made, for instance, in the said Fig. 19 of my said Case A.

Three properly selected separate adjustments, that are also "independent" in the sense here defined, provide three degrees of absolute freedom which permit of securing quickly and positively any desired 3-point correspondence between the focuser and the lens; and the securing of such "3-point" correspondence is, moreover, sufficient, under the Gaussian theory of lenses, to secure an "all-point" correspondence in all cases where the focuser is "theoretically accurate."

Any focuser is "theoretically accurate" if it locates conjugate points P and P' on the axis FNN'F' of a given lens either in strict accordance with Newton's formula, to wit:

$$PF.F'P' = f^2 \quad \text{------(1)}$$

given as equation 4 of my Cases K and O, now Patents 1,103,342 and 1,103,343; or else in strict accordance with the other well known lens formula, to wit:

$$\frac{1}{PN} + \frac{1}{N'P'} = \frac{1}{f} \quad \text{------(2)}$$

These equations 1 and 2 are mathematically equivalent, as proved in my said Case Ae or L¹, or in my said British Patent 5,317 of 1914, and, therefore, so far as the image planes P and P' are concerned, any focuser which acts in accordance with one of these two equations virtually and simultaneously acts in accordance with both.

I have already shown how my "3-point" method of adjustment is to be applied to "mechanical focusers" of all possible forms as follows: first, to theoretically accurate mechanical focusers of the linkage type, in my said Cases K and O, and in my said British Patent 24,292 of 1911; secondly, to theoretically accurate mechanical focusers of the circular cam type, in my Case T; thirdly, to theoretically accurate mechanical focusers of the radial cam type in my said British Patent 29,701 of 1912 and in my said U. S. Cases U and Y; fourthly, in special manner, to a special form of radial cam mechanical focuser, in my said Case X; fifthly, to mechanical focusers of any type whatever, in my said Case Ab.

According to their different degrees of accuracy, and beginning with the most inaccurate to be sure of including all possible forms, "optical focusers" may be classed as: first, optical focusers having no-point correspondence; that is focusers which are always in disagreement with the lens; secondly, optical focusers having exact "one-point" correspondence only; thirdly, optical focusers having exact "two-point" correspondence only, as in the Fig. 57ᵇ camera of my said Case A, which is provided with two substantially independent adjustments to permit of positively securing such 2-point correspondence with any one of different lenses; fourthly, optical focusers having exact "three-point" correspondence only, as in Fig. 26 of my said Case A; fifthly, "theoretically exact" optical focusers having "3-and-all-point," that is to say, "all-point" correspondence, and such are (a) all of the optical focusers seen in Figs. 1 to 24 of my said Case A, (b) all of the optical focusers shown in the annexed drawings.

The Fig. 19 focuser of my said Case A is a theoretically accurate optical focuser in which "3-and-all-point" correspondence is secured by means of 3 separate adjustments, but the first of these three adjustments, to wit, the setting of mirror N³ on slide 33, is purely tentative, so that the other two adjustments, which are positive, must, as a rule, both be made over, several times in succession, or once after each trial setting of N³, before a passably accurate 3-point correspondence can be obtained.

The present application, Case Ae, filed more than 15 years later than my said original optical focuser application Case A, with the main object of completing the invention begun in my said Case A, really contains the first disclosure that I have so far been able to make, in an application for patent, of one manner in which "3-and-all-point correspondence" can be secured in the "theoretically exact" optical focusers of my said Case A, by 3 separate and independent adjustments, each positively and independently determined by a single focusing operation, substantially as in the purely mechanical focusers of my said other prior applications and patents. My second and much simpler solution, of the problem involved in adjusting the Case A—Fig. 19 camera, is disclosed in my said later Case Bc of 1918; but the present application, Case Ae, being the first in historical order, is, nevertheless, relied on to support the broadest adjustment claims.

All focusers illustrated in the accompanying drawings are "theoretically accurate focusers," and no further attention will be paid to "approximately accurate focusers," except in the appended claims, where the broader claims must be sufficiently comprehensive to include the "approximately accurate" forms.

From disclosures hereinafter made it will appear clearly that the theoretically accurate focusers of my said Case A are in principle "radial cam focusers of the obtuse angular type."

Fig. 15 of my said British Patent 29,701 of 1912 illustrates the general principles that must be followed in designing all classes of the "rectangular radial cam focusers of the rectangular type;" that is to say, all radial cam focusers whose operation depends upon two variable but constant product space elements determined by two, more or less concealed, co-varying but always similar rectangular triangles, such as the two triangles VAD and D'A'V' in said Fig. 15, which are and remain rectangular at A and A', or such as the two more or less concealed co-varying triangles CDA and A'D'C' in Fig. 8 of the same patent, which are and remain rectangular at D and D'.

Such radial cam focusers, however, do not necessarily have to be rectangular, for, in accordance with disclosures made in my said Case Y, the "basic angle" delta (Δ) of any given radial cam focuser, that is, the angle which determines the value of the four equal angles A, A', D, D' just referred to, may have any preferred value smaller than a right angle or even larger than a right angle, and radial cam focusing gear may accordingly be of three different types, to wit: type 1, acute angular; type 2, rectangular; type 3, obtuse angular.

My said Case Y relates generally to the three different types as "mechanical focusers" and it makes specific claim to the acute angular type, type 1, because as a mechanical focuser the acute angular gear works more smoothly than any other.

My present application also relates generally to the three different types, but as "optical focusers," and it makes specific claim to the obtuse angular type, type 3, because as an optical focuser the obtuse angular radial cam is the only really practical form.

In view of the fact that the basic angle delta ($\Delta$) should preferably be "acute" in "mechanical" focusers and preferably be "obtuse" in "optical" focusers, such basic angle delta ($\Delta$) is most conveniently measured for present purposes by its numerical relation to the right angle or quadrant as unit angle. Accordingly, every radial cam focuser shown or mentioned in my said Case U and in my said British Patent 29701/12, including even the "derived" straight lever form of Marks referred to in Note 20 on page 13 of the said British patent, has a "basic angle" delta ($\Delta$) that is equal to unity or to one quadrant (1.00 Q).

My said Case Y relates mainly to radial cams with a basic angle delta ($\Delta$) smaller than 1.00 Q, and my present application relates mainly to radial cams with a basic angle delta ($\Delta$) larger than 1.00 Q.

The subject being difficult, even when presented in its simplest form, it seemed desirable to write the present specification in accordance with the following definite plan: First, a simple and easily understood "mechanical focuser" of the "obtuse angular type" is completely described with all its adjustments in Figs. 1 to 4, and its basic angle delta ($\Delta$), selected equal to 1.20 Q, is made not much larger than a right angle, in order that the device shall be nearly as good mechanically as a "rectangular" focuser; secondly, in Figs. 5 to 10 the specification describes a series of "mechanical focusers" also of the "obtuse angular type," but all with a basic angle delta ($\Delta$) of 1.56 Q, which is altogether too large to make a good "mechanical focuser," but sufficiently large to make a good "optical" focuser; thirdly, in Figs. 10 to 15 we have "optical focusers" that are derived from the "mechanical focuser" of Fig. 6 by a gradual evolution which runs from Fig. 6 to Fig. 15 through the camera of Fig. 7, that of Figs. 8 and 9, that of Fig. 10 and that of Figs. 11 to 14 to and including Fig. 15, without making any change whatever in the basic angle delta ($\Delta$) or in any other fundamental dimension of the focuser; fourthly, the preferred compact form of the simplest optical focuser is shown in Figs. 16 and 17; fifthly, optical focusers of the "rectangular type" and optical focusers of the "acute angular type" are discussed with other theoretical questions in Figs. 18 to 33; sixthly, and finally, the direct 3-point method of determining focuser dimensions, first disclosed in my said Case A, is fully described in Figs. 34 to 37, explained in Figs. 38 to 39, and established on a firm and precise mathematical foundation with the aid of the diagram Figs. 40 to 42.

To avoid needless complications and to secure clearness of illustration, the lens in all the views excepting Fig. 41, which is an arbitrary diagram, is supposed to have the same focal length $f$, equal FN, equal N'F', equal 24 centimeters; also the same relatively large internodal space NN' equal to plus 6 centimeters.

The several figures will now be described in detail as follows:

Fig. 1 shows a fully adjusted and regulated copying or enlarging camera with a radial cam focusing gear whose basic angle delta ($\Delta$) is 1.20 Q, or twenty per cent. larger than a right angle, and which is shown set to hold the end frames in proper relation for copying factor $n$ equal 1.5, to copy one and a half times actual size.

Fig. 2 illustrates my infinity method for automatically determining the principal, and here adjustable, horizontal dimension $m$ of the left hand carriage of Fig. 1.

Fig. 5 is the camera of Fig. 1 provided with a more obtuse radial cam focusing gear whose basic angle delta ($\Delta$) is 1.56 Q, or fifty six per cent. larger than a right angle; all fundamental linear dimensions are the same as in Fig. 1; the copying factor, $n$ equal 1.5, is also the same; but parts that are peculiar to this Fig. 5 camera have reference numerals beginning with 6.

Fig. 6 is the camera of Fig. 5 with its linear elements AV and A'V' adjusted to the different correctly acting pair of values which brings the right hand pintle V' into the downwardly produced part of the image plane P'; all other fundamental dimensions and the copying factor, $n$ equal 1.5, are the same as in Fig. 5.

Figure 3:
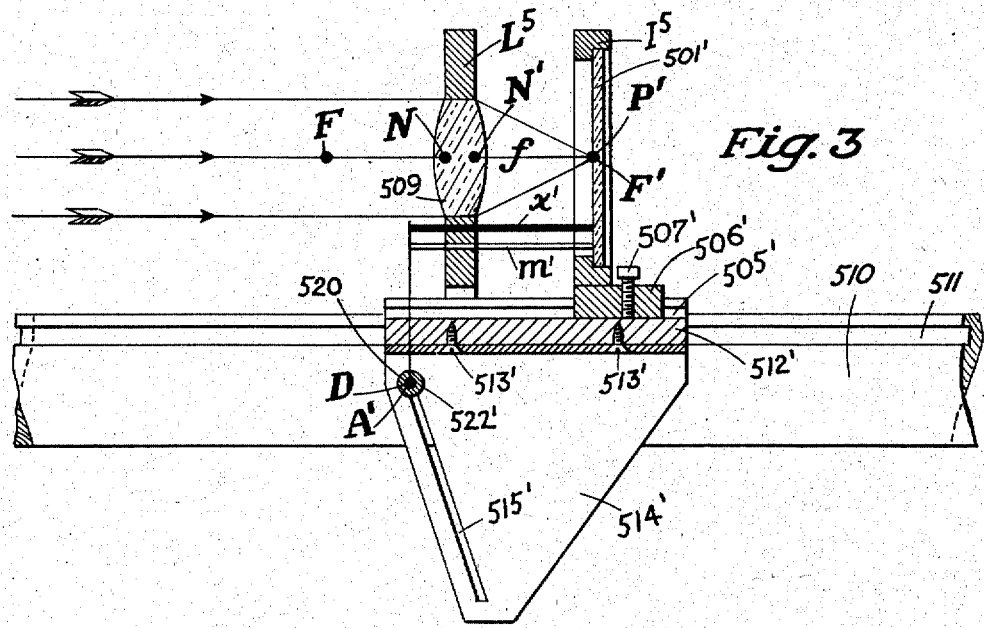
Fig. 3 illustrates my infinity method for automatically determining the principal, and here adjustable, horizontal dimension $m'$ of the right hand carriage of Fig. 1.

Fig. 7 shows a modified form of the right hand carriage of Fig. 6, in which the right hand pintle V' is permanently fixed in the downwardly produced part of the image plane P'; dimension m' is thus made non-adjustable and this necessitates a longitudinal adjustment of the middle or lens frame on the camera bed to permit of varying the horizontal distance x' of the right hand focal plane F' from the, here fixed, axis D; parts that are peculiar to this Fig. 7 camera have reference numerals beginning with 8.

Fig. 8 shows a further modification of the same carriage by which the terminal A' of Fig. 7 is made imaginary, all adjustments being as in Fig. 7; parts peculiar to this Fig. 8 camera have reference numerals beginning with 9.

Fig. 9 shows the camera of Fig. 8 complete, with all its principal linear and angular dimensions identically the same as in Fig. 6; the copying factor, n equal 1.5, being also the same.

Fig. 10 is a modification of the camera of Figs. 8 and 9 by which the terminal A of the left hand carriage is made imaginary; parts peculiar to this Fig. 10 camera have reference numerals beginning with 10.

Fig. 11 shows a camera very different in appearance from the camera of Fig. 10, but derived therefrom and having exactly the same fundamental angular and linear dimensions; also the same adjustments; the radial cam, however, has one of its arms converted into an alidade or sighting arm DS to form what may be called a "single sight" optical focuser; here an entirely new set of reference numerals beginning with 12 is used.

Fig. 12 illustrates my infinity method for automatically determining the principal, and here adjustable, horizontal dimension x' of the middle or lens frame of Fig. 11.

Fig. 13 illustrates my infinity method for automatically determining the principal, and here adjustable, dimension m of the left hand carriage of Fig. 11.

Fig. 14 shows a modified form of the copying or enlarging camera of Fig. 11, in which part of the device is adapted for general and independent use as a landscape or portrait camera; this result being secured mainly by the addition of a second sighting line TU to form what may be called a "double sight" optical focuser; parts peculiar to this Fig. 14 camera have reference numerals beginning with 13.

Figure 15:
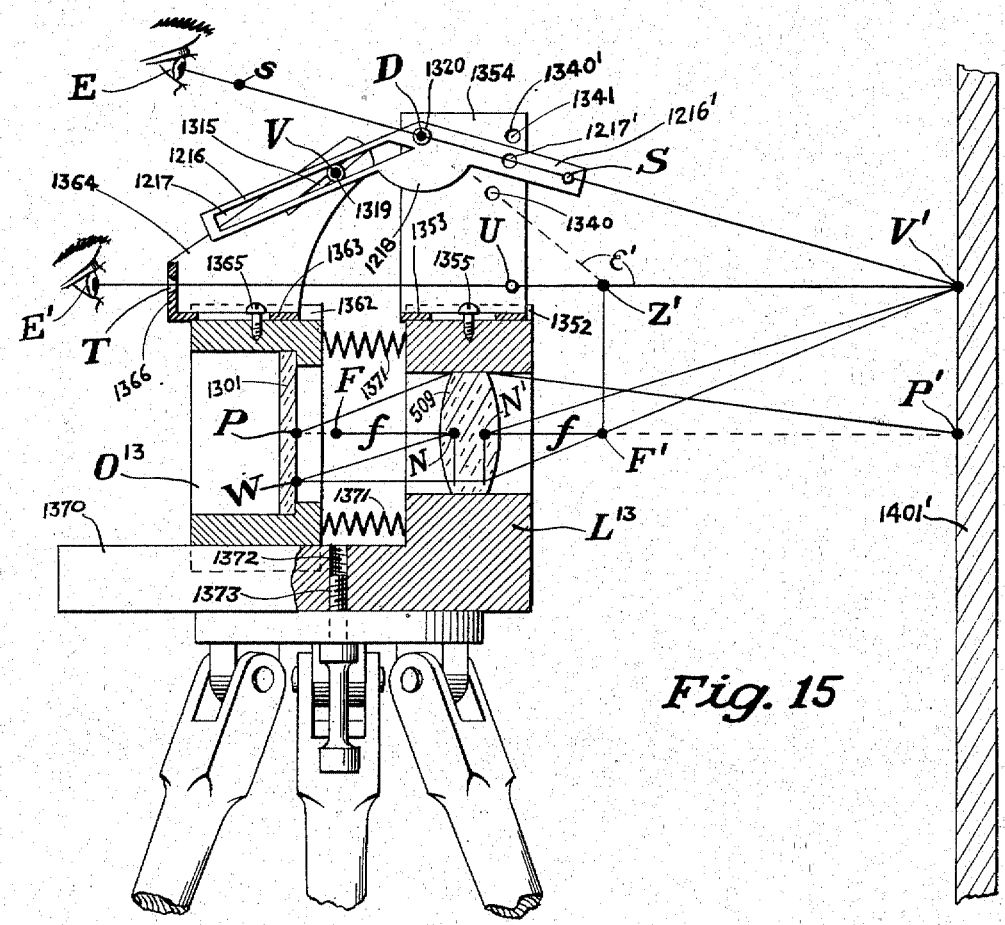

Fig. 15 shows the landscape or portrait camera part of Fig. 14 mounted on a tripod for general use and shown set in focus on point V' of a vertical plane object whose distance F'P' may be increased continuously without limit or to infinity; this because the radial sighting arm DS is virtually extensible to infinity, and at the same time the lower sighting line TU is also extensible to infinity and replaces an infinitely long camera bed necessary in Fig. 14 or Fig. 11.

Figure 16:
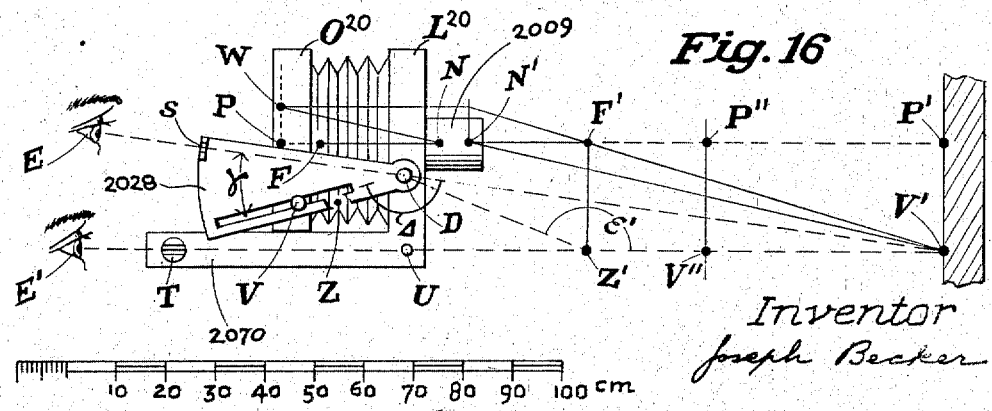

Fig. 16 shows the camera of Fig. 15 with the focuser parts proportioned and arranged so as to avoid outwardly extending parts and brackets, all adjustments being omitted from the view for clearness; here a new set of reference numerals beginning with 20 is required.

Figure 17:
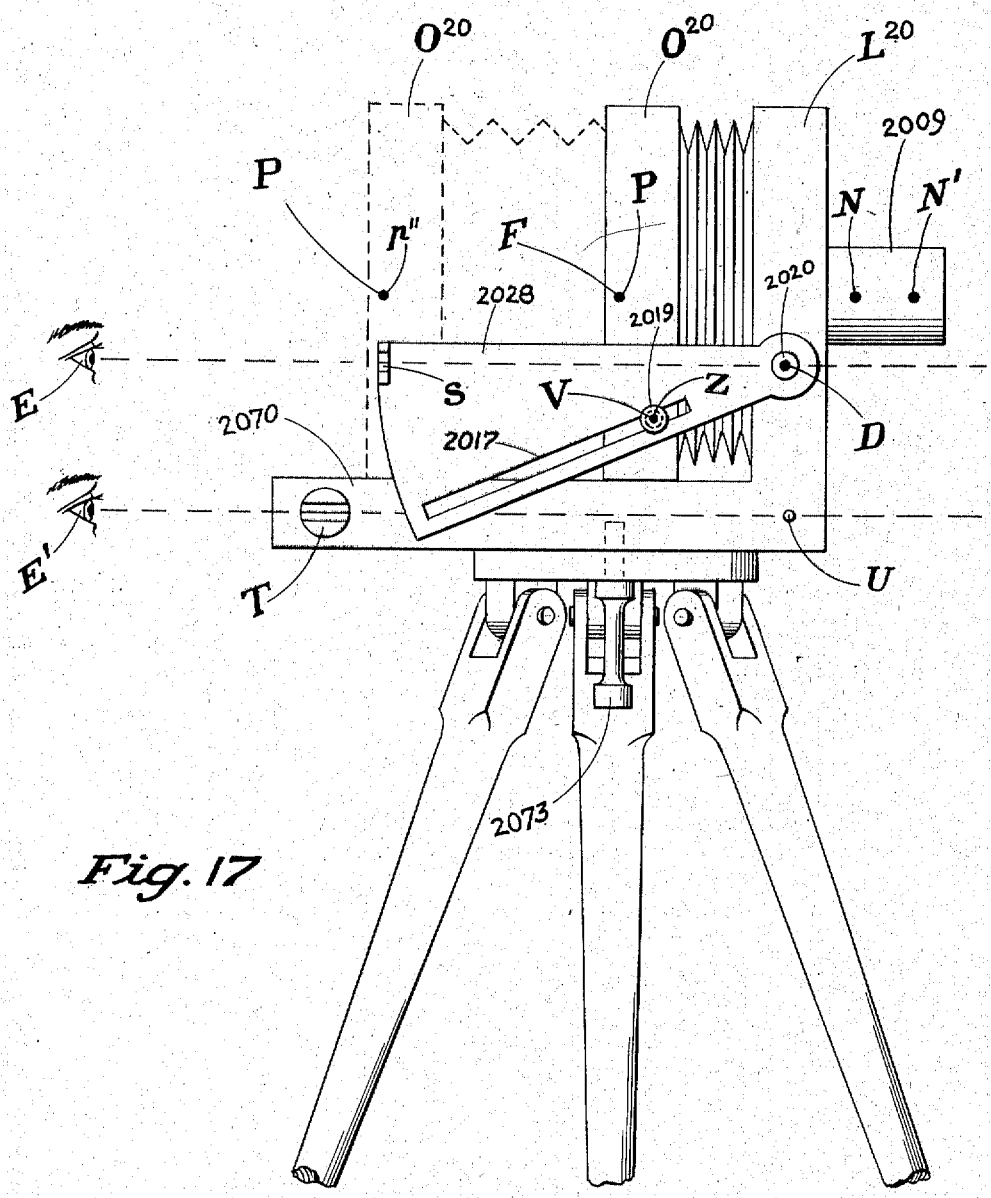

Fig. 17 shows the camera of Fig. 16 on an enlarged scale and in position of use on a tripod.

Figure 18:
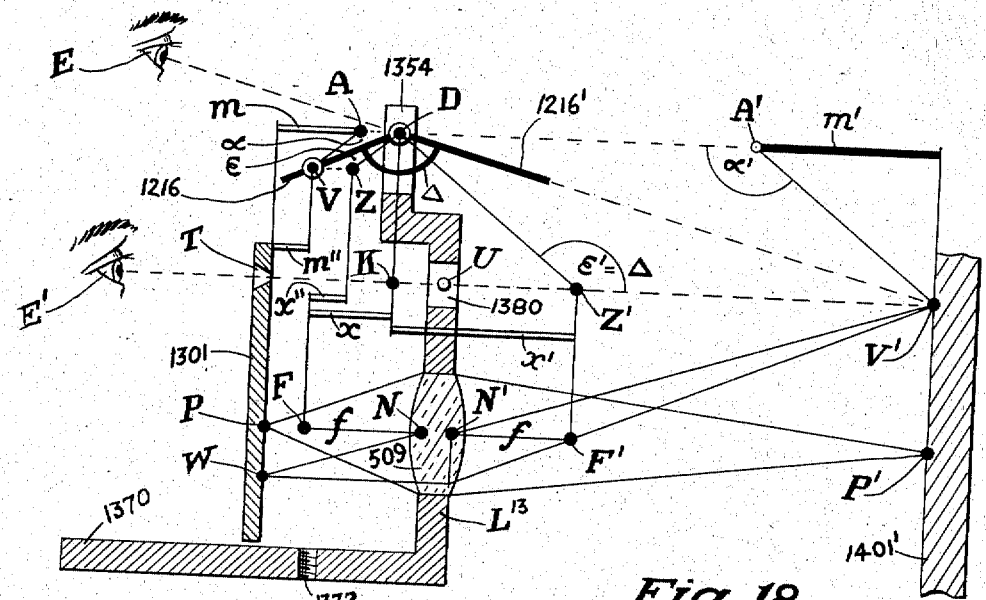

Fig. 18 is a diagrammatic representation of the Fig. 15 camera minus the bellows, but with all the theoretical elements included.

Figure 19:
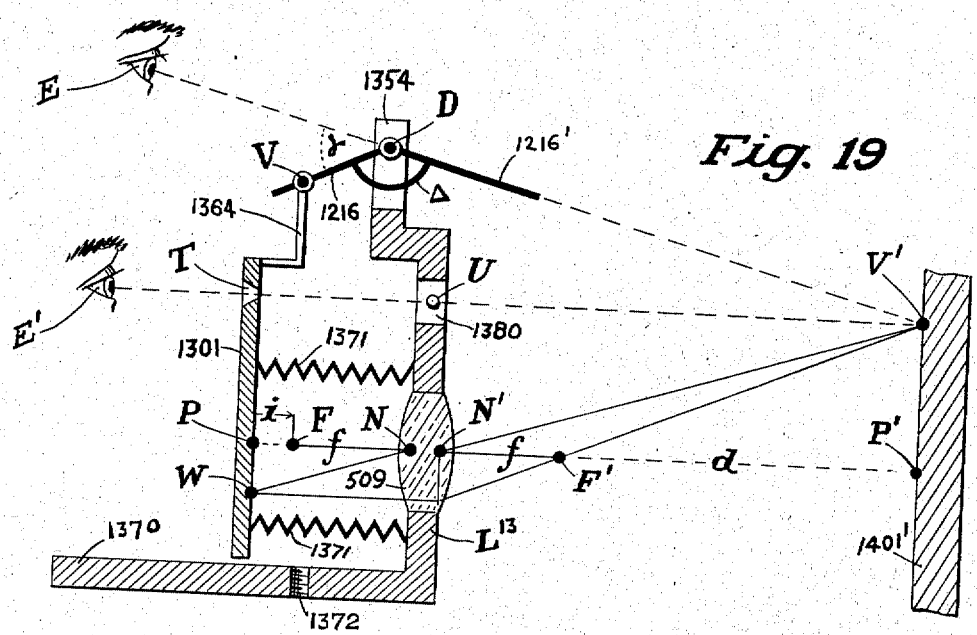

Fig. 19 is Fig. 18 with bellows added and nearly all of the purely theoretical elements omitted so as to constitute a diagrammatic representation showing the Fig. 15 camera substantially as it is after adjustment; that is to say, as being virtually reduced to three relatively movable rigid elements.

Fig. 20 is a diagram of one set of fundamental linear and angular elements of Fig. 15.

Fig. 21 is a similar diagram of a different but equivalent set of fundamental lines and angles in the same Fig. 15 camera.

Fig. 22 is a diagram derived directly from Fig. 21 and showing the "straight lever" form of radial cam that is the nearest equivalent of the "bent lever" in Figs. 14 and 11, or of the "bent lever" in Figs. 10, 9, and 6; as an optical focuser it corresponds to the one shown in Figs. 1 to 3 of my said prior application, Case A, Serial No. 26,647; the two radial arms 716 and 716' here form a diametral bar.

Figure 4:
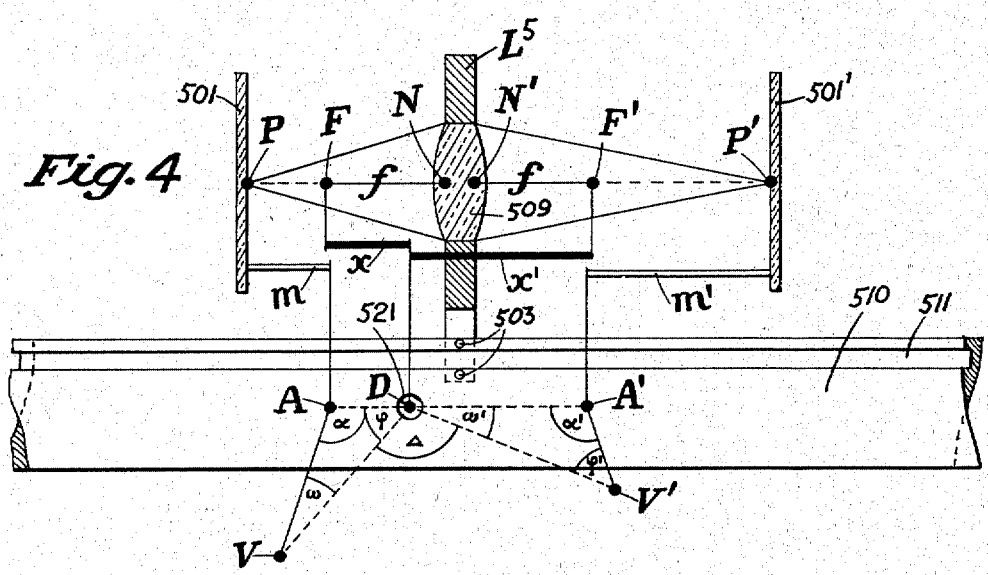
Fig. 4 is a diagram of all the fundamental linear and angular elements in Fig. 1.
Figure 23:
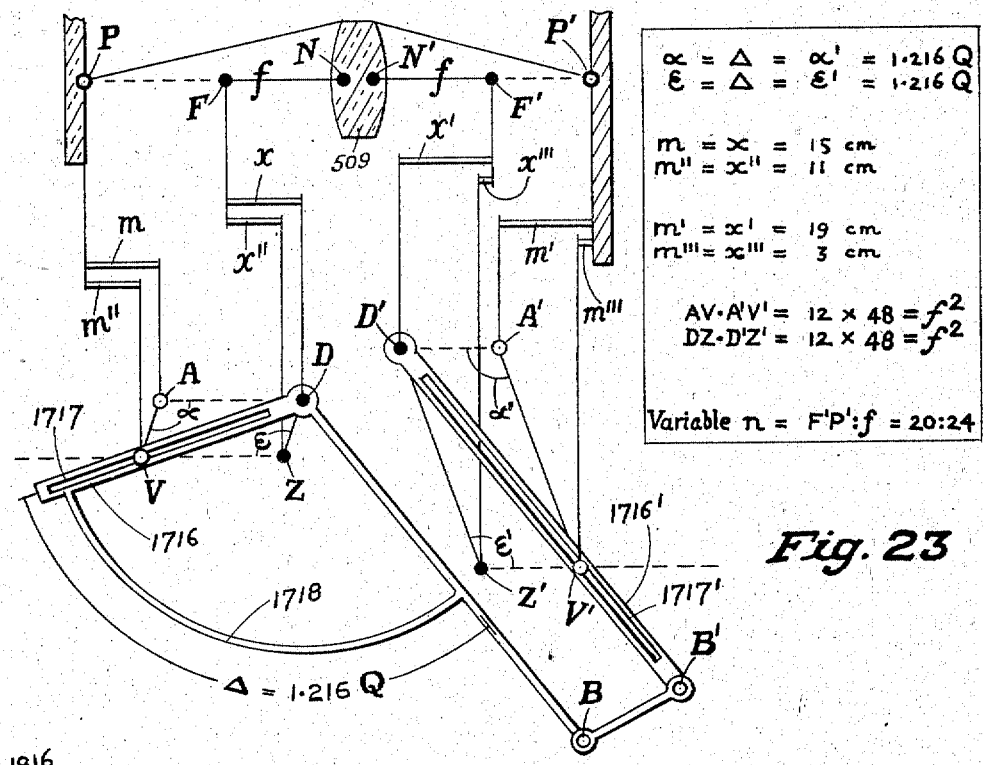

Fig. 23, corresponding to Fig. 15 of my said British patent 29701/12 and to Fig. 4 of my said Case Y, is a diagram of a complete form of "obtuse angular" radial cam focuser with all theoretical elements included and plotted to scale in accordance with the dimensions given in the list of equations that is annexed to the figure as a part thereof; here a new set of reference numerals is used beginning with 17.

Figure 24:
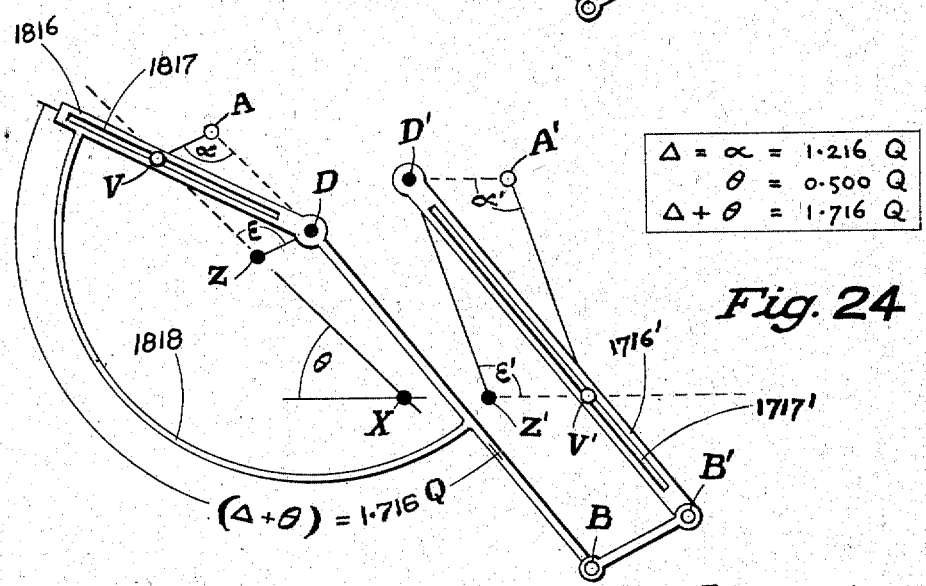

Fig. 24 shows, in part, a more general form of the obtuse angular focuser of Fig. 23, in which the paths of pintles V and V' are inclined at an angle theta ($\theta$), instead of being simply parallel as they are in Fig. 23 and in all the other figures except Fig. 22, and the object of this Fig. 24 is to illustrate the rule that the relative inclination of the two radial cams is really equal to the sum delta plus theta ($\Delta+\theta$), which reduces to delta ($\Delta$) in the normal forms because theta ($\theta$) in such normal forms is nil; parts that are peculiar to this Fig. 24 have reference numerals beginning with 18.

Figure 25:
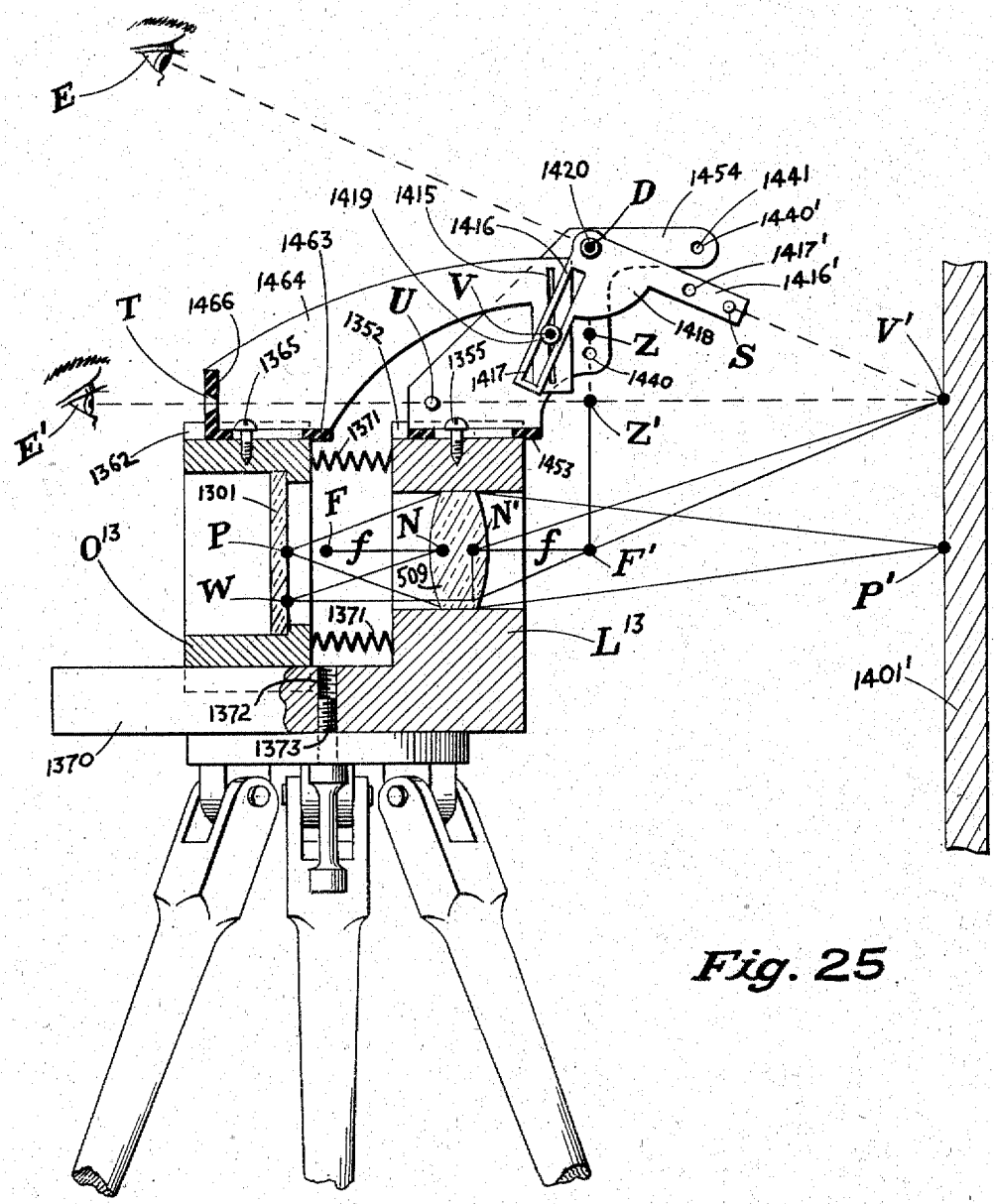

Fig. 25 is the camera of Fig. 15 as combined with an optical focuser of the "rectangular type," all adjustments being substantially the same as in the "obtuse angular" focuser of Fig. 15; parts that are peculiar to this Fig. 25 camera have reference numerals beginning with 14.

Figure 26:
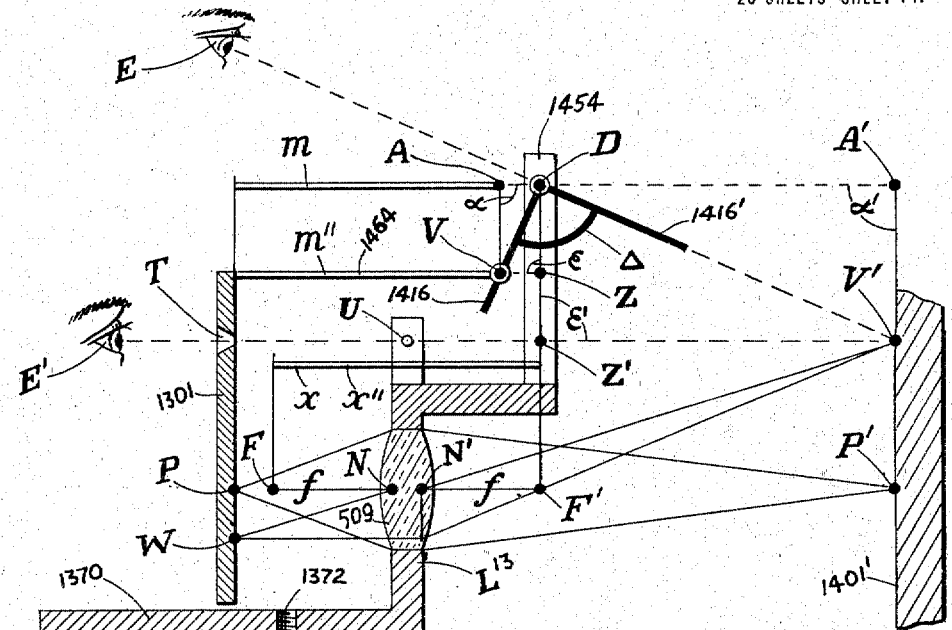

Fig. 26 is a diagrammatic representation of the Fig. 25 camera minus its bellows, but with all of its theoretical elements included.

Figure 27:
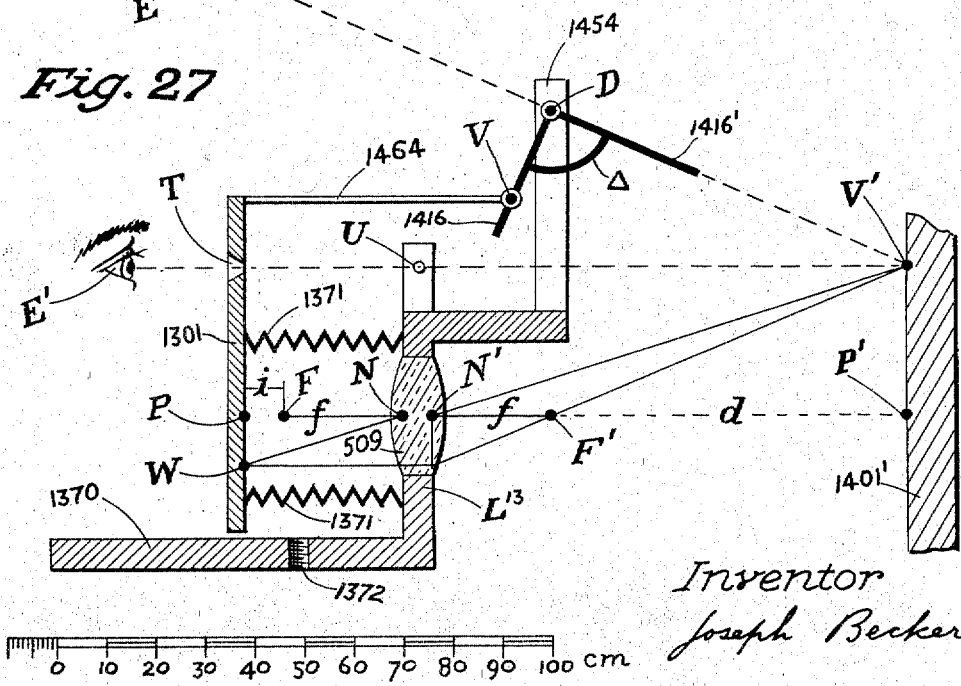

Fig. 27 is Fig. 26 with bellows added and nearly all of the purely theoretical elements omitted, so as to constitute a diagrammatic representation showing the Fig. 25 camera substantially as it is after adjustment; that is to say, as being virtually reduced to three relatively movable rigid elements.

Figure 28:
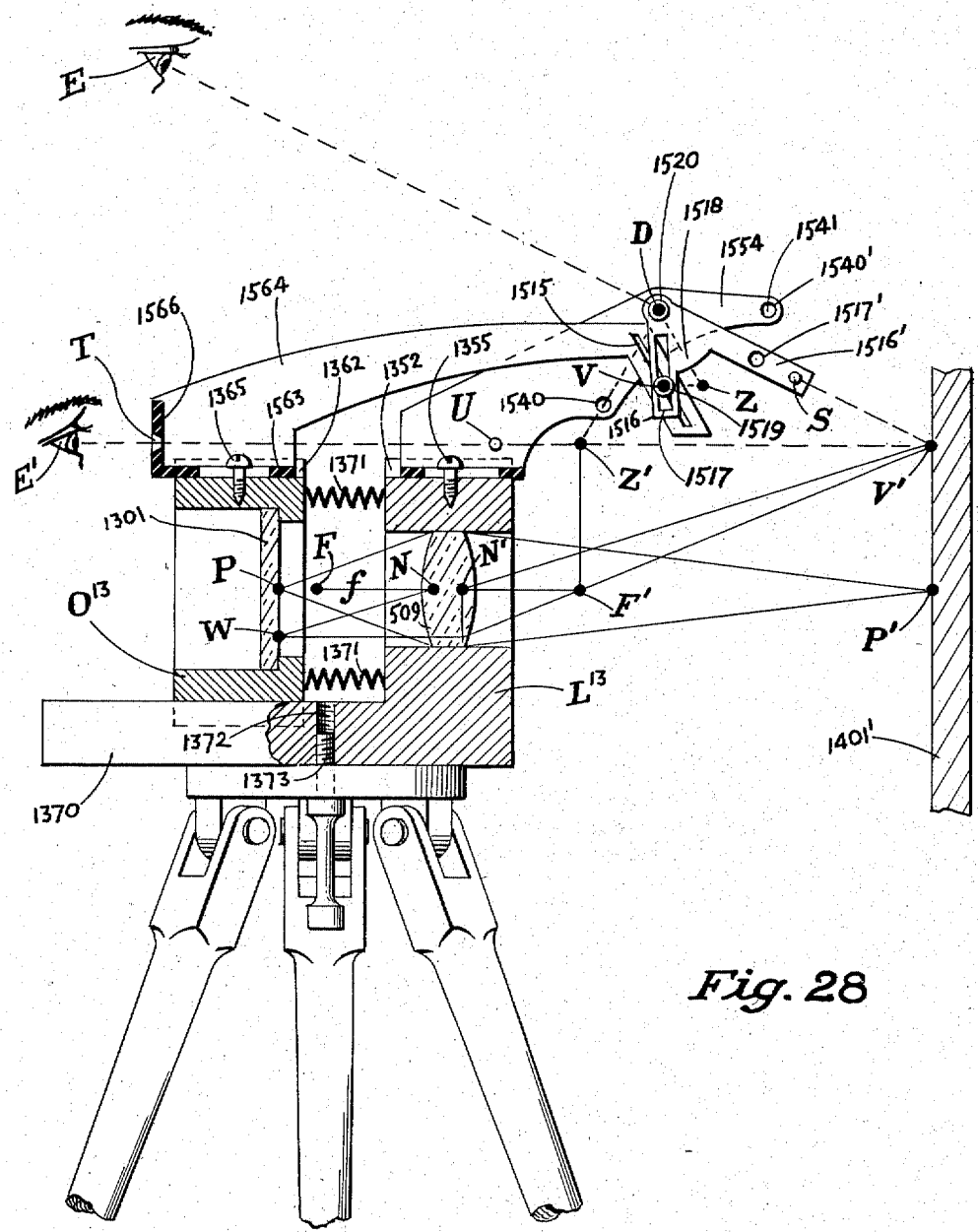

Fig. 28 is the Fig. 15 camera as combined with an optical focuser of the "acute angular type," all adjustments being substantially the same as in the "obtuse angular" focuser of Fig. 15; parts that are peculiar to this Fig. 28 camera have reference numerals beginning with 15.

Figure 29:
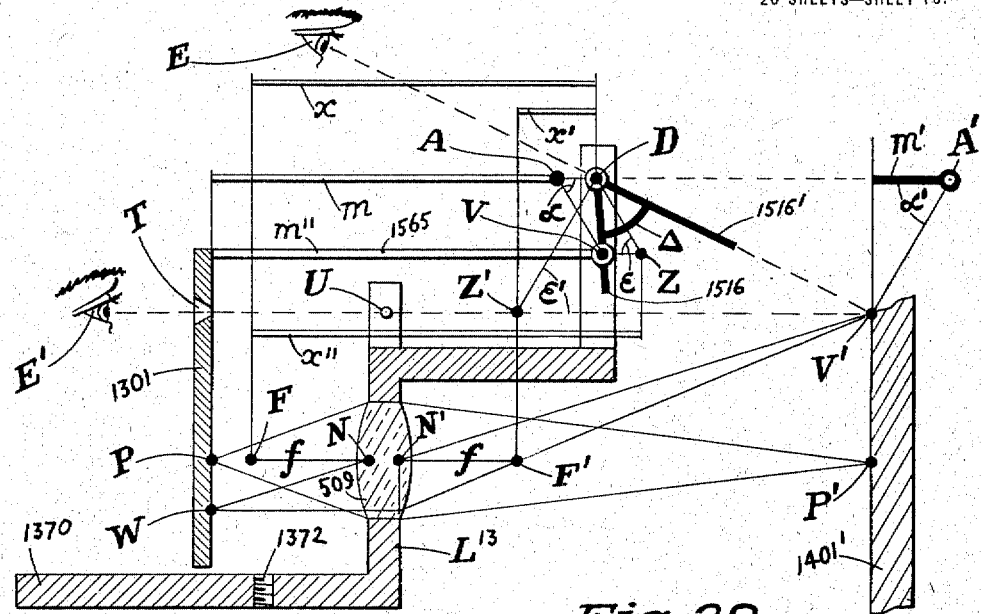

Fig. 29 is a diagrammatic representation of the Fig. 28 camera minus its bellows, but with all of its theoretical elements included.

Figure 30:
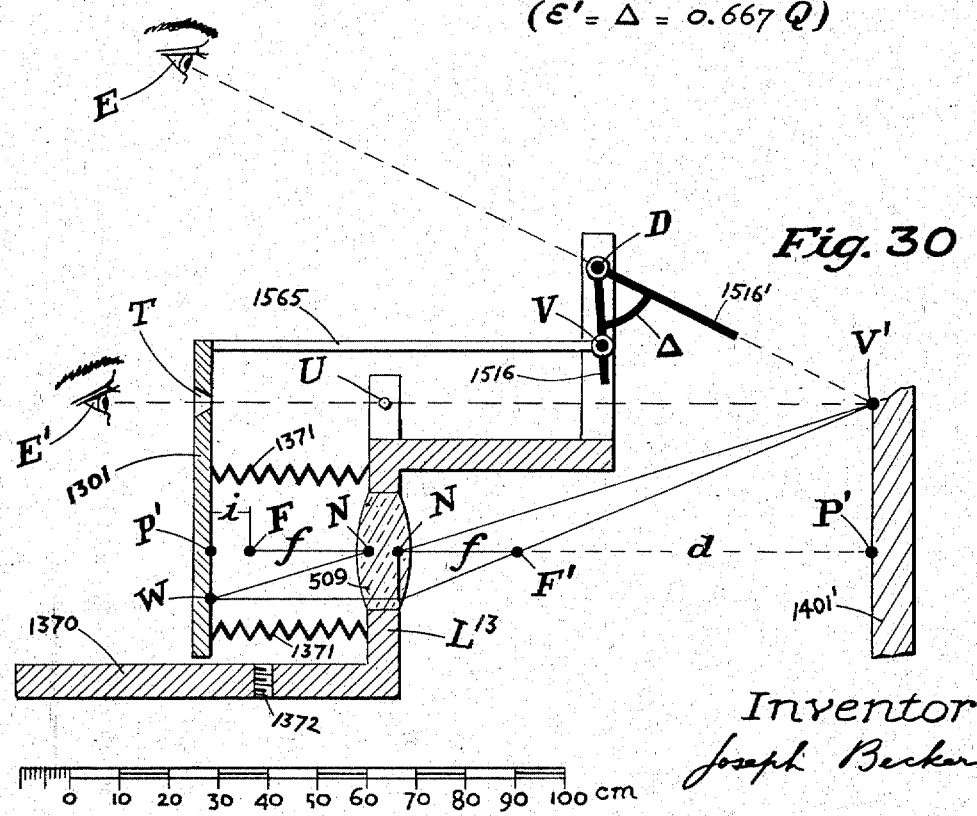

Fig. 30 is Fig. 28 with bellows added and nearly all of the purely theoretical elements omitted, so as to constitute a diagrammatic representation showing the Fig. 28 camera substantially as it is after adjustment; that is to say, as being virtually reduced to three relatively movable rigid elements.

Figs. 31, 32, and 33, grouped on one sheet to facilitate comparison, show the camera of Fig. 16 as provided with equivalent and closely related optical focusers of the three different types, to wit: "obtuse angular" in Fig. 31; "rectangular" in Fig. 32; "acute angular" in Fig. 33.

Figs. 34 to 37 illustrate an important direct "3-point method" of my said case A as used for determining the fundamental dimensions of the optical focuser of Fig. 16.

Figs. 38 and 39 are diagrams that are explanatory of such 3-point method.

Fig. 40 is a geometrical diagram relating to the same 3-point method of Figs. 34 to 37.

Fig. 41 is a diagram of the same 3-point method of Figs. 34 to 37 in its most general form with a table of five equations relating thereto.

Fig. 42 is a diagram of numerical values in the Fig. 16 camera with calculations based on the algebraic equations of Fig. 41.

Camera of Figs. 1 to 4.

The camera of Figs. 1 to 4 has a basic angle delta ($\Delta$) of 108 degrees of six-fifths of a right angle. That is to say, delta ($\Delta$) here equals 1.20 Q, as indicated in Fig. 1.

The bed 510 of this form has a slideway 511 for two carriages 512 and 512'; and in the carriage 512 is formed a longitudinal slideway 505 for a slide block 506, which directly supports the object frame $O^5$ and which has a set-screw 507 for fixing the object frame $O^5$ in any desired longitudinal adjustment on the said carriage 512. The image frame $I^5$ is similarly fixed, in any desired longitudinal adjustment on carriage 512', by means of set-screw 507' threaded in the slide block 506' of slideway 505'. The lens frame $L^5$ carrying the lens 509 is rigidly fixed to bed 510 by screws 503, and it is recessed below to provide the free sliding room that is needed to permit of bringing carriage 512' into its zero position, the position seen in Fig. 3 and fully described later on.

To the under side of carriage 512 is fastened by screws, such as 513, 513, a bracket 514 having an inclined groove 515 to provide adjustment for clamping the object frame pintle 519 where desired on said bracket 514. To the under side of carriage 512' is similarly fastened by screws 513', 513' a bracket 514' having an oppositely inclined groove 515' to provide adjustment for clamping the image frame pintle 519' where desired on the said bracket 514'. The axes of said pintles 519, 519' are, respectively, represented by dots V and V'.

A horizontal cylindrical pin 520 is mounted in a cylindrical hole 521, Fig. 4, of the same diameter, carefully bored and reamed perpendicularly through bed 510 in any preferred position. The stationary axis of this hole is represented by a dot D. The pin 520 is thus mounted in order that it may easily be either inserted, or wholly withdrawn after insertion, by simply sliding it as a bolt lengthwise along in its bearing.

On pin 520 or axis D is pivoted the 108 degree focusing sector comprising arms 516, 516' slotted radially at 517, 517', respectively, and rigidly connected by the stiffening arc 518. Cam slot 517 engages pintle 519 or axis V, while cam slot 517' engages pintle 519' or axis V'.

The upper end of groove 515, in bracket 514, and the upper end of slot 515', in bracket 514', are enlarged at the same level as axis D to form reamed bores 522 and 522', Fig. 1, of the same diameter as pin 520 for temporarily admitting such pin during the process of adjustment, as fully explained later on in connection with Figs. 2 and 3. The axes of these two bores are represented by dots A and A', respectively.

When pin 520 is inserted in its bearing 521, Fig. 4, the axis of the pin coincides with the axis D of the bearing and it is held in fixed relation to the principal focal planes F and F' of the lens at distances $x$ and $x'$ from such planes. To illustrate this relation as clearly as possible the said horizontal distances $x$ and $x'$ are represented in the drawing as being imaginary horizontal bars $x$ and $x'$, respectively connecting the principal focal planes F and F' of the lens 509 with the vertical plane through axis D. The distances $x$ and $x'$ selected for illustration are $x$ equal 17 centimeters and $x'$ equal 37 centimeters; and their algebraic sum $x$ plus $x'$ or 54 centimeters is evidently equal to the interfocal distance FF'. In cases where D is situated to the left of plane F, $x$ is negative; and in cases where D is situated to the right of plane F', it is $x'$ that is negative; so that the same rule, $x$ plus $x'$ equals FF', is general for any desirable position of D.

The distance of axis A from the object plane P may be considered as determined by an imaginary horizontal bar $m$ connecting the object plane P with the vertical plane through A; such distance being adjustable in length by the above described displacement of block 506 on carriage 512 to permit of satisfying the following equation:

$$m = x \quad (3)$$

The distance of axis A' from the image plane P' may similarly be considered as determined by an imaginary horizontal bar $m'$ connecting the image plane P' with the vertical plane through A'; such distance $m'$ being adjustable in length by the above described displacement of block 506' on its carriage 512' to permit of satisfying the following equation:

$$m' = x' \quad (4)$$

In accordance with the rule followed in Figs. 12 to 15 of my said Case T, bars $x$ and $x'$, being non-adjustable, are shown black to distinguish them from bars $m$ and $m'$, which are left white to indicate that they are adjustable.

As proved in my said Case T in connection with Fig. 12 thereof, the mere act of making $m$ equal to $x$ is sufficient to insure that the distance AD shall be and shall always remain equal to the variable left Newtonian space PF of the lens; similarly, the mere act of making $m'$ equal to $x'$ insures that the variable distance DA' shall be and shall always remain equal to the variable right hand Newtonian space F'P' of the lens; that is to say, when equations 3 and 4 are satisfied we always have for all, either in or out of focus, positions of the end frames $$AD = PF \quad (5)$$

and $$DA' = F'P' \quad (6)$$

whence $$AD.DA' = PF.F'P'$$

To secure correct focus, however, we must further satisfy Newton's formula, or equation 1 above, and we must, therefore, make $$AD.DA' = f^2 \quad (7)$$

In equation 1 the spaces PF and F'P' are the Newtonian or constant product space elements of the lens; while in equation 7 the spaces AD and DA' are the corresponding Newtonian or constant product space elements of the mechanism.

Fig. 4, which is a diagram of parts as seen in Fig. 1, shows the co-varying basic and always similar triangles VAD and DA'V' with the angles marked as in Fig. 4 of my said Case Y.

The sector angle delta ($\Delta$) may have any desired value, but it must be equal to the bracket angles alpha ($\alpha$) and alpha prime ($\alpha'$); and we must, therefore, have $$\alpha = \Delta = \alpha' \quad (8)$$

Angles omega ($\omega$) and omega prime ($\omega'$) vary with every angular displacement of the focusing sector 518, but they vary so as to remain equal to each other; the same is also true of angles phi ($\varphi$) and phi prime ($\varphi'$).

In the trangles DVA and DA'V' the two distances AV and A'V', once adjusted for a given lens, remain invariable, but the four remaining distances DA, DV, DA', DV', shown dotted in Fig. 4. vary with every angular displacement of the focusing sector 518, and the variations are such that the triangles DVA and DA'V' remain similar while changing in shape, as proved in my said Case Y so that we always have $$\frac{AV}{AD} = \frac{DA'}{A'V'}$$

whence $$AV.A'V' = AD.DA' \quad (9)$$

and this, in view of equation 7, yields $$AV.A'V' = f^2 \quad (10)$$

The distances AV and A'V', which remain invariable after adjustment, may, therefore, be set and adjusted to any values AV and A'V' such that the product of AV by A'V' shall be equal to $f^2$.

*Adjustment and regulation of the Fig. 1 camera.*

The lens 509, which may be any lens whose dimensions are within the extremes imposed by the unavoidable structural limits of adjustment, is first rigidly mounted in any preferred position on the lens frame L⁵, and then the focusing mechanism is adjusted and regulated, to coöperate therewith, by means of 3 separate adjustments as follows:

*Adjustment No. 1, determining $m$.*—The imaginary bar $m$, which is variable in length by adjusting frame O⁵ longitudinally along on carriage 512, must, according to equation 3, be made equal to $x$. This is done by focusing on right infinity in the special manner indicated in Fig. 2. The bolt 520 or D, Fig. 2, was first withdrawn sufficiently to permit of sliding carriage 512 up into the position seen in Fig. 2, where terminal A of the carriage falls in with terminal D of the lens and the bolt 520 or D was then pushed into bore 522 of bracket 514 to positively hold and lock the carriage 512 to bed 510 in the position illustrated. This position of carriage 512, the position seen in Fig. 2, may be called its "zero position" because it is the position in which the left Newtonian space AD of the mechanism is at "zero value."

While carriage 512 is thus held in its "zero position," the corresponding left Newtonian space PF of the lens is also reduced to zero value, and this is done by loosening screw 507, setting plane P in focus on right infinity, to make P coincide with F, and then retightening screw 507.

This focusing on right infinity is done on screen 501 directly through the image frame $I^5$, from which the screen 501' has temporarily been removed for the purpose, so that the image frame $I^5$ is, during such focusing operation, virtually absent as it should be, for its logical position during such operation is at right infinity.

Bar $m$ is now and must henceforth remain equal to bar $x$, or in the case illustrated equal to 17 centimeters, so that bolt 520 or D may again be sufficiently withdrawn to free the now fully adjusted carriage 512, which is slid back, to the left, to prepare for adjustment number two.

*Adjustment No. 2, determining $m'$.*—The imaginary bar $m'$, which is variable in length by adjusting frame $I^5$ longitudinally along on carriage 512', must, according to equation 4, be made equal to $x'$. This is done by focusing on left infinity in the special manner indicated in Fig. 3. The bolt 520 or D, Fig. 3, after completion of adjustment No. 1, was sufficiently withdrawn to free carriage 512 and it was, therefore, sufficiently withdrawn to permit of sliding carriage 512' up into the position seen in Fig. 3, where terminal A' of carriage 512' falls in with terminal D of the lens. The bolt 520 or D was then pushed into bore 522' of bracket 514' to positively hold and lock carriage 512' to bed 510 in the position illustrated. This position of carriage 512', the position seen in Fig. 3, may be called its "zero position" because it is the position in which the right hand Newtonian space DA' of the mechanism is at "zero value."

While carriage 512' is thus held in its "zero position" the corresponding right hand Newtonian space F'P' of the lens is also reduced to zero value, and this is done by loosening screw 507', setting plane P' in focus on left infinity, to make P' coincide with F', and then retightening screw 507'.

This focusing on left infinity is done on screen 501', directly through the object frame $O^5$, from which the screen 501 has temporarily been removed for the purpose, so that the object frame $O^5$ is, during such focusing operation, virtually absent, as it should be, for its logical position during such operation is at left infinity.

Bar $m'$ is now, and must henceforth remain, equal to bar $x'$, or in the case illustrated equal to 37 centimeters, so that bolt 520 or D may again be sufficiently withdrawn to free the now fully adjusted carriage 512', which is slid back, to the right, to prepare for adjustment number three.

As will be seen later on, adjustment No. 2 may, and in some forms must, precede adjustment No. 1, hence it will be better hereinafter to distinguish these first two adjustments as "the $m$ equal $x$ adjustment" and "the $m'$ equal $x'$ adjustment."

*Adjustment No. 3, determining AV and A'V'.*—Space AV and space A'V' may, as stated above, have any values such that their product AV.A'V' shall, in accordance with equation 10, equal $f^2$ or the square of the focal length FN of the particular lens 509 that is used. Either one of the two factors, AV or A'V', considered as the first, may, therefore, have its length fixed arbitrarily at any desired value, but the length of the second factor must, in order to satisfy equation 10, be determined by adjustment, preferably as follows:

After the object frame $O^5$ and the image frames $I^5$ have both been positioned on their respective carriages 512, 512' by focusing on infinity in the order described above, or in reverse order, they are set and temporarily clamped in focus on each other, say with their carriages in the relative position shown in Fig. 1, where the copying factor $n$ is made exactly equal to 1.5, for clearness only, as no attention is paid to its exact value. One of the two pintles, V or V', is then fixed at any preferred point of its respective groove 515 or 515'. Let 519 or V be such pintle and let the selected distance AV be 32 centimeters, as shown in Fig. 1. The sector 516, 516' is now mounted on its pivot 520 or D and in proper engagement with such previously fixed pintle 519 or V, as seen in Fig. 1, and the other end frame pintle, here 519' or V', will then have to be inserted where its inclined groove 515' is met by the radial slot 517', or at 18 centimeters from A'.

The clamps used to hold frames $O^5$ and $I^5$ temporarily in focused relation on each other are now removed, and the device is ready for use.

After completion of the adjustments 1, 2, and 3 just described, planes P and P' are obliged to move together and at such rates as to remain sharply focused on each other. If, therefore, a negative be mounted in the object frame $O^5$ and the frames be moved, the image of such negative will appear on screen 501' changing in size, but remaining sharply focused and distinct, except in so far as distinctness is unavoidably affected by expansion or contraction of the image.

Pintles V, V' when set as shown in Fig. 1 move in offset horizontal planes with V in the lower plane; but if the carriages 512, 512' be temporarily clamped in any finite focal relation, that of Fig. 1, for instance, and the pintles V, V' both be loosened, any other desired coöperative pair of values may be given to the vectors AV and A'V' to make V move in the same horizontal plane as V', or even in a higher plane, by simply rotating the sector 518 so as to shift the pintles V and V' along in their respective grooves 515 and 515' from the positions shown in Fig. 1 into any other desired pair of conjugate positions in which they can be reclamped to their respective brackets to operate as before. This is because in every possible angular position of the sector 518 the radial sector slots 517, 517' respectively meet grooves 515, 515' so as to determine distances AV and A'V' whose product AV.A'V', as in equation 9, is equal to AD.DA'; and, as long as the latter product AD.DA' is kept invariable by the temporary clamps, the former product AV.A'V' must remain constant.

Structural conditions in Fig. 1.

The strictly necessary structural conditions, which are all satisfied in a perfectly adjusted device such as that of Fig. 1, are summed up in equations 8, 3, 4, and 10, here grouped and renumbered for convenience as equations 11, 12, 13, and 14.

$$\alpha = \Delta = \alpha' \quad (11)$$
$$m = x \quad (12)$$
$$m' = x' \quad (13)$$
$$AV.A'V' = f^2 \quad (14)$$

These four equations are substantially identical with equations 1, 2, 3, and 4 of my said Case Y.

In present Fig. 1, equation 11, which relates exclusively to the angles best seen in Fig. 4, is satisfied by constructing the brackets 514, 514' so that their respective grooves 515, 515' shall have the proper inclinations determined by the sector angle delta ($\Delta$). Equations 12, 13, and 14 are severally satisfied by the three focusing adjustments described above.

The numerical values, which may directly be verified in the drawings, are collected in the annexed table, Table A, which contains a complete list of all fundamental or rigid dimensions which remain invariable after completion of the three adjustments.

| Table (A) of fundamental dimensions in the camera of Figs. 1 to 4. |
|---|
| $\alpha = \Delta = \alpha' = 1.20$ Q |
| $f = FN = N'F' = 24$ cm<br>$FF' = 2f + NN' = 54$ cm<br>$f^2 = 24$ cm $\times 24$ cm $= 576$ cm$^2$ |
| $m = x = 17$ cm<br>$m' = x' = 37$ cm<br>$(m + m') = (x + x') = 54$ cm $= FF'$ |
| $AV = 32$ cm<br>$A'V' = 18$ cm<br>$AV \times A'V' = 32$ cm $\times 18$ cm $= 576$ cm$^2 = f^2$ |

The values of the co-variables of Fig. 1, which vary with every change made in the copying factor, have also been adhered to in many of the other figures and they are, therefore, collected in the annexed Table B:

| Table (B) of co-variables in Fig. 1 (also in Figs. 4, 5, 6, 9, 10, 11, 14, 20, and 21). |
|---|
| Left hand Newtonian space ...... PF = AD = 16 cm<br>Right hand Newtonian space .... F'P' = DA' = 36 cm |
| Copying factor $n = \dfrac{P'W'}{PW} = \dfrac{P'N'}{NP} = \dfrac{P'F'}{f} = \dfrac{f}{PF} = \dfrac{3}{2} = 1.5$ |

It is evident that the camera of Fig. 1, for instance, may be used: First, to produce a copy PW of an original P'W' at the right; secondly, to produce a copy P'W' of an original PW at the left. In the first case the copying factor is the ratio of PW to P'W', and in the second it is the inverse ratio of P'W' to PW. This last ratio, P'W'/PW, in which the light proceeds from left to right, is the one given in the above Table B, and it is the one that will be adhered to throughout this specification, simply to avoid the confusion that would result from the use of two reciprocal values of the copying factor for the same given position of the end planes P and P'; and not with any idea of fixing the direction in which the copy is to be made. In accordance with the same convention, the left end frame is invariably referred to as the "object frame," even in combinations where it would normally be used as light receiving or image frame.

Radial cam focusing gear in which the sector angle delta ($\Delta$) is no larger than in Fig. 1 is, in most positions, nearly as efficient mechanically, or as frictionless, as rectangular gear; but it is not sufficiently open to lead to the important results aimed at in this specification. We must, therefore next consider the more obtuse gear of Fig. 5.

Camera of Fig. 5.

The form of Fig. 5 is derived from that of Fig. 1 by simply removing the sector 518 and the two brackets 514, 514' of Fig. 1 and substituting therefor the new sector 618 and the two new brackets 614, 614', which have a basic angle VAD, equal DA'V', or V'DV, that is approximately equal to 1.56 Q, or 140.4 degrees. The value of this basic angle was selected so as to be determined, for later convenience, by its secant, which is exactly equal to forty eight thirty-sevenths (48/37).

To further make the similarity of Fig. 5 with Fig. 1 as close as possible, the distances AV and A'V' are, respectively, made the same in Fig. 5 as in Fig. 1; but they may, in Fig. 5 as in Fig. 1, have any other values that form a product AV.A'V' satisfying equation 14, and that are determinable in the same way; that is to say, by means of the "third adjustment" described above in connection with Fig. 1. Point V', for instance, might be shifted down in groove 615' to the position shown in Fig. 6.

Camera of Fig. 6.

The camera of Fig. 6 is the camera of Fig. 5 with pintle V' fixed in its groove 615' at the point where such groove is met by the image plane P' produced. This makes A'V' equal to the product of $m'$ by the secant of delta ($\Delta$); that is to say, equal to $37 \times 48/37$, or 48 exactly. It was solely in order to make A'V' have this convenient whole number value that the angle delta ($\Delta$) was determined by its secant as explained above. Space A'V' being 48, space AV, to satisfy equation 14, must be reduced from 32 centimeters to 12, as shown in Fig. 6, and it is so reduced by means of the "third adjustment" just referred to.

The focuser of Fig. 6, as a "mechanical focuser," is poor, but it is remarkable, in that it contains all the fundamental dimensions that are needed to make the good "optical focuser" of Fig. 15, which is to be derived from the present Fig. 6 by a gradual and easily followed evolution running from Fig. 6 to Fig. 15, through the camera of Fig. 7, that of Figs. 8 and 9, that of Fig. 10, and that of Figs. 11 to 14 to and including the camera of Fig. 15, without making any change whatever in the basic angle delta ($\Delta$) or in any other fundamental dimension of the focuser. Such dimensions of Fig. 6, therefore, have a descriptive importance which justifies their recapitulation in the following table, Table C:

| Table (C) of fundamental dimensions in the camera of Fig. 6; also in the cameras of Figs. 7, 8–9, 10, 11–13, and 14–15. |
| --- |
| $a = \Delta = a' = 1.56$ Q. |
| $f = FN = N'F' = 24$ cm <br> $FF' = 2f + NN' = 54$ cm <br> $f^2 = 24$ cm $\times 24$ cm $= 576$ cm² |
| $m = x = 17$ cm <br> $m' = x' = 37$ cm <br> $(m + m') = (x + x') = 54$ cm $= FF'$ |
| $AV = 12$ cm <br> $A'V' = 48$ cm <br> $AV.A'V' = 12$ cm $\times 48$ cm $= 576$ cm² $= f^2$ |

Camera of Fig. 7.

If pintle V' and image frame $I^5$ of Fig. 6 be permanently fixed to carriage 512' in the relative position shown in Fig. 6 so that point V' is and must remain fixed in the produced part of plane P', then we obtain a form such as that partly shown in Fig. 7, where the omitted object frame carriage is the one seen in Fig. 6.

The image frame carriage, however, is a solid block 812' on which the image frame I⁵ is permanently mounted by means of a foot 806′ and screws such as 807′.

The bracket 814′ carries the pintle 819′ or V′ and has a bore 822′ whose axis constitutes terminal A′. The distance $m'$ of terminal A′ from plane P′ is shown black as being invariable in this form; hence, in order to permit of satisfying equation 13 with any lens, the imaginary bar $x'$ must be made adjustable in length. This may be done, for instance, by making the lens frame L⁵ longitudinally adjustable on the rails 510. To this end the lens frame L⁵ is fixed to two feet of the standard C form. These two clamp feet, one of which is seen at 829, 830, 831, 832 of Fig. 7, can be clamped at any desired point of the rails 510 by tightening their screws 832.

"The $m'$ equal $x'$ adjustment" in this form, therefore, consists in varying bar $x'$ of the lens frame to make it equal to the invariable $m'$ of the right hand carriage. Terminal A′ is brought into coincidence with D, as shown in Fig. 7, and while it is so held by pin 520 the two screws 832 are loosened; the lens frame L⁵ is shifted into position to set plane P′ sharply in focus on left infinity; and then the screws 832 are retightened. While shifting the lens frame L⁵ to focus, bar $x'$ was varied to make it equal to $m'$ or 37 centimeters; and bar $x$ was simultaneously varied to make it equal to FF′ minus 37, or 17 centimeters.

As the length of bar $x$ was varied and determined indirectly while determining the length of bar $x'$, we must now make bar $m$ of the left carriage equal to $x$ by focusing O⁵ on right infinity, as described above under "Adjustment No. 1," it being noted that such adjustment No. 1 must in the present form necessarily be the second in order instead of the first.

The third adjustment is the same as that described above for Fig. 1, except that A′V′, being 48 centimeters, is known and AV is the unknown to be determined by setting O⁵ and I⁵ in focus on each other, say in the position shown in Fig. 6. The sector 618 is mounted on pin 520 or D and its slot 617′ is engaged with pin 819′ or V′ of Fig. 7. The groove 615 of Fig. 6 is then met by slot 617 at 12 centimeters from A, where pin 619 or V must be inserted and fastened to its bracket 614.

The camera of Fig. 7 has the same structural dimensions throughout as the camera of Fig. 6; hence it has all the dimensions noted in Table C above. The copying factor $n$ in Fig. 7 is zero.

*Camera of Figs. 8 and 9.*

Fig. 8 is the camera of Fig. 7 with terminal A′ made imaginary. It is derived from the camera of Fig. 7 by simply removing the bracket 814′ of Fig. 7 and replacing it by the bracket 914′ of Fig. 8.

This new bracket 914′ is recessed in the region surrounding terminal A′, as done for terminal A in Fig. 6 of my said Case Y, or for terminal A in Fig. 6 of my said British Patent 29,701 of 1912, and it is brought into its zero position, the position of Fig. 8, by setting the sector 618 to make its arm 616 point to left infinity. To permit of temporarily locking arm 616 in this horizontal position of Fig. 8 the rails 910, 911 are provided with a bore 940 and a slide bolt 941 which is slid into engagement with slot 617, as shown in Fig. 8.

Bracket 914′ has its pintle 919′ or V′ permanently fixed in the image plane P′, and the adjustment of $x'$ to make it equal to $m'$ is done substantially as in Fig. 7. The camera of Fig. 8 is shown complete in Fig. 9.

After making $x'$ equal to $m'$ and thus also determining $x$, $m$ is made equal to $x$, as explained above in describing Fig. 7.

The third adjustment is the same as that described above for Fig. 7. That is to say, A′V′ is known and AV is the unknown, which is determined by setting O⁵ and I⁵ in focus on each other, say in the position shown in Fig. 9, mounting the sector 618 on pin 520 or D and setting slot 617′ in engagement with pin 919′ or V′. The groove 615 is then met by slot 617 at 12 centimeters from A, where pin 619 or V must be fastened to its bracket 614.

The camera of Figs. 8 and 9 has the same structural dimensions as the camera of Fig. 7 and the camera of Fig. 6, hence it has all the structural dimensions noted in Table C above. The variable copying factor $n$ in Fig. 8 is zero, as in Fig. 7; and in Fig. 9 it is $n$ equal to 1.5 as in Fig. 6.

*Camera of Fig. 10.*

In the camera of Fig. 10, terminals A and A′ are both imaginary and point V′, structurally represented by bore 919″, which admits pin 919′, is stationary in the image plane P′.

The camera of Fig. 10 is derived from the camera of Fig. 9 by removing the bracket 614 of Fig. 9 and substituting the bracket 1014 seen in Fig. 10. Pintle 1019 or V is adjustable in this new bracket 1014 as it was in bracket 514 of Fig. 1, or in bracket 614 of Figs. 5, 6, and 9; but terminal A is imaginary like the terminal A′ of the opposite bracket 914′.

Bracket 1014 must, therefore, be brought into its zero position substantially in the same manner as bracket 914′; that is to say, by setting the sector 618 to make arm 616′ point to right infinity.

The rails 1010, 1011 in this form are, therefore, provided with a bore 1040 to serve in holding arm 616 pointed to left infinity, and the bore 1040' to serve in holding arm 616' pointed to right infinity. The one bolt used in these two bores is bolt 1041 seen partly withdrawn in bore 1040'.

This Fig. 10 camera has the same structural dimensions throughout as the camera of Figs. 8 and 9; the camera of Fig. 7, and the camera of Fig. 6, hence it has all the dimensions noted in Table C above. The copying factor $n$ is 1.5 as in the camera of Fig. 6.

*Fig. 10 as single sight optical focuser.*

The mechanical focuser of Fig. 10 has, in common with those of Figs. 5 to 9, a basic or sector angle delta ($\Delta$) equal to 1.56 Q, which exceeds one and a half right angles. This angle is so large that the focusing sector cannot act mechanically in most positions unless aided by applying horizontal pressure to the two end frames $O^5$ and $I^5$ at the same time. Pressure applied to move either end frame alone exerts a heavy and almost vertical pressure on the pintle, V or V', of the other end frame, and this excessive pressure induces friction that is too great to be overcome by its comparatively weak horizontal component. As a mechanical focuser, therefore, the large angle sector binds and is practically worthless.

Remove, as indicated in Fig. 10, pin 919' from its bearing 919" in bracket 914' and the device is converted into an optical focuser with arm 616' as sighting arm.

The end frames $O^5$ and $I^5$ then become as freely movable as if no focuser were present, and focusing is performed by first setting one of the said end frames, either $O^5$ or $I^5$, in a desirable position and then securing optical registration of bore 919" with slot 617' by moving the other end frame.

A more convenient form of "single sight optical focuser" is shown in Figs. 11 to 13.

*Single sight optical focuser, Figs. 11 to 13.*

The optical focuser of Fig. 11 is derived directly from the focuser of Fig. 10. The lens is the same lens 509 and the fundamental dimensions are exactly the same as those of Figs. 6 to 10 given in "Table B." The focuser, however, is located above the camera, and the bed is any truly planed heavy beam 1250 which is adapted to serve as a slide rail for the three camera frames $O^{12}$, $L^{12}$, $I^{12}$, whose bases are grooved to admit the beam and form a smooth sliding fit on its upper face.

The lens frame $L^{12}$ is preferably fixed to the beam 1250 by a screw 1251, as shown, because the principles involved are more easily understood when the lens is stationary, but such principles are simply dependent upon the relative movements of the three frames with relation to each other and not upon the movements of any one of the three frames with relation to any stationary base. Either one of the end frames $O^{12}$ or $I^{12}$ might, therefore, be fixed to bed 1250 in place of the lens frame, and the three frames $O^{12}$, $L^{12}$, $I^{12}$ might be left free to slide, if desired.

The top of the lens frame $L^{12}$ is grooved to form a smooth longitudinal slideway 1252 for the foot 1253 of a bracket 1254. A screw 1255 passing freely through a slot in foot 1253 serves to clamp the bracket 1254 in any desired longitudinal adjustment on the lens frame $L^{12}$.

A pin 1220 whose axis is represented by a dot D is mounted in the bracket 1254 to serve as a pivot for the radial cam sector 1218, which is substantially the same as the sector 618 of Figs. 5 to 10, except that the right hand arm is converted into an alidade or sighting arm 1216' with a peep sight at D and a bead sight at S. This sighting arm 1216' has a hole 1217' which is adapted to register with either one of two similar holes 1240, 1240' bored in the bracket 1254. These holes 1240, 1240' are so located that when the sector 1218 is set to make bore 1217' register with bore 1240, as in Fig. 12, the radial arm 1216 points to left infinity; and it may be temporarily locked in such position by inserting the bolt or pin 1241, as shown in Fig. 12. On the other hand, when the sector is set to make bore 1217' register with bore 1240', as in Fig. 13, the radial arm 1216' points to right infinity; and it may be temporarily locked in such position by inserting the same bolt or pin 1241, as shown in Fig. 13. In Fig. 11 the pin 1241 is shown as partly inserted through the back into hole 1240', where it may be kept when not needed.

The top of the object frame $O^{12}$ is grooved to form a smooth longitudinal slideway 1262 for the foot 1263 of a bracket 1264. A screw 1265 passing freely through a slot in foot 1263 serves to clamp the bracket 1264 in any desired longitudinal adjustment on the object frame $O^{12}$.

The bracket 1264 is provided with an inclined groove 1215 corresponding in every particular to the groove 1015 of Fig. 10, and having its imaginary terminal at A. Terminal A, which is alined with groove 1215 at the same level as D in bracket 1254, remains in fixed relation to its bracket 1264 and follows the bracket 1264 in all its adjustments and movements.

A pintle 1219, mounted for adjustment in groove 1215 and whose axis is represented by a dot V, may be clamped to bracket 1264 at any desired distance AV from A.

The image frame $I^{12}$ is any block adapted to support the removable focusing screen 1201' which corresponds to the similarly removable focusing screen 1201 of the object frame.

Any point V' of the image plane P' that is lower than the horizontal line AD, Fig. 11, may be selected as the imaginary pintle V' corresponding to the pintle V' of the mechanical focuser of Fig. 10. The vector V'A', with A' at the level of D, but in fixed relation to plane P', at distance $m'$ therefrom, constitutes the imaginary terminal A' of the image frame $I^{12}$. The exact position of A' is determined by the condition that the vector V'A' and groove 1215 or vector VA must be equally and oppositely inclined in accordance with equation 11 and as indicated in Fig. 4, and this makes V'A' invariable both as to inclination and length so that terminal A' moves with plane P' as if V'A' and the upper $m'$ in Fig. 11 together constituted a rigid bracket. In practice no attention is paid to terminal A', which is introduced for the sole purpose of illustrating the principles involved.

The adjustments to secure "3-and-all" point correspondence with any given lens 509 are substantially the same as those described above for the mechanical focuser of Fig. 10, but it will be well to redescribe them in detail.

*Adjustment No. 1.*—"The $m'$ equal $x'$ adjustment" is the one that must be made in the first place, because $m'$ is invariable, and we must first satisfy equation 13 by making $x'$ equal to $m'$.

The image frame $I^{12}$ is set and temporarily clamped in focus on left infinity, as seen in Fig. 12, to bring P' into coincidence with F' and thus reduce the Newtonian space F'P' of the lens to zero value.

The sector 1218 is now set with its arm 1216 pointed to left infinity and it is temporarily held in such position by insertion of the bolt 1241 as described above and as shown in Fig 12.

Screw 1255 is then loosened, and with his eye at E, to sight along the radial arm 1216', the operator slides the bracket 1254 along on the lens frame $L^{12}$. This motion translates the sighting line DS horizontally, and causes the point where this sighting line meets the vertical image plane P' to move vertically. The operator, therefore, can always easily set the bracket 1254 so as to bring the sighting line DS onto any desired point of the image plane P', such as the point V' here selected, for convenience, in the upper edge of the plane.

When the operator has thus found the proper position of bracket 1254, which is that shown in Fig. 12, he firmly clamps the bracket 1254 to the lens frame $L^{12}$ by tightening screw 1255.

Terminal A' now evidently coincides with D and the Newtonian space DA' of the mechanism has been made equal to zero or equal to the present value of the Newtonian space F'P' of the lens. At the same time the imaginary bar $x'$ was varied in length to make it equal to the imaginary bar $m'$ or, in the present case, equal to 37 centimeters.

If the temporary clamp used to hold the image frame $I^{12}$ be removed, such frame may now be slid off to any distance toward the right. In moving to the right it carries its points P' and A' away from the stationary points F' and D through distances F'P' and DA' that are necessarily equal, and we, therefore, know that the right hand Newtonian space DA' of the mechanism must henceforth be and remain equal to the right hand Newtonian space F'P' of the lens as required by equation 6. We can now proceed with adjustment No. 2.

*Adjustment No. 2.*—In making adjustment No. 1 the bar $x'$ was varied to make it equal to bar $m'$, and this operation necessarily varied bar $x'$ to make it equal to FF' minus $x'$. In the second adjustment, therefore, we are to satisfy equation 12 by varying bar $m$ to make it equal to $x$, or, in the present case, equal to 17 centimeters.

This is done as illustrated in Fig. 13. The object frame $O^{12}$ is set and temporarily clamped in focus on right infinity, as seen in Fig. 13, to bring P into coincidence with F and reduce the Newtonian space PF of the lens to zero value.

The sector 1218 is now set with its arm 1216' pointed to right infinity and it is temporarily held in such position by insertion of the bolt 1241.

Screw 1265 is then loosened, and the bracket 1264 is slid along on the object frame $O^{12}$, which meanwhile remains stationary, as it is temporarily clamped to base 1250.

The bracket 1264 can thus be shifted until its groove 1215 registers with slot 1217 in arm 1216, and when this registration has been insured, by the insertion of pintle 1219 or V at any arbitrary distance AV from A, the screw 1265 is firmly tightened to clamp bracket 1264 in its thus self determined adjustment on the object frame $O^{12}$. It should be noted that when the radial cam occupies its present position of Fig. 13 it is capable of registering the pintle V in any subsequently selected position of V, so that the present adjustment is in no way influenced by the later or third adjustment, which determines the value of AV.

Terminal A now evidently coincides with D and the Newtonian space AD of the mechanism has been made equal to zero, or equal to the present value of the Newtonian space PF of the lens.

At the same time the imaginary bar $m$ was varied in length to make it equal to the imaginary bar $x$, or, in the present case, equal to 17 centimeters.

If the temporary clamp used to hold the object frame $O^{12}$ be removed, such frame may now be slid back to the left to any desired distance, and as it moves it carries its points P and A, away from the stationary points F and D, through distances DA and FP that are necessarily equal. We, therefore, know that the left Newtonian space AD of the mechanism must henceforth be and remain equal to the left Newtonian space PF of the lens as required by equation 5. We can now proceed with adjustment No. 3.

*Adjustment No. 3.*—The object of this adjustment is to locate V in its groove 1215 so that the product AV.A'V' shall be equal to the square of the focal length of the lens in accordance with equation 14.

This is done automatically as follows: The end frames $O^{12}$, $I^{12}$ are set and temporarily clamped in focus on each other, say in the position of Fig. 11, without paying any attention to the exact value of the copying factor; and when this has been done equations 11, 12, and 13 are all satisfied, and nothing more remains to be done except to satisfy equation 14 by proper adjustment of the distance AV, as A'V' is invariable, and, therefore predetermined.

Pintle V is, therefore, loosened and slid along in its groove 1215, and as it moves, either to shorten or lengthen the distance AV in Fig. 11, the sector 1218 is turned on its pivot D and the sighting line DS is made to sweep over the point V' in plane P'. Pin V can, therefore, be set so as to make the sighting line DS point directly at V' and when this position of V has been found pintle 1219 is firmly clamped to bracket 1264 at its thus self determined proper distance from terminal A.

The temporary clamps used to hold the end frames $O^{12}$ $I^{12}$ in focus on each other may now be removed and the device is ready for use.

The camera of Figs. 11 to 13 has the same fundamental structural dimensions as the camera of Fig. 6, the camera of Fig. 7, the camera of Figs. 8 and 9, and the camera of Fig. 10, hence it has all the structural dimensions noted in Table C above. The variable copying factor $n$ is 1.5 in Fig. 11, *nil* in Fig. 12 and infinite in Fig. 13.

*Use of the Fig. 11 camera.*—A characteristic feature of the optical focuser, Fig. 11, is that it leaves the three camera frames $O^{12}$, $L^{12}$, $I^{12}$ independent, to be relatively displaced, as freely as if the focuser were absent.

As a rule, therefore, the image is out of focus and this is indicated by the fact that the three points D, S, and V' are generally out of alinement.

It is always easy, however, to secure sharp focus by displacing one or more of the frames so as to bring the three points D, S, and V' into the focus indicating relation; that is to say, into alinement.

Thus where the lens frame $L^{12}$ is stationary, as in Fig. 11, the operator can secure alinement, and hence focus, by shifting either one of the two end frames without moving the other.

If he leaves the object frame $O^{12}$ stationary the line of sight DS remains fixed, and with his eye at E he can by means of rope and pulley, or some equivalent, gear shift the image frame $I^{12}$ along on bed 1250 until point V' falls into the sighting line DS.

If he prefers to leave the image frame $I^{12}$ stationary he must secure focus by moving the object frame $O^{12}$. Moving the object frame $O^{12}$ makes sector 1218 turn on its pivot D and causes the sighting line DS to sweep over the image field. He can, therefore, easily set the object frame $O^{12}$ so as to point the sighting line DS directly at V', wherever V' happens to be.

Point V' in Fig. 11 throughout all its movements remains at a constant level or distance below the horizontal plane that contains the three axes A, D, A', and this distance was purposely made the same in Fig. 11 as in Fig. 10, in order that point V' in Fig. 11 and point V' in Fig. 10 shall be geometrically identical in every respect.

The identity of point V' of Fig. 11 would evidently be lost by substituting a lower image plane for the plane 1201' shown; and it would also be lost in case the substituted image plane were higher, unless such higher plane were marked at the level of V'.

To permit of verifying or picking out point V' on any image plane that is to be used, I preferably provide the camera of Fig. 11 with a horizontal sight directed through V', such as sight TU seen in Fig. 14. This horizontal sight, however, makes the camera generally useful for all conceivable distances of the image plane P' and warrants the further modifications shown in Fig. 14.

Camera of Figs. 14, 15, 18 and 19.

The copying or enlarging camera of Fig. 14 is derived from that of Fig. 11 mainly by the addition of means for determining a horizontal line of sight E'V'; this and certain other changes in arrangement are made to lead to the landscape or portrait camera of Fig. 15, which is simply a removable and independently usable part of the combination shown in Fig. 14.

The lens frame $L^{13}$ of Fig. 14 is provided with a foot 1370 on which the object frame $O^{13}$ is mounted to slide, so as to constitute the removable and independently usable bellows camera of Fig. 15, and the combination is completed by the addition of a permanent bellows 1371. Bellows of the previously described cameras are preferably made removable and were omitted for clearness of illustration.

The foot or camera bed 1370 has a threaded hole 1372 which is adapted to receive the tripod screw 1373 seen in Fig. 15.

The focusing sector 1218 of Figs. 14 and 15 is identically the same as that of Figs. 11 to 13 and has all its parts similarly numbered 1216, 1217, 1216', 1217', and it also has the same peep sight at D and the same bead sight at S.

On the lens frame $L^{13}$ of Figs. 14 and 15 the slideway 1352, foot 1353, bracket 1354, clamp screw 1355, pivot 1320, openings 1340, 1340', and pin 1341 are exactly the same as the similarly numbered parts 1252, 1253, 1254, 1255, 1220, 1240, 1240', and 1241 of Figs. 11 to 13. The only difference to be noted is that bracket 1354 of Figs. 14 and 15 is provided with a bead sight U which is preferably made of a thin horizontal wire stretched through two opposite small holes bored at the same level in the parallel walls of the bracket.

On the object frame $O^{13}$ of Figs. 14 and 15 the slideway 1362, foot, 1363, bracket 1364, groove 1315, and pintle 1319 are also exactly the same as in Figs. 11 to 13, but the bracket is provided with a rear vertical strip 1366 having a narrow horizontal slit at T to form a peep sight at the same level as the bead sight U, so that the sighting line TU shall be horizontal; that is to say, parallel to the lens axis FF' and to the plane containing the three axes A, D, A'.

This lower sighting line TUV' may be made as high or as low as desired by forming the slit T and the two holes for wire U at the proper level, but the level selected in Figs. 14 and 15 is that which makes point V' of these figures correspond exactly to point V' of Figs. 11 to 13, so that the two structures will be as nearly alike as possible for purposes of comparison.

The beam or slideway 1250 of Figs. 11 to 13 is replaced in Fig. 14 by the bed 1350 with guide rails such as 1349, which serve mainly to keep the planes 1301 and 1301' parallel.

The "double sight" focuser of the camera in Figs. 14 and 15 is adjusted and regulated for use substantially in the same manner as the "single sight" focuser of Figs. 11 to 13 and the adjustment is preferably and most conveniently made in the combination of Fig. 14.

Assuming that sights T and U are true; that is, that the direction of the line TU is not affected by shifting frame $O^{13}$ on bed 1370, the first thing to do is to pick out and, if necessary, mark point V' where plane 1301' is met by the line TU produced. This is done by sighting with the eye at E' along the horizontal TU; and the trueness of the sight TU, as well as the trueness of the bed 1350, should be verified by ascertaining that V' does not vary when the image frame $I^{13}$ is shifted from one extreme position on the bed to the other.

When V' is known the position of the imaginary terminal A' with reference to plane P', Fig. 14, is virtually determined. The distance $m'$ of this terminal A' from the image plane P' is also necessarily determined and D must, therefore, be adjusted horizontally on $L^{13}$ to make its distance $x'$ equal to $m'$, as in Fig. 12. The 3 adjustments are, therefore, the same as those fully described above for the camera of Figs. 11 to 13, and they must be made in the same order.

In making the first or "$x'$ equal $m'$ adjustment," the parts are arranged as they were in Fig. 12 for the Fig. 11 camera.

The left screen 1301 of Fig. 14 is then removed and the image screen 1301' is sharply focused on left infinity. This not only reduces F' P' to zero value, but it simultaneously brings point V' into its zero position Z' directly over F' in the outer focal plane. The rest of the adjustment is as that described above for the Fig. 11 camera.

In passing, it should be noted for future reference that the zero point of V' is the point Z' where the outer focal plane F' is met by the horizontal sighting line TU; also that the outline DA'V'Z' in Fig. 14 always is a parallelogram and that the angle DZ'V' or epsilon prime ($\epsilon'$) formed at Z' is equal to the opposite angle DA'V' or alpha prime ($\alpha'$) formed at A'.

The second adjustment is substantially the same as that shown in Fig. 13 for the Fig. 11 camera.

The third adjustment is also the same as that described for the Fig. 11 camera.

After the three adjustments have been completed, the device is ready for use; either as a copying or enlarging camera, Fig. 14; or else, in part, as an independent tripod camera, Fig. 15.

The combination of Fig. 14 is to all intents and purposes the equivalent of the Fig. 11 camera and is used in the same way, that is to say, as a "single sight" focuser. This is because the lower sighting line TU necessarily strikes the same point V' in all possible positions of the image frame $I^{13}$, so that it need never be used after completion of the adjustment, except to verify and readjust in case the original adjustment has accidentally been disturbed.

When the separable bellows camera is mounted on a tripod as in Fig. 15 it may be used to set the camera in focus on any object, however close or distant such object may be.

The object 1401′, Fig. 15, should first be observed from E′ through the lower sight TU, to ascertain what easily recognized point V′ of the object is in the lower line of sight. If no remarkable point is thus found, a slight displacement of the camera will suffice to bring one into view.

The operator then shifts his eye from E′ to E and moves the object frame $O^{13}$ along on bed 1370 to make the sector 1218 turn on its pivot D and cause the sighting line DS to sweep over the point V′ selected in the first sighting operation. A last small and careful movement of frame $O^{13}$ then suffices to make DS point exactly on V′ and the object frame $O^{13}$ may be clamped to bed 1370 with the assurance that it is sharply focused on V′.

The camera of Figs. 14 and 15 has the same fundamental dimensions as the camera of Fig. 6, the camera of Fig. 7, the camera of Figs. 8 and 9, the camera of Fig. 10 and the camera of Figs. 11 to 13, hence it has all the structural dimensions noted in Table C above. The variable copying factor $n$ is 1.5 in Fig. 14 and 3 in Fig. 15.

As the arm 1216′ of Fig. 15 projects outwardly where it is exposed to injury, in practice it is preferably replaced by an arm extending rearwardly from D toward the eye at E and provided near the eye at $s$ with a peep sight which is then used as rear sight in combination with a bead at D as forward sight. In such case the real value of the focusing sector used is no longer equal to the basic angle VDS or delta ($\Delta$), but equal to the supplement $sDV$ thereof. The value of such supplementary angle will hereinafter be designated by gamma ($\gamma$).

All desirable compactness, however, can only be secured by changes in proportion and a general rearrangement of parts such as shown in Fig. 16.

Camera of Figs. 16 and 17.

In Fig. 15, all dimensions of the combination that are listed in Table C are fundamental and are accurately drawn to scale, but nearly all other dimensions and the general arrangement have purposely been altered as much as seemed necessary to secure all desirable clearness in illustrating the theoretical principles involved.

In practice the camera of Fig. 15 would have proportions about such as shown in Fig. 16, where the lens 2009 has exactly the same horizontal dimensions as the lens 509 of Fig. 15; that is to say, the six vertical lens planes P, F, N, N′, F′, P′ of Fig. 15, produced downwardly, constitute the six corresponding lens planes of the Fig. 16 camera. The Fig. 16 camera, therefore, in spite of its greatly reduced proportions, makes a picture of the same size as that made by the Fig. 15 camera.

The focuser of Fig. 16, instead of projecting high above the camera as in Fig. 15, is mounted flat against one side and has its fixed line of sight TU determined by a peep sight T and a bead sight U mounted on the side edge of the camera bed 2070.

The general rules herein disclosed permit of constructing a theoretically accurate focuser with its pivot D mounted in any desired position on the lens frame $L^{20}$, or else with its pintle V in any desired position on the object frame $O^{20}$. These positions of D and V are preferably selected so that the brackets used for the adjustments shall project as little as possible away from their respective frames. For clearness of illustration in Fig. 16 all such brackets are omitted and the focuser shown in such figure may, therefore, be considered as having been specially designed for use with the given lens and camera. The pivot D was placed rather close to TU in order to throw pintle V back, sufficiently far, to permit of mounting it directly on the object frame $O^{20}$, as shown, without an outrigger. That is to say, if pivot D had been placed as high in Fig. 16 as in Fig. 15, pintle V would have fallen to the right of the object frame $O^{20}$ and would have required a special supporting bracket.

To design the focuser of Fig. 16, proceed, say, as follows: First, locate point Z′, in the vertical plane through F′, by producing the line of sight TU; secondly, plot pivot D, in any preferred position on the lens frame $L^{20}$; thirdly, locate terminal Z, by drawing DZ anti-parallel to DZ′ and of such length that the product DZ·DZ′ shall equal $f^2$; fourthly, locate pintle V, by drawing PV parallel and equal to FZ; fifthly, determine the two supplementary focuser angles delta ($\Delta$) or VDV′, and gamma ($\gamma$) or VD$s$, by considering terminal Z as occupied by pintle V as in the enlarged view, Fig. 17, and then drawing a horizontal $sD$ through pivot D.

Compactness being the main object in Fig. 16, the rearwardly extending part D$s$ of the sighting arm is alone used with its corresponding sector angle gamma ($\gamma$). A peep sight at $s$ is, therefore, provided as rear sight to coöperate with a bead on pivot D as forward sight.

The true basic angle delta ($\Delta$) of the Fig. 16 focuser is VDV′ or the supplement of gamma ($\gamma$) and is structurally used in Fig. 31, where the geometrically identical focuser is shown in its normal and more easily understood form.

The camera of Fig. 16 is shown in position of use in Fig. 17, on a scale twice as large as in Fig. 16, and with parts set in focus on infinity. That is to say, the sight line sD is exactly parallel to the sight line TU; the point P has been brought up into coincidence with F; and the pintle V has been brought up into coincidence with terminal Z, which is the zero point of V, as will appear in view of equations 18 to 20 established later on.

In taking a picture the camera is first firmly clamped on a tripod by means of the tripod screw 2073 in such position as to cover the field to be photographed.

The operator then placing his eye at E' sights along TU to discover the particular point V', where the object to be photographed is met by the line TU produced. He then shifts his eye from E' to E and while sighting along sD he moves the object frame $O^{20}$ on bed 2070. This motion causes the line of sight sD to sweep over the camera field, and then a last careful movement is sufficient, to make sD point directly onto the said object point V' which was first seen along TU.

The object frame $O^{20}$, in Fig. 17, can be moved from the full line position, where PF is *nil*, as far back as the dotted position $p''$, where PF is equal to 24 centimeters or $f$. The camera can, therefore, be used for making a picture of the same size as the original, which in this case would be situated as close to the camera as indicated in Fig. 16 by the vertical plane $P''V''$ whose distance $F'P''$ from F' is likewise equal to 24 centimeters or $f$.

For every position of V' on line TU between V'' of Fig. 16 and right infinity there is one definite position of P between the extreme positions $p''$ and F of Fig. 17, and the focuser shown when aimed on V' locates this position of P in strict accordance with equations 1 and 2, for all possible values of the distance F'P' ranging from F''P' equal $f$ to F''P' equal infinity; that is to say, the focuser is "theoretically accurate."

To permit of focusing on a still closer point than point V'' of Fig. 16 all that is required is to lengthen in Figs. 16 and 17 as much as may be necessary the radial cam slot 2017 and the camera bed 2070.

The adjustments that would be used in the camera of Figs. 16 and 17 to make allowances for either accidental or contemplated variations in the focal length $f$ or in the extent sign and location of the internodal space NN' are substantially the same as shown in Fig. 15.

The pivot D of Fig. 16 is located in the same vertical plane as the pivot D of Fig. 15, so that we have in Fig. 16, as we already had in Fig. 15:

$$x' = 37 \text{ cm}$$
$$x = 17 \text{ cm}$$
$$x + x' = 54 \text{ cm} = FF'$$

The distance Z'D, however, is shorter, being only 40 centimeters, instead of 48, so that $$DZ' = 40 \text{ cm}$$
$$D = 14.4 \text{ cm}$$
$$DZ \cdot DZ' = 576 = 24 \times 24 = f^2$$

We can calculate the values of the angles as follows: The cosine of epsilon prime ($\epsilon'$) is minus $x'/DZ'$ or minus 37/40 which equals −0.925 and, therefore, $$\epsilon' = \Delta = 1.752 \, Q = VDV' \text{ to make } 1.752 \, Q = VDV'$$
$$(2 - \epsilon') = \gamma = 0.248 \, Q$$
$$\Delta + \gamma = 2.000 \, Q$$

We can also calculate $$m'' = x'' - 3.68 \text{ cm}$$

Here $m''$ represents the distance of pintle V from the image plane P, and $x''$ represents the equal distance of Z from the vertical plane through F, as more fully explained presently. It was stated above that the horizontal distances in Fig. 16 are exactly the same as in Fig. 15; but it should be noted that the vertical distances are very different. The most important of these vertical distances is the distance of pivot D above its corresponding horizontal sight line TU, because this constitutes the effective base line of the focuser, considered as a range finder, and it should always be made as large as other conditions will permit. It is the same as the distance $h$ in Fig. 17 of my said Case B (where G°A° corresponds to the present Z'D) and it is evidently equal to the product of the distance Z'D by the sine of angle epsilon prime. That is to say $$\text{Focuser base line} = Z'D \cdot \sin \epsilon' \quad \text{-----(14.5)}$$

but, from data so far given, it is easily calculated as follows:

In Fig. 15 we have Z'D equal to 48 cm, and the cosine of epsilom prime ($\cos \epsilon'$) equal to minus 37/48; so that the horizontal projection of Z'D on line TUZ' must be 37/48 of 48 or 37 cm; and the height of pivot D above TUZ' is evidently $$\sqrt{48^2 - 37^2} \text{ or } \sqrt{935}$$

which equals 30.6 cm.

In Fig. 16 we similarly have Z'D equal to 40 cm, and the cosine of epsilon prime ($\cos \epsilon'$) equal to 37/40; so that the horizontal projection of Z'D on line TUZ' must be 37/40 of 40 or 37 cm; and the height of pivot D above TUZ' is evidently $$\sqrt{40^2-37^2} \text{ or } \sqrt{231}$$

which equals 15.2 cm.

For convenience of comparison, the several dimensions just considered are tabulated as follows:

|  | In Fig. 15. | In Fig. 16. |
| --- | --- | --- |
| Z'D = | 48 cm | 40 cm |
| Z'D.cos ε' = | 37 cm | 37 cm |
| Base line = | 30.6 cm | 15.2 cm |

The focuser base line (Z'D.sin ε' of equation 14.5) is indicated in the diagram Fig. 18 of Fig. 15, by the vertical distance DK, point K, for clearness is omitted from all other figures, excepting Fig. 42.

In the rule given above for designing the Fig. 16 camera I have used a new set of fundamental dimensions which is, of course, present in the camera of Fig. 15; but which has not yet been described.

*New focuser dimensions, Figs. 18 to 21.*

The new set of dimensions used in Fig. 16 and the old set used in Fig. 14 are shown together in Fig. 18, which is a diagrammatic representation of Fig. 15.

In Fig. 18 the peep sight T is shown as a horizontal slit in the object plane P, extended; and the bead sight U is shown as a horizontal pin mounted in an opening 1380 formed in the lens frame L$^{18}$, extended. The line of sight TU produced meets the vertical plane through F', in Z', and the line DZ' thus determined is equal and parallel to the line A'V'. The variable figure DA'V'Z' is a horizontally extensible parallelogram, whose variable sides DA' and Z'V', shown dotted, represent equal Newtonian spaces in the right hand end of the focuser.

If now through D we draw a line DZ equal and parallel to AV we form at the left a similar horizontally extensible parallelogram whose sides AD and VZ, shown dotted, represent equal Newtonian spaces in the left hand end of the focuser.

We, therefore, have, in view of equation 10, $$DZ = AV \quad \text{(15)}$$
$$DZ' = A'V' \quad \text{(16)}$$
$$DZ.DZ' = f^2 \quad \text{(17)}$$

That is to say, DZ and DZ' may have any values whose product is equal to the square of the focal length of the lens.

And we also have, in view of equations 5, 6, and 7, $$VZ = AD = PF \quad \text{(18)}$$
$$Z'V' = DA' = F'P' \quad \text{(19)}$$
$$VZ.Z'V' = f^2 \quad \text{(20)}$$

That is to say, VZ and Z'V' constitute a second set of Newtonian space elements in the focuser with the "lens points" Z and Z' as zero points for the image plane terminals V and V'.

Now, referring to the angles of these parallelograms, we note that the obtuse angles epsilon (ε) and alpha (α) in the left parallelogram ADZV are equal to each other; also that the obtuse angles alpha prime (α') and epsilon prime (ε') in the right hand parallelogram DA'V'Z' are equal to each other; and, therefore, in view of equation 8, $$\varepsilon = \alpha = \Delta = \alpha' = \varepsilon' \quad \text{(21)}$$

That is to say, the five angles alpha (α), delta (Δ), alpha prime (α'), epsilon (ε) and epsilon prime (ε') are equal to each other. Any one of the five, therefore, that happens to be most in evidence in any given type of focuser, such, for instance, as epsilon prime (ε') in Fig. 16, may be used as the "basic angle" of such focuser. We can also conclude that DZ and DZ' must be equally but oppositely inclined; that is to say, must be "anti-parallel."

Now, let the distance of Z from the left focal plane F be represented by an imaginary bar $x''$, Fig. 18, which is $x''$ centimeters long, and let the distance of V from the object plane P similarly be represented by an imaginary bar $m''$, which is $m''$ centimeters long.

Then, in Fig. 18, we evidently have $$m'' = m - AV.\cos AVZ$$

but angle AVZ and angle alpha (α) are supplementary so that $$\cos AVZ = -\cos \alpha$$

and, therefore, $$m'' = m + AV.\cos \alpha \quad \text{(22)}$$

In the same manner it could be shown that $$x'' = x + ZD.\cos \varepsilon \quad \text{(23)}$$

Now, subtracting equation 23 from equation 22, and noting that AV.cos α equals ZD.cos ε, we have, in view of equation 3, $$m'' - x'' = m - x = 0$$

or $$m'' = x'' \quad \text{(24)}$$

The position of Z with relation to the focal point F and the vertical plane through F is, therefore, exactly the same as the position of V with relation to the object point P and the vertical plane through P; accordingly, the straight line drawn from P to V must be equal and parallel to the straight line drawn from F to Z, but such two lines are omitted, in Fig. 18, for clearness.

Fig. 19 shows Fig. 18 with nearly all theoretical elements omitted, but provided with bellows 1371 to complete the structure, and it also illustrates the acute supplementary sector angle gamma (γ) which corresponds to the sector used in Fig. 16, and it should, therefore, be well noted that, although the structural focusing sector used in Fig. 16 is "acute angular," the focuser of Fig. 16 is, nevertheless, a focuser of the "obtuse angular type." The relation of the gamma (γ) and delta (Δ) sectors is evidently defined by the following equation:

$$\gamma + \Delta = 2Q \quad \text{------(25)}$$

The old set of dimensions of the Fig. 15 camera is shown separately in Fig. 20; and the corresponding new set of dimensions of the same camera is shown separately in Fig. 21.

All focuser dimensions in these two diagrams are exactly the same as in Fig. 18 and the only difference to be noted is that Fig. 18 shows the parts set for copying factor $n$ equal to 3, whereas a smaller copying factor $n$ equal 1.5 is used in Figs. 20 and 21 with the sole object of making the left triangles on DV large and clear. Figs. 20 and 21 therefore, accurately represent Fig. 14, where the copying factor is likewise equal to 1.5.

In Fig. 21 we note that the distance $m'''$ of terminal V′ from its plane P′ is $nil$; that the corresponding distance $x'''$ of terminal Z′ from the vertical plane through F′, is likewise $nil$; finally, that these distances $m'''$ and $x'''$ may, therefore, be left out of consideration in designing an optical focuser.

We further note in Fig. 21 that angle V′Z′D or epsilon prime ($\epsilon'$) by equation 21 is equal to the basic angle delta (Δ) and, therefore, in view of the disclosures made in my said Case Y, this angle epsilon prime ($\epsilon'$) may have any preferred finite value. Moreover, by equation 17 we further, note that either one of the factors DZ or DZ′ may be treated as an independent variable, and, therefore, that the distance Z′D considered per se may be made as long or as short as desired.

The vector Z′D may accordingly have any desired inclination as well as any desired length, and pivot D may be mounted or plotted in any arbitrarily or otherwise selected position with relation to the lens 509.

Having plotted D, we must make the direction DZ oppositely inclined or anti-parallel to DZ′, and we must make DZ of such value as to satisfy equation 17.

Terminal Z, being the zero position of pintle V, has the same relative position with relation to point F and to the vertical plane through F that V must have with relation to P and the vertical plane through P; and, therefore, the line PV must be equal and parallel to the line FZ.

The rule given above for designing the Fig. 16 camera is, therefore, proved consistent in every particular with all other rules herein given. It is, moreover, in exact agreement with the rule given in my said Case A for designing the mechanically equivalent "straight lever" focuser shown in Figs. 1 to 3 of my said Case A.

"*Straight lever*" *form, Fig. 22.*

The Case A type of focuser here referred to may be directly derived from the diagram figure, Fig. 21, by opening up the sector angle of Fig. 21 to form the "straight lever" form of focuser 716 and 716′ seen in Fig. 22, where the path of terminal V is parallel to the vector Z′D and its direction VZ meets the produced path Z′V′ of terminal V′ in X under an angle theta (θ).

This arrangement calls for a mechanical transmission, such as shown in Fig. 3 of my said Case A, for insuring that PF shall always be kept equal to VZ, but in the present explanation it suffices to note that the Newtonian spaces of the focuser are VZ and Z′V′, respectively equal to the lens spaces PF and F′P′, and that my said Case A makes $$PF = i \text{ centimeters}$$
$$F'P' = d \text{ centimeters}$$

hence, in view of the present equation 1, $$id = f^2$$

which is equation 1, page 4, of my said Case A.

The theoretically exact focusers of my said Case A are, therefore, in principle radial cam focusers of the obtuse angular type.

*Complete form, Fig. 23.*

All theoretical angular and linear dimensions referred to in the various equations 1 to 25, above, are virtually present in any form of "mechanical" or "optical" radial cam focuser, but they are not all necessarily present with a finite value or in a directly visible form.

All such theoretical elements, however, excepting angle theta (θ) are present and arranged so as to be directly evident in Fig. 23, which is a "complete form" of mechanical focuser corresponding to Fig. 15 of my said British Patent 29701/12 and to Fig. 4 of my said Case Y.

The various equations that apply in Fig. 23 are annexed thereto on the drawing and are seen to comprise two sets, to wit: an upper line set, identical with equations 11 to 14; and a parallel underline set with different data, but both sets are simultaneously satisfied in the same structure.

The upper line set of equations makes the pivots D and D′ serve as terminals of focuser Newtonian spaces AD and D′A′;

whereas the lower line set makes pintles V and V' serve as the terminals of focuser Newtonian spaces VZ and Z'V'.

We, therefore, distinguish at the left a set of three equal Newtonian spaces $$PF = AD = VZ \quad (26)$$

and at the right a conjugate set of three equal Newtonian spaces $$F'P' = D'A' = Z'V' \quad (27)$$

We also distinguish two sets of co-varying but always similar triangles, to wit: set ADV and A'V'D' with invariable basic angles alpha ($\alpha$) and alpha prime ($\alpha'$) at A and A'; and set ZVD and Z'D'V' with invariable basic angles epsilon ($\epsilon$) and epsilon prime ($\epsilon'$) at Z and Z'.

In some forms, such as present Fig. 1, it is the AA' set of triangles that is the most in evidence, but in optical focusers, such as Fig. 16 and the mechanical focusers of Figs. 6 to 9 of my said British Patent 29,701 of 1912, it is the ZZ' set that is the most in evidence; both sets, however, are virtually present in any radial cam focuser.

The horizontal offset of pivots D and D' here equal to 20 centimeters is indirectly taken care of by equations 12 and 13, but the vertical offset of the same pivots DD' equal to about 10 centimeters may be left out of consideration, except in measuring the distance DD' to make link BB' equal to DD'.

In any form we must have BB' equal to DD' and this distance DD' is *nil* in the simple forms where the two pivots D and D' are merged into one.

The basic angle delta ($\Delta$) has its cosine equal to minus one-third, and it is, therefore, equal to 1.216 Q, but it may, as proved in my Case Y, be a right angle, or even less than a right angle, and it may have any desired value within wide limits.

There is no difference in principle between "optical focusers" and "mechanical focusers," except that a "double sight optical focuser," such as that of Fig. 15, must necessarily be derived from a "mechanical focuser" in which dimension $m'''$ is made equal to zero.

Any focuser, either mechanical or optical, may be derived from this complete form by giving the various dimensions proper values.

We easily identify in Fig. 23 the dimensions of Fig. 1 as first shown in Fig. 4. The terminal A is at a distance $m$ from the object plane P and this distance $m$ is equal to the distance $x$ of terminal D from the principal focal plane F. The terminal A' is at a distance $m'$ from the image plane P' and this distance $m'$ is equal to the distance $x'$ of terminal D' from the principal focal plane F'. The bracket vectors are the oppositely inclined or anti-parallel lines AV and A'V', whose inclinations are fixed by the equal angles alpha ($\alpha$), alpha prime ($\alpha'$) and delta ($\Delta$).

We, therefore, see how equations 11 to 14 are satisfied by the first set of dimensions, which is based on the use of pivots D and D' as terminals of the Newtonian spaces AD, D'A'.

We may, however, use V and V' as terminals of the Newtonian spaces VZ and Z'V', as in Fig. 16. In this case the distance of V from the object plane P is represented by an imaginary bar $m''$, and the equal distance of Z from the principal focal plane F is $x''$.

Similarly, at the right the distance of V' from the image plane P' is represented by an imaginary bar $m'''$, and the equal distance of Z' from the principal focal plane F' is $x'''$. This distance $m'''$ is equal to zero in Fig. 16 and it must be zero in any double sight optical focuser.

The constant product bracket elements are no longer AV and A'V', but DZ and D'Z'.

Whichever set of dimensions is used, we must design, adjust and regulate the focuser so as to satisfy equations 11, 12, 13, and 14, either directly or else indirectly, by satisfying equivalent equations selected in the series numbered 15 to 25.

*Abnormal complete form, Fig. 24.*

If in Fig. 23 we turn the left part of the mechanism clockwise about pivot D, through an angle equal to theta ($\theta$) we obtain the more general but "abnormal form" of focuser seen in Fig. 24, in which the paths VZ and V'Z' are inclined to meet in X under this same angle theta ($\theta$).

The sector angle 1818 or VDB here still represents the constant mutual inclination of the two radial cams 1816 and 1716' or of the two radial cam slots 1817 and 1717', but such sector angle VDB is no longer equal to delta ($\Delta$); it is equal to the sum delta plus theta ($\Delta + \theta$), where delta ($\Delta$) remains of the value specified in Fig. 23 or in equations 11 and 21.

In simple forms the angle VDB of Figs. 23 and 24 becomes identical with angle VDV'; hence in all forms we have the general rule that the sector angle equals the sum delta plus theta ($\Delta + \theta$) or in symbols $$\text{Sector angle} = (\Delta + \theta) \quad (28)$$

It is only when the paths of terminals V and V' are parallel, as in the normal forms, that is to say, as in all forms herein shown except those of Figs. 22 and 24, that this sum of equation 28 reduces to delta plus zero ($\Delta + 0$) or simply delta ($\Delta$).

Where the rotation theta ($\theta$) of Fig. 24 is made exactly equal to the supplement of the basic angle delta ($\Delta$) so that delta plus theta ($\Delta + \theta$) equals 2 Q or two right angles, then the two radial cams DV, D'V' become parallel, but oppositely extended; and if in this case the distance DD' is made *nil*, instead of finite, the two radial arms DV, D'V' form a straight lever VDV', as in Fig. 22, which was derived in this manner from the bent lever form of Fig. 21.

Any straight lever focusing gear is thus derivable from a fundamental normal or bent lever form of basic angle delta (Δ) which may be an obtuse angle, as in the Fig. 21 just considered, or an acute angle, or finally a right angle. An instance of straight lever focusing gear whose basic angle delta (Δ) is one right angle is shown in British Patent 13,934 of 1909 to Marks; and its method of derivation is explained in Note 20, page 13, of my previously referred to British Patent 29,701 of 1912.

The principles of Figs. 23 and 24 are not limited to radial cam focusers of the obtuse angular type, as will now be shown by describing the Fig. 15 camera with its obtuse angular focuser replaced first in Figs. 25 to 27 by a focuser of the rectangular type, then in Figs. 28 to 30 by a focuser of the acute angular type.

Camera of Figs. 25 to 27.

Figs. 25, 26, and 27, corresponding, respectively, to Figs. 15, 18, and 19, show the camera of Fig. 15 with its "obtuse angular" focuser replaced by a closely related "rectangular focuser."

All camera parts, even to the screws 1355 and 1365, are identically the same in Fig. 25 as in Fig. 15. The focuser parts differ, as they must, owing to the change in the basic angle from epsilon prime ($\epsilon'$) equal 1.560 Q, in Fig. 18, to epsilon prime ($\epsilon'$) equal 1.000 Q in Fig. 26; also, owing to a change in the vectors Z'D, DZ from 48 and 12, in Fig. 18, to 32 and 18 in Fig. 26.

The rectangular sector 1418 of Fig. 25 comprises arms 1416, 1416' with openings 1417, 1417', all corresponding in form and function to the similarly numbered elements 1216, 1216', 1217, 1217' of the obtuse angular sector 1218 in Fig. 15.

The bracket 1454 of Fig. 25, supporting the pivot 1420 or D, and the sight U, as well as the holes 1440, 1440', and slide bolt 1441, corresponds in function to bracket 1854 of Fig. 15, supporting pivot 1320 or D and the sight U, as well as the holes 1340, 1340' and the slide bolt 1341.

The bracket 1464 of Fig. 25, supporting pin 1419 or V, groove 1415 and the peep sight 1466 or T, corresponds in function to the bracket 1864 of Fig. 15, supporting pin 1819 or V, groove 1815 and the peep sight 1866 or T.

The extensible parallelograms ADVZ and DA'Z'V' of Fig. 18 appear in Fig. 26 as extensible rectangles.

As the basic angle epsilon prime ($\epsilon'$) or V'Z'D in Fig. 26 is a right angle the pivot D must be located in the vertical plane through F' so that bar $x'$ equals zero, bar $x$ equals FF', and, in view of equation 3, bar $m$ equals FF'.

As the cosine of the right angle is equal to zero, equations 22 and 23 applied in Fig. 26 yield $$m'' = m = FF'$$
$$x'' = x = FF'$$

In Fig. 26 the distance Z'D is 32 centimeters and the distance DZ is 18 centimeters, but these distances might have any other values satisfying equation 17.

In Fig. 26, as in Fig. 18, the three equal Newtonian spaces at the left are $$PF = VZ = AD = 8 \text{ cm}$$

and the three equal Newtonian spaces at the right are $$F'P' = Z'V' = DA' = 72 \text{ cm}$$

A compact form of rectangular focuser is shown in Fig. 32.

Camera of Figs. 28 to 30.

Figs. 28, 29, and 30 correspond, respectively, to Figs. 15, 18, and 19; also, respectively, to Figs. 25, 26, and 27, and show the camera of Fig. 15 with its obtuse angular focuser replaced by a closely related focuser of the "acute angular type;" that is to say, the angle epsilon prime ($\epsilon'$) in Fig. 29 is two-thirds of a right angle or 0.667 Q.

All camera parts, even to the two screws 1355 and 1365, are identically the same in Fig. 28 as in Fig. 15. The focuser parts differ, as they must, owing to the change in the basic angle from epsilon prime ($\epsilon'$) equal 1.560 Q, in Fig. 18, to epsilon prime ($\epsilon'$) equal 0.667 Q in Fig. 29. The distances Z'D and DZ in Fig. 29 are the same as in the rectangular focuser, Fig. 26.

The acute angular sector 1518 of Fig. 28 comprises arms 1516, 1516' and openings 1517, 1517', all corresponding in function to the similarly numbered arms 1216, 1216' and openings 1217, 1217' of the obtuse angular sector 1218 of Fig. 15.

The bracket 1554 of Fig. 28, supporting pivot 1520 or D and the sight U, as well as the holes 1540, 1540' and slide bolt 1541, corresponds in function to bracket 1354 of Fig. 15, supporting pivot 1320 or D and the sight U, as well as the holes 1340, 1340' and the slide bolt 1341.

The bracket 1564 of Fig. 28, supporting pin 1519 or V, groove 1515, and the peep sight 1566 or T, corresponds in function to the bracket 1864 of Fig. 15, supporting pin 1819 or V, groove 1815 and the peep sight 1866 or T.

The extensible parallelograms ADVZ and

DA'Z'V' which were rectangular in Fig. 26 have again become oblique angled, as in Fig. 18, but they slant in the opposite direction so as to partly overlap.

As the basic angle epsilon prime ($\epsilon'$) or V'Z'D in Fig. 29 is acute, the vector Z'D slants to the right and pivot D must be located to the right of the focal plane F'.

Vector Z'D in Fig. 29 is 32 centimeters and vector DZ is 18 centimeters, but these vectors might, as in the rectangular focuser of Fig. 26 or in the obtuse angular focuser of Fig. 19, have any other values satisfying equation 17.

We have for the distance $x'$ of pivot D from the focal plane F $$x' = Z'D \cos \epsilon' = 32 \times 0.5 = -16 \text{ cm}$$

hence its distance from the focal plane F is FF' plus 16 or 70 cm; that is to say, $$x = 70 \text{ cm}$$

The distance $x''$ of Z from the same focal plane F is by equation 23

$$x'' = x + ZD \cos \epsilon'$$
$$x'' = 70 + 18 \times 0.5 = 79 \text{ cm}$$
$$x'' = 79$$

and, in view of equation 20, we have $$m'' = x'' = 79 \text{ cm}$$

In Fig. 29, as in Fig. 26 and in Fig. 18, the three equal Newtonian spaces at the left are $$PF = VZ = AD = 8 \text{ cm}$$

and the three equal Newtonian spaces at the right are $$F'P' = Z'V' = DA' = 72 \text{ cm}$$

A compact form of acute angular focuser is shown in Fig. 33.

The obtuse angle focuser shown in Figs. 15, 18, and 19, the right angle focuser shown in Figs. 25, 26, and 27, and the acute angle focuser shown in Figs. 28, 29, and 30 have corresponding but differently proportioned parts which are provided with different but corresponding reference signs as noted in the following table:

| Camera of Figs. 15, 18, 19. | Camera of Figs. 25, 26, 27. | Camera of Figs. 28, 29, 30. |
|---|---|---|
| 1315 | 1415 | 1515 |
| 1216 | 1416 | 1516 |
| 1216' | 1416' | 1516' |
| 1217 | 1417 | 1517 |
| 1217' | 1417' | 1517' |
| 1218 | 1418 | 1518 |
| 1319 | 1419 | 1519 |
| 1320 | 1420 | 1520 |
| 1340 | 1440 | 1540 |
| 1340' | 1440' | 1540' |
| 1341 | 1441 | 1541 |
| 1354 | 1454 | 1554 |
| 1364 | 1464 | 1564 |
| 1366 | 1466 | 1566 |

Cameras of Figs. 31 to 33.

The three different types of focuser shown in Figs. 15, 25, and 28 are most easily compared in the three corresponding compact forms of Figs. 31, 32, and 33, where the more compact gamma ($\gamma$) sector of Fig. 16, however, is replaced by the less compact but more easily understood delta ($\Delta$) sector.

The camera shown in these three Figs. 31, 32, and 33 is identically the same as that shown in Fig. 16, but it is shown as provided: first, with a normal form of obtuse angular focuser, in Fig. 31; secondly, with a normal form of right angular focuser, in Fig. 32; thirdly, with a normal form of acute angular focuser in Fig. 33.

In each of these three Figs. 31, 32, 33, the basic angle VZV' or delta ($\Delta$) and considered per se, the corresponding angle V'Z'D or epsilon prime ($\epsilon'$) are evidently equal. Thus in Fig. 31 we have epsilon prime ($\epsilon'$) and delta ($\Delta$) both equal to 1.752 Q whose cosine is minus 37/40, exactly as in Fig. 16; in Fig. 32 they are both equal to 1.000 Q whose cosine is zero; in Fig. 33 they are both equal to 0.667 Q whose cosine is plus 1/2; all cosine values given being exact, as they were purposely so selected with the object of facilitating verifications by scale and by computation.

The vectors DZ and DZ', which are both vertical in Fig. 32, are equally but oppositely inclined in Fig. 31; also equally but oppositely inclined in Fig. 33; hence they are as a general rule "anti-parallel" with reference to a horizontal line.

The vector Z'D may not only have any preferred inclination, but in each of the three forms it may have any preferred length. Thus in Fig. 31 it is 40 centimeters long as in Fig. 16; in Fig. 32, it is 32 centimeters long; and in Fig. 33, it is also 32 centimeters long; but any other preferred values might have been used throughout.

The length DZ, in view of equation 17, simply depends upon the value selected for Z'D. Thus in Fig. 31 it is 14.4 centimeters long and in Figs. 32 and 33 it is 18 centimeters long.

In any focuser of the rectangular type, Fig. 32 for instance, the pivot D must for all possible values of Z'D be held stationary in the vertical plane F'D through the outer focal point F'; and this necessitates the use of an outrigger or bracket 2254 which is fastened to the lens frame $L^{20}$ by screws 2255. This outrigger is provided with a slideway 2290 for the pintle V which is connected to a rod 2264 and through this rod, by a screw 2265, to the object frame $O^{20}$.

In any focuser of the acute angular type, Fig. 33, for instance, the vector Z'D leans off to the right so that a still longer outrigger or bracket 2354 is required. This longer bracket is also provided with a slideway 2390 for the pintle V which is connected to a rod 2264 and through this rod, by a screw 2365, to the object frame $O^{20}$.

The optical focuser of Fig. 31 as compared with the optical focusers of Figs. 32 and 33 has the evident advantage of having no parts projecting beyond the camera lens except the single sighting arm 2116', and this is easily suppressed by using the supplementary or gamma ($\gamma$) sector of Fig. 16 in place of the delta ($\Delta$) sector.

Table (D) of fundamental dimensions in Figs. 31 to 33.

|  | Cos. $\epsilon'$ | $\epsilon'-\Delta$ | Z'D | DZ | $m''-z''$ |
|---|---|---|---|---|---|
| Fig. 31... | $-27/40$ | 1.752 Q | 40 cm | 14.4 cm | 3.68 cm |
| Fig. 32... | Zero | 1.000 Q | 32 cm | 18 cm | 54 cm |
| Fig. 33... | $+1/2$ | 0.667 Q | 32 cm | 18 cm | 79 cm |

Any one of the three cameras shown in Figs. 31, 32, and 33 can be used on a bed in the same way as the camera of Fig. 15 is used in Fig. 14, and in such case the focusers would normally be used as single sight focusers unless they were provided with mirrors for sighting simultaneously along the two sight lines.

*Direct 3-point method, Figs. 34 to 42.*

Any one of the focusers herein described may have all of its structural dimensions determined directly, without adjustments and without knowing any of the dimensions or cardinal points of the lens, by means of the special "3-point method" which I first disclosed more than fifteen years ago in Fig. 2 of my Case A.

Since such method secures, not only "3-point," but "3-and-all point" correspondence, as well, it is of vital importance, and it will now be described in detail as it might have been used for determining the proportions of the Fig. 16 focuser.

Assuming, to begin with, that the camera is already provided with the sights T and U, and that the location of the focuser pivot D has been selected, we must ascertain the value of the sector angle gamma ($\gamma$); also the position of pintle V on the object frame $O^{20}$.

A stiff sheet of metal or paper 2023, Fig. 34, is first fastened to the lens frame $L^{20}$ by tacks 2024 and 2025, and a pin D is inserted at the point to be occupied by the focuser pivot. This pin D should project in order that a rule rested against it may be used for ruling, on sheet 2023, any direction line, such as $l'D$ in Fig. 34, $l''D$ in Fig. 35, $l'''D$ in Fig. 36, that points through D onto any point which was previously sighted along TU.

A paper strip 2026 is similarly fastened to the camera bed 2070 by tacks 2027 and 2028 so that any position occupied by the object frame $O^{20}$ may be recorded on such strip frame $O^{20}$ may be recorded on such strip 2026 as by means of a short vertical mark $r'$ in Fig. 34, $r''$ in Fig. 35, or $r'''$ in Fig. 36, traced in alinement with the extreme right hand edge of the frame.

The camera is now mounted on a firm support to be successively focused, first, as in Fig. 34, on a distant point P'; secondly, as in Fig. 35, on a close point P''; thirdly, as in Fig. 36, on an intermediate point P'''.

To facilitate matters the distant point P' Fig. 34, is assumed to be an infinity; the close point P'', Fig. 35, is supposed to be at distance N'P'' equal to $2f$; the intermediate point P''', Fig. 36, is selected at N'P''' equal to $4f$, or twice the distance of the close point P''. In current practice, of course, the finite distances N'P'' and N'P''' would not be exact.

Fig. 34, illustrating the first operation, therefore, shows the camera at minimum extension with frame $O^{20}$ sharply focused on infinity. This camera extension is recorded on strip 2026 by the short vertical mark $r'$. While the camera remains positively held in the position shown, the operator first sights from E' along TU to ascertain what particular point V' of the distant test object must serve as terminal V' of the focuser. He then sights from E, through pivot D, onto the same point V'; records this sighting direction on sheet 2023, by ruling the line $l'D$; finally, notes that this minimum camera extension $r'$ corresponds to the horizontal position $l'$ of the pivoted sight line and to zero inclination of the focusing sector.

Fig. 35, illustrating the second operation, shows the camera at maximum extension with its object frame $O^{20}$ sharply focused on the close vertical plane P''V''. This camera extension is recorded on strip 2026 by a short vertical mark $r''$. While the camera remains firmly held in the position shown, the operator first sights from E' along TU to ascertain what particular point V'' of plane P''V'' must serve as terminal V' of the focuser. He then sights from E, through pivot D, onto the same point V''; records this second sighting direction on sheet 2023, by ruling the line $l''D$; finally, notes that this maximum camera extension $r''$ corresponds to sight line $l''$ determining the maximum focuser inclination $l''Dl'$.

The test plane of Fig. 35 is now shifted to the intermediate position P'''V''' seen in Fig. 36, and the object frame $O^{20}$ is again sharply focused thereon. The frame $O^{20}$ now occupies an intermediate position which is recorded on strip 2026 by a short vertical mark $r'''$. While the camera remains firmly held in the position shown, the operator sights from E' along TU to ascertain what particular point V''' of plane P'''V''' must serve as terminal V' of the focuser. He then sights from E, through pivot D, onto the same point V''', records this third sighting direction by ruling the line l'''D; finally, notes that this intermediate camera extension r''' corresponds to the intermediate focuser inclination l'''Dl'.

The three distances r'r', r'r'' and r'r''' from r' are evidently equal to the three unequal left hand Newtonian spaces which correspond, respectively, to the three unequal right hand Newtonian spaces Z'V', Z'V'', and Z'V'''. We, therefore, have, as may be directly verified by scale, $$\text{in Fig. 34, } r' \, r'.Z'V' = 0 \times \infty = f^2$$
$$\text{in Fig. 35, } r'' \, r'.Z'V'' = 24 \times 24 = f^2$$
$$\text{in Fig. 36, } r''' r'.Z'V''' = 8 \times 72 = f^2$$

The operator, however, pays no attention to these values, but removes the strip 2026 and shifts it about, on sheet 2023, to find the position shown in Fig. 37, where the three marks r', r'', and r''' of the strip register, respectively, with their three corresponding direction lines l', l'', and l'''.

This is easily done by placing the strip 2026 with two of its marks, say r' and r'', on their respective direction lines l' and l'' and then sliding the strip along in such twofold registering relation until the third mark, in this case r''', comes into registration with its respective direction line l'''.

There is no other position to the left of D but the one shown in Fig. 37, in which this 3-fold registration can occur, and this position is remarkable, in that it finally and completely determines all the unknown dimensions of the focuser. This can more easily be explained with the aid of the diagram figures, Figs. 38 and 39.

In Fig. 38 the three dots v', v''', and v'' represent the three registering points on the edge of strip 2026. The line v'' v' produced meets the horizontal sight line TU in X determining two supplementary angles, to wit: angle v'XZ', which is the basic angle delta (Δ) of the focuser, and angle TXv', which is the sector angle gamma (γ) used in Fig. 16.

If now the sheet 2023 be turned counterclockwise, on D as center, through an angle equal to gamma (γ), the line v'' v' assumes the horizontal position shown in Fig. 39, where the sheet 2023 is removed for clearness to show the frame O²⁰ in its three different focused positions r', r'', and r''' of Figs. 34, 35, and 36. The three points v'', v''', and v' now indicate the three positions successively occupied by pintle V of Fig. 16 when the object frame O²⁰ is successively placed in its three focused positions r'', r''', and r'; moreover, if the three corresponding different positions of P be indicated by p'', p''', and p', then the three dotted lines p'' v'', p''' v''', and p' v' must be equal and parallel.

The relative position of pintle V on frame O²⁰ is, therefore, fully determined and so is the angle gamma (γ) of the focusing sector.

Moreover, as the frame O²⁰ in position r' was focused on infinity, the position v' is the zero position of pintle V, hence Dv' in Fig. 39 is the direction and length of line DZ in Fig. 16 and point v' is identical with terminal Z of Fig. 16.

Furthermore, where the distant point P' focused on in Fig. 34 is at infinity, as here supposed, the sight line Dl' is horizontal and parallel to TU, hence this sight line Dl' directly determines at v', Fig. 38, the same angles delta (Δ) and gamma (γ), of the focuser, and it is not necessary in this case to produce the line v'' v' to X to find such angles. Hence all angular and linear dimensions of the focusers are fully and directly determined in Fig. 37 by the simple act of so placing strip 2026 as to secure the threefold registration there shown.

Fig. 38 is identical in principle with Fig. 1 of my said Case A and might be constructed by the geometrical rule which is given in said Case A; that is to say, by plotting Dv' equal to the quotient of Z' D into f² and then drawing v' v'' parallel to Z'D; but this rule can only be applied when the point Z' and the focal length f of the lens are both known.

*Geometrical method, Fig. 40.*

There is, however, a direct geometrical method for finding the 3-fold registering position of strip 2026, when nothing else is known but what appears recorded on sheet 2023 and on strip 2026.

This method is illustrated in Fig. 40, where the three direction lines l', l'', and l''' are first extended to secure all desirable clearness and accuracy. On the intermediate direction line Dl''' distances DR''' and DR'' are plotted respectively proportional to the distances r' r'' and r' r''' on strip 2026, so that the line DR'''·R'' shall be any preferred but exact large scale, here sixfold, representation of the line r' r''' r''. Now, through R'' draw the parallel to l'D meeting Dl''' in c'', and join c'' to R''' producing the line to c', where it meets the direction line Dl'. The line c'R'''c'' thus obtained is evidently a second correct and still enlarged representation of the line r' r''' r'' and it shows the proper inclination of the latter. The line r' r''' r'' itself is now located as follows: first, on c' c'' of Fig. 40, plot c' c equal to r' r'' of strip 2026, Fig.

37; secondly from $c$ draw the parallel to $l''D$, meeting the direction line $l''D$ in $r''$; thirdly, from $r''$ draw the parallel to $cc'$, meeting the direction lines $l'''D$ and $l'D$ in $r'''$ and $r'$ respectively. The line $r'$ $r'''$ $r''$, thus determined, indicates the correct threefold registering position of strip 2026.

This second or geometrical method is not as convenient as the first or direct shift and try method of Fig. 37, but it removes any doubt that might exist as to the certainty and mathematical accuracy of such direct method, which is further confirmed by a third method, the algebraic.

*Algebraic method of locating $r'$ $r''$, Fig. 41.*

The correct position of line $r'$ $r''$ in Fig. 37 may be determined algebraically by calculating the two unknown distances $Dr'$ and $Dr''$.

In the diagram figure, Fig. 41, let rho ($\rho$), sigma ($\Sigma$), and tau ($\tau$) be the respective values of the three angles $l'Dl'''$, $l'Dl''$, and $l''Dl'''$; and, in order to make the case general, we will suppose that the most distant point focused on in Fig. 34 was relatively close, so that the direction line $Dl'$ in Fig. 41 forms a finite angle $l'DH$ with the horizontal $DH$ drawn through the pivot $D$.

Now draw any transversal meeting lines $l'$, $l''$, and $l'''$, respectively, in $r'$, $r''$, and $r'''$, to represent a 3-point registering strip, and let the distance $Dr'$ equal $x$ while the distance $Dr''$ equals $y$.

From the ends $r'$ and $r''$ drop the perpendiculars $r'$ $t'$ and $r''$ $t''$ onto the intermediate direction line $Dl'''$.

The perpendicular $r''$ $t''$ is evidently equal to $y \sin \tau$ and it is also evidently equal to $r'''$ $r''.\sin Dr'''$ $r'$, hence $$y \sin \tau = r''t'' = r'''r''.\sin Dr''' \, r' \quad (29)$$

The perpendicular $r'$ $t'$ similarly yields $$x \sin \rho = r't' = r'''r'.\sin Dr''' \, r' \quad (30)$$

Noting that the factor $\sin Dr'''$ $r'$ occurs in both sets of equations, we obtain by division $$\frac{y \sin \tau}{x \sin \rho} = \frac{r'''r''}{r'''r'}$$

whence $$\frac{y}{x} = \frac{r'''r''}{r'''r'} \cdot \frac{\sin \rho}{\sin \tau} \quad (31)$$

The ratio of $y$ to $x$ is, therefore, fixed as being equal to the product of two ratios whose values are measurable in Fig. 36 after completion of the third focusing operation.

Thus the ratio $r'''$ $r''/r'''$ $r'$ is directly measurable on strip 2026; while the ratio $\sin \rho/\sin \tau$ is measurable on sheet 2023, as by dropping the perpendiculars $e'$ and $e''$, Fig. 41, from any point of $Dl'''$ onto the other two direction lines.

We are, therefore, entitled to write $$\frac{r'''r''}{r'''r'} = a \quad (32)$$

$$\frac{\sin \rho}{\sin \tau} = b \quad (33)$$

where $a$ and $b$ are known quantities.

The slant of the line $r'$ $r''$ is accordingly fixed by the measurable ratio $$\frac{y}{x} = ab = c \quad (34)$$

whence $$y = cx \quad (35)$$

Now in the triangle $Dr'$ $r''$, Fig. 41, we know the length of side $r'$ $r''$, and, in view of equation 35, we have successively $$(r'r'')^2 = x^2 + y^2 - 2xy \cos \Sigma$$
$$= x^2 + c^2 x^2 - 2xcx \cos \Sigma$$
$$= x^2(1 + c^2 - 2c \cos \Sigma)$$

whence $$x = \frac{r'r''}{\sqrt{1 + c^2 - 2c \cos \Sigma}} \quad (36)$$

These results are collected in convenient order for use in the table of five equations that is annexed to and forms part of Fig. 41. That is to say, we must first calculate $a$, then $b$, then $c$; finally, after having measured cosine sigma ($\Sigma$), which can be done directly on sheet 2023, we calculate $x$, then $y$.

Having calculated $x$ and $y$ in any given case, on $Dl'$ plot point $r'$ by making $Dr'$ equal $x$; on $Dl''$ plot point $r''$ by making $Dl''$ equal $y$; draw $r''$ $r'$ and produce it beyond its intersection $H$ with the horizontal through $D$, Fig. 41, then $DH$ will represent the distance called $DZ$, in Fig. 16, and the two angles formed at $H$ will be the two supplementary angles delta ($\Delta$) and gamma ($\gamma$) of the focusing sector.

Where, as in Fig. 34, the most distant point focused on is practically at infinity, the angle $HDl'$ of Fig. 41 vanishes, point $r'$ falls in with $H$ and $Dr'$ equals $DZ$ of Fig. 16.

*Numerical verification, Fig. 42.*

In verification let us calculate the distances $x$ and $y$ or $Dr'$ and $Dr''$ in Fig. 38 from other known elements whose exact numerical values are noted in the diagram figure, Fig. 42, which was purposely drawn out of proportion to secure clearness.

The known distances 16 and 8 on strip $r'$ $r''$ enable us to find that $a$ equals 2 as in the first equation of Fig. 42.

The cosine of angle $V''Z'D$ in Fig. 38 is the same as it was in Figs. 16 and 31, or equal to minus 37/40, and as $Z'D$ equals 40 the projection $Z'K$ of $Z'D$ in Fig. 42 must be 37, as noted. This 37 added to the known distance Z'V" of Fig. 38 makes KV" equal to 61. We also have the distance V"V''' and note that in the triangle V"DV''' the angle at D equals tau ($\tau$), while the angle at V" equals rho ($\rho$), hence $b$ has the value noted in the second equation of Fig. 42. The product $ab$, or $c$, has the value noted in the third equation of Fig. 42.

The angle sigma ($\Sigma$) is evidently equal to angle KV"D, and its cosine, therefore, has the value given in the fourth equation of Fig. 42.

Knowing $c$, cosine sigma ($\cos \Sigma$), and the length $r'\, r''$, we have all the data required for finding with the fourth equation of Fig. 41 that $$x = 14.4 \text{ cm exactly}$$

and this agrees, as it should, with the value given above for DZ in Fig. 16.

We also have, in view of the fifth equation of Fig. 41, $$y = cx = 0.6\sqrt{3952} \text{ exactly}$$

or $$y = 37.72 \text{ cm approximately}$$

These two values of $x$ and $y$ may be verified by direct measurement in Fig. 38, but not in Fig. 42, which, as stated above, was purposely distorted to secure all desirable clearness.

Notes.

NOTE 1.—The two lens points N and N' are, respectively, identical with the two "Hauptpunkte" or principal points E and E* of the Gaussian theory of lenses found in volume 5 of the collected works of Gauss. (*Carl Friedrich Gauss Werke*, Vol. 5, Göttingen, 1877, *Dioptrische Untersuchungen*, pages 243-276; also important summary on pages 309-312).

NOTE 2.—For all present purposes, the same two lens points are also, respectively, identical with the two "Knotenpunkte" or nodal points K° and K of Listing, and they have been called nodal points throughout this specification (and elsewhere by others it is believed) because "nodal" is, for present purposes, both more convenient and more characteristic than "principal." See sections 2 and 3 of Listing's *Beitrag zur physiologischen Optik*, Leipzig reprint of 1905.

NOTE 3.—The only case in which the two "nodal points" of Listing, which we may refer to as K and K', and the two "principal points" of Gauss, which we may refer to as E and E', must be distinguished as four separate points K, K', E, and E' is the rare one where the first and the last dioptric media are different as where a camera is specially intended for use with its lens projecting into water. Such camera would have the same kind of focuser as an air camera; also the same three independent adjustments, but the adjustment and regulation must be made under the conditions of use because the lens then has two different focal lengths FE and E'F' or $f'$ and $f''$ whose product $f'f''$ must be substituted for the product $ff$ or $f^2$ in equation 1.

NOTE 4.—I am aware that an unprinted French Patent, No. 256,838, granted June 1, 1896, to Garceau, shows in its Fig. 5 an optical focuser of the rectangular type that is substantially similar to the form that my Fig. 32 would assume if proportioned to make Z'D equal to $f$; but Garceau has no adjustments; moreover, his rule of construction is vitiated by reference to a single lens center which he uses in place of the two distinct centers N and N' of the present specification.

NOTE 5.—The use of such a single lens center, as in Garceau, in the place of the two distinct centers N and N', is a common but erroneous practice which is expressly and most emphatically condemned by Gauss in various passages of his said lens theory, and more particularly so in section 13 thereof, which is devoted to the simple lens.

NOTE 6.—I am aware that Garceau shows, in his Fig. 6 for instance, an optical focuser that has its pivot mounted back on the camera; but such Garceau focuser is subject to two different errors, to wit: first, an error due to the use of a single lens center in place of the two generally separated nodal points N and N'; secondly, a much more important error, due to the fact that such focuser is of the "rectangular type" and is used out of place in a position that calls for a widely different focuser of the "obtuse angular type."

NOTE 7.—Any focuser herein described with adjustments, such as the "optical focuser" of Fig. 15 or the "mechanical focuser" of Fig. 1, may be adjusted and regulated to secure any arbitrarily desired three-point correspondence with any one of different lenses by the "general three-point method of adjustment" shown in Fig. 7 of my said Case Y and in Fig. 16 of my said British Patent 29701/12.

NOTE 8.—In a "double sight" optical focuser, such as required in a landscape camera, Fig. 15, for instance, the focuser must be of a form in which the terminal V' is situated in or in a vertically produced part of the image plane P'.

NOTE 9.—In a "single sight" focuser, however, such as used in the copying or enlarging camera of Fig. 14, for instance, the terminal V' does not necessarily have to be in any part of the image plane P'; it may be any material point chosen at any desired distance $m'''$, Fig. 23, from the image plane P', either to the left of such plane, as in Fig. 23, or to the right of it. A single sight focuser is shown and claimed in my said Case At.

Note 10.—The "double sight" optical focusers herein disclosed, such as those of Figs. 31 to 33, for instance, may be provided with either catoptric or dioptric or both catoptric and dioptric image forming devices, as set forth in my said Case A, without producing any change in the fundamental principles involved; and, therefore, my present invention is generally applicable to any optical focuser which virtually serves to sight, either directly or indirectly, from separated points connected with the camera, onto one same object point of the camera field, as indicated in Figs. 14 to 16 of my said Case B or else onto adjacent parts of the same field point, as indicated in Figs. 11 to 13 of my said Case B, or in Figs. 7 to 9 of my said Case A.

Note 11.—The drawings, excepting Figs. 41 and 42 which are purely diagrammatic, are made to scale in all essential particulars; that is to say, all angular and all linear elements of Figs. 1 to 40 that are referred to in the various equations are exactly represented, but other parts are generally arranged and proportioned so as to secure the greatest clearness of illustration.

Note 12.—I am aware that Professor Elie in the *Journal de Physique*, Paris, 1880, pages 162 to 164, diagrammatically proposes what must be a form of non-rectangular radial cam for directly connecting the two axial conjugate foci P and P' of a lens with its principal foci F and F', and with each other so as to determine the Newtonian spaces PF and F'P' of the lens directly; but the Elie disclosure is hardly more than a form of lens graphics, and is, moreover, of such nature as to exclude all the independently variable linear elements of my various equations, so that it would not permit of constructing any one of the twelve or more different practical focusers shown in the accompanying drawings.

Note 13.—A construction which must closely resemble what Professor Elie may have had in mind is derived from my Fig. 23 as follows: In Fig. 23 make the four bracket elements AV, A'V', DZ, and DZ' each equal to $f$; make the two equal distances PV and FZ each equal to zero; finally, make the two equal distances P'V' and F''Z' each equal to zero; and observe: first, that every restriction here made adds to the impracticability of the device as a focuser; secondly, that my Fig. 23, which is itself hardly more than a diagram, never could be derived from the Elie sketch.

Note 14.—In all devices herein shown we must distinguish the "camera" and the "focuser." Thus in Fig. 1, if we take out the four screws 513, 513' and the pin 520, we have separated an ordinary copying or enlarging camera from its "focuser" and the focuser in this case is a "mechanical focuser." In Fig. 14 and in Fig. 15 the focuser is "optical" and removal of the two screws 1355 and 1365 suffices to separate such "optical focuser" from the camera, which is an "enlarging camera" in Fig. 14 and a tripod camera in Fig. 15.

Note 15.—In a copying or enlarging camera the focuser may be "mechanical," as in Fig. 1, or it may be "optical" and when "optical" it may be "single sight optical," as in Fig. 11, or "double sight optical," as in Fig. 14; but the more specific claims hereinafter made are to double sight optical focusers.

Note 16.—In a tripod camera, such as that of Fig. 15 or that of Figs. 16 and 17, the focuser cannot possibly be mechanical or even "single sight optical" for many obvious reasons, one of which is that a focusing mechanism reaching to the most distant star is out of question.

Note 17.—My broadest claim to an "optical focuser with 3 separate adjustments" is not limited to optical focusers of the radial cam type, but the radial cam type is preferred, hence alone illustrated, because "3-point correspondence" in such type necessarily means "all-point correspondence."

Note 18.—An optical focuser which is not "theoretically accurate," that is to say, one which does not act in strict accordance with equations 1 and 2, can always be provided with two separate adjustments to secure exact 2-point correspondence, as shown, for instance, in my said Case C.

Note 19.—My three-point method of adjustment, and, in fact, all of my work on focusers, may be considered as based upon the principle that a lens is fully determined for all present purposes by three different elements, as, for instance, by (1) the position of its principal focus F, (2) the position of its principal focus F', (3) its focal length $f$; a principle that was first clearly enunciated by Gauss himself in section 15 of his lens theory, the said *Dioptrische Untersuchungen*, fully cited above in Note 1.

Note 20.—The camera of Fig. 15, set as shown in Fig. 15, may without disturbing the frames be used in two ways, as was aready explained above with reference to the camera of Fig. 1, to wit: first, to make a negative PW of an original P'V'; secondly, to use such negative PW in making an enlarged positive P'V'. In the first case the light travels from P' to P and the copying factor is PW/P'V' or 1/3; in the second case light travels from P to P' and the copying factor is P'V'/PW or 3. Such two different and reciprocal values of the copying factor $n$ for the same relative position of the frames exist in all cameras herein considered; but, as already explained above in connection with the camera of Fig. 1, in order that a given $n$ value shall always refer to the same relative position of the lens and the conjugate image planes P and P', plane P at the left is invariably referred to as the object plane, with O in the reference sign of its supporting frame, and the copying factor n in all cases represents the ratio P'V'/PW of the right hand diameter P'V' to the left hand diameter PW. To be consistent, I have therefore said that the copying factor n is *nil* in Figs. 3, 7, 8 and 12; equal to 1.2 in Fig. 19; equal to 1.5 in Figs. 1, 4, 5, 6, 9, 10, 11, 14 and 16 to 18; equal to 3 in Fig. 15; and equal to infinity in Figs. 2 and 13.

NOTE 21.—My Case A, now Patent 1,178,474, issued April 4, 1916, page 20, Note 2, says that the specific invention involved in the theoretically exact focusing devices of the Case A Figs. 1 to 24, is completed and, therefore, claimed in my present Case Ae. However, for reasons given in Note 20, page 12, of my Case Au, now Patent 1,280,638, issued October 8, 1918, I have already made my broadest possible claim for an oblique angle or non-rectangular radial cam focuser in my said Case Au, where I also make my broadest possible claim to a focuser whose basic angle delta ($\Delta$) is acute, as in present Fig. 33. In my present Case Ae, therefore, I am making the broadest possible claim that I am still entitled to make on a radial cam focuser whose basic angle delta ($\Delta$) is obtuse, as in the present Figs. 16 and 31.

NOTE 22.—The supplement gamma ($\gamma$) of the basic angle delta ($\Delta$) has structural importance, as seen in the present Fig. 16. It also has considerable theoretical importance, because it furnishes an additional proof of the geometrical identity that exists between focusers of the mirror type, and focusers that are wholly mechanical. This additional proof is now fully given in my said latest radial cam case, Case Bc, where the present angle gamma ($\gamma$) is called the "co-basic" or "jointly basic" angle of the focuser, and where I prove the important fact, to wit: that the pivoted mirror of a focuser such as seen in Fig. 19 of my said Case A must rotate through one-half of the said co-basic angle gamma ($\gamma$) while the camera extension varies from its minimum value, to its maximum value. This co-basic angle gamma ($\gamma$) is also important as being equal to the angle through which the virtual or image sight $B^2C^2$, in Fig. 10 of my said Case A, should be rotated while the camera extension varies from its said minimum value, to its said maximum value. In wholly mechanical focusers this same co-basic angle gamma ($\gamma$) could be of importance only, in the very exceptional case, where PF, and, therefore, also all the other Newtonian spaces, must be negative.

NOTE 23.—Newtonian spaces that are negative, and directly determined by the sides of the co-basic acute angle gamma ($\gamma$), have more than theoretical interest, in the optical focusers of the present Case Ae. In Fig. 17, for instance, where the camera is at its minimum extension, with PF *nil*, let the slot 2017 be lengthened so that the frame $O^{20}$ may freely be pushed in, say as much as 6 centimeters. This makes the Newtonian space PF equal to minus 6 centimeters, and it drops the rear sight $s$, so that the eye E must be held below the horizontal TU, to sight upwardly along $sD$, which now meets the horizontal TU, in a rearwardly situated point V', determining the vertical in-focus plane V'P', not shown in Fig. 17, but whose distance F'P' from F' is derivable from equation 1. As PF equals minus 6 centimeters, F'P' must be minus $24 \times 24/6$, or minus 96 centimeters. In the smaller view, Fig. 16, a 72 centimeter space F'P' is already shown as a plus space; hence, to locate the negatively spaced point P', in Fig. 16, simply plot P' 96 centimeters to the left of F', that is to say, very close to the now shown position of eye E. Such virtual conjugate point P', situated back of the camera, assumes real significance where the camera and the focuser are both "looking" at an infinitely distant object, through a large diameter convergent lens that is held in plane F'Z' and that has a focal length of 96 centimeters.

NOTE 24. The "single-sight" focusers of my present Figs. 10 to 13 are claimed in my said later Case At.

What I claim as my invention and desire to secure by Letters Patent is:

1. The combination with a photographic camera comprising: first, a lens supporting frame L; secondly, an image plane supporting frame O; and, thirdly, guides to permit of varying the separation of said two supporting frames, as required to permit of setting them so that an image plane, mounted in the said image plane supporting frame, shall, for a given lens mounted on the said lens supporting frame, be the real conjugate plane of a real or imaginary parallel plane situated at any desired distance from, and on the opposite side of, the said lens; of a focuser adapted to determine the exact value of such proper separation, said focuser being of the type comprising an obtuse angle radial cam, that is to say comprising (1) a pivot or pivot bearing D fixed with relation to the said lens supporting frame L (2) a pivot or pivot bearing V guided to move with reference to the said lens frame L and proportionally to the relative displacements of the said two frames L and O, along a rectilinear path VZ, where Z is the terminal, focusing-on-infinity, or zero, position of said pivot or pivot bearing V, and where said path VZ is so situated with relation to the said lens frame pivot or pivot bearing D, as to determine a triangle VZD whose angle at Z is an obtuse angle; a rectilinear slide bar engaging said two pivotal elements D and V, so as not to interfere with their just defined relative displacements, and so that its slideway shall be parallel to the variable imaginary vector DV.

2. The combination with a photographic camera comprising: first, a lens supporting frame L; secondly, an image plane supporting frame O; and, thirdly, guides to permit of varying the separation of said two supporting frames, as required to permit of setting them so that an image plane, mounted in the said image plane supporting frame, shall, for a given lens mounted on the said lens supporting frame, be the real conjugate plane of a real or imaginary parallel plane situated at any desired distance from, and on the opposite side of, the said lens; of a focuser adapted to determine the exact value of such proper separation, said focuser being of the type comprising a radial cam, that is to say: a pivot or pivot bearing D fixed with relation to the said lens supporting frame, a pivot or pivot bearing V fixed with relation to the said image plane supporting frame, and a rectilinear slide bar engaging said two pivotal points or bearings so as not to interfere with their normal relative displacement, and so its slideway shall always be parallel to the line DV; said two pivotal points or bearings D, V being so located, on their respective frames, that the said rectilinear slide bar or line DV shall be inclined with reference to the lens axis at an angle differing from a right angle when the said two supporting frames are relatively set to be in focus on infinity; such structure comprising elements having at least three variable but normally rigid dimensions which are adapted to be varied as required to permit of securing 3-point correspondence between the said focuser and any one of different lenses.

3. The combination with a photographic camera comprising: first, a lens supporting frame L; secondly, an image plane supporting frame O; and, thirdly, guides to permit of varying the separation of said two supporting frames, as required to permit of setting them so that an image plane, mounted in the said image plane supporting frame, shall, for a given lens mounted on the said lens supporting frame, be the real conjugate plane of a real or imaginary parallel plane situated at any desired distance from, and on the opposite side of, the said lens; of a focuser adapted to determine the exact value of such proper separation, said focuser being of the type comprising a radial cam, that is to say: a pivot or pivot bearing D fixed with relation to the said lens supporting frame, a pivot or pivot bearing V fixed with relation to the said image plane supporting frame, and a rectilinear slide bar engaging said two pivotal points or bearings so as not to interfere with their normal relative displacement and so its slideway shall always be parallel to the line DV; said two pivotal points or bearings D, V being so located, on their respective frames, that the said rectilinear slide bar or line DV shall be inclined with reference to the lens axis at an angle differing from a right angle when the said two supporting frames are relatively set to be in focus on infinity, such focuser having means for determining an optical line of sight whose inclination with reference to the said radial cam is constant and differs from a right angle.

4. The combination with a photographic camera comprising parts adapted to be relatively moved and placed so as to set the camera in focus on any one of differently distant field points in the camera field; of an auxiliary optical arrangement or "focuser" comprising parts adapted to be relatively moved and placed so as to permit of sighting virtually from laterally separated points, connected with the camera, onto the said any one of differently distant field points to be focused on, so that the relative position of the said focuser parts, when so sighted, shall depend upon the distance of such sighted field point; also connections between the said camera parts and the said focuser parts to insure that to every relative position of the said focuser parts shall correspond one, and only one, relative position of the said camera parts; the said connections comprising elements provided with at least three variable but normally rigid dimensions which are adapted to be varied as required to permit of modifying the said correspondence of camera relative positions and focuser relative positions so as to permit of insuring that such correspondence shall be exact for three different relative positions of the said camera parts, that is to say, such that the camera shall be sharply focused on any one of three given differently distant field points when the focuser is sighted on the same any one of the same three given differently distant field points.

5. The combination with a photographic camera comprising parts adapted to be relatively moved and placed so as to set the camera in focus on any one of differently distant field points in the camera field; of an auxiliary optical arrangement or "focuser" comprising parts adapted to be relatively moved and placed so as to permit of sighting virtually from laterally separated points, connected with the camera, onto the said any one of differently distant field points to be focused on, so that the relative position of the said focuser parts, when so sighted, shall depend upon the distance of such sighted field point; also connections between the said camera parts and the said focuser parts to insure that to every relative position of the said focuser parts shall correspond one, and only one, relative position of the said camera parts; the said connections comprising elements provided with at least three variable but normally rigid dimensions which are adapted to be varied as required to permit of modifying the said correspondence of camera relative positions and focuser relative positions so as to permit of insuring that such correspondence shall be exact for three different relative positions of the said camera parts, that is to say, such that the camera shall be sharply focused on any one of three given differently distant field points when the focuser is sighted on the same any one of the same three given differently distant field points; such separate adjustments being independent, that is to say, of such nature that each, made in its proper order, shall be complete and final so as not to require any subsequent correction or modification.

6. The combination with a photographic camera having camera parts adapted to be relatively moved and placed so as to set the camera in focus on any one of differently distant field points in the camera field; of an auxiliary optical arrangement or "focuser" comprising parts adapted to be relatively moved and placed ) as to permit of sighting virtually from laterally separated points, connected with the camera, on the camera side of the outer principal focal plane of the camera lens, onto the said any one of differently distant field points to be focused on, so that the relative position of the said focuser parts, when so sighted, shall depend upon the distance of such sighted field point; also connections between the said camera parts and the said focuser parts to insure that to every relative position of the said focuser parts shall correspond one, and only one, relative position of the said camera parts; such connections comprising a sliding terminal, and a pivoted part, with which such sliding terminal has radial sliding engagement.

7. The combination with a photographic camera comprising a plate or film support, a lens support, and means for varying the relative position of said two supports for the purpose of setting the camera in focus on an object in the camera field; of means for sighting virtually, from two laterally separated points on the said lens support onto the same object point to be focused on so that the mutual inclination of the two sight lines shall vary with the distance of such object point to be focused on; and connections between said sighting means and the said plate or film support whereby every given mutual inclination of the said sight lines has corresponding thereto a certain relative position of the said two supports; such connections comprising a sliding terminal and a pivoted part with which such slidinig terminal has radial sliding engagement.

8. The combination with a photographic camera comprising a plate or film support, a lens support, and means for varying the relative position of said two supports for the purpose of setting the camera in focus on an object in the camera field; of means for sighting virtually, from two laterally separated points on the said lens support onto the same object point to be focused on so that the mutual inclination of the two sight lines shall vary with the distance of such object point to be focused on; and connections between said sighting means and the said plate or film support whereby every given mutual inclination of the said sight lines has corresponding thereto a certain relative position of the said two supports; such connection comprising a sliding terminal, and a pivoted part with which such sliding terminal has radial sliding engagement; also elements provided with at least three variable but normally rigid dimensions which are adapted to be varied as required to permit of securing any desired three-point correspondence between such sighting means and the camera for three different relative positions of the said plate or film support and the said lens support.

9. The combination with a photographic camera comprising a plate or film support, a lens support, and means for varying the relative position of said two supports for the purpose of setting the camera in focus on an object in the camera field; of means for sighting virtually from two laterally separated points on the said lens support onto one same object point to be focused on so that the mutual inclination of the two sight lines shall vary with the distance of such object point to be focused on; and connections between said sighting means and the said plate or film support whereby every given mutual inclination of the sighting means has corresponding thereto a certain relative position of the said two supports; such connection comprising a sliding terminal, and a pivoted part with which such sliding terminal has radial sliding engagement; also elements provided with at least three variable but normally rigid dimensions which are adapted to be varied as required to permit of securing any desired three-point correspondence between such sighting means and the camera for three different relative positions of the said plate or film support and said lens support, such three separate adjustments being independent, that is to say, of such nature that each, made in its proper order, is complete and final so as not to require any subsequent correction or modification.

10. The combination with a photographic camera comprising relatively movable parts adapted to be relatively moved to set the camera in focus on an object point in the camera field, of an optical focuser therefor, comprising a mechanical radial cam and other movable parts, said camera parts, and said focuser parts, being so connected that when the camera is set in focus on infinity, the said radial cam shall occupy a rearwardly inclined position.

11. A photographic camera having a focuser of the radial cam type whose basic angle delta ($\Delta$) is obtuse, and whose structural sector angle is equal to the acute angle supplement gamma ($\gamma$) of the said basic angle delta ($\Delta$).

In testimony whereof, I have signed my name to this specification.

JOSEPH BECKER.